US012574826B2

(12) United States Patent
Akl et al.

(10) Patent No.: US 12,574,826 B2
(45) Date of Patent: Mar. 10, 2026

(54) F1 CONNECTION OPTIONS IN INTEGRATED ACCESS AND BACKHAUL HANDOVER SCENARIOS

(71) Applicant: QUALCOMM Incorporated, San Diego, CA (US)

(72) Inventors: Naeem Akl, Bridgewater, NJ (US); Karl Georg Hampel, Jersey City, NJ (US); Hong Cheng, Basking Ridge, NJ (US); Francesco Pica, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 18/331,116

(22) Filed: Jun. 7, 2023

(65) Prior Publication Data

US 2023/0403627 A1 Dec. 14, 2023

Related U.S. Application Data

(60) Provisional application No. 63/351,305, filed on Jun. 10, 2022.

(51) Int. Cl.
*H04W 40/36* (2009.01)
*H04W 36/00* (2009.01)
*H04W 36/08* (2009.01)

(52) U.S. Cl.
CPC ....... *H04W 40/36* (2013.01); *H04W 36/0061* (2013.01); *H04W 36/08* (2013.01)

(58) Field of Classification Search
CPC .. H04W 36/08; H04W 36/0061; H04W 40/36
See application file for complete search history.

(56) References Cited

U.S. PATENT DOCUMENTS

2023/0130178 A1 4/2023 Zhuo et al.
2023/0189091 A1 6/2023 Zhuo et al.
(Continued)

FOREIGN PATENT DOCUMENTS

EP 4195768 A1 6/2023
EP 4199584 A1 6/2023
(Continued)

OTHER PUBLICATIONS

International Search Report and Written Opinion—PCT/US2023/068113—ISA/EPO—Aug. 29, 2023.

*Primary Examiner* — Kent Krueger
(74) *Attorney, Agent, or Firm* — Paul M. McAdams; Holland & Hart LLP

(57) ABSTRACT

Methods, systems, and devices for wireless communications are described. An integrated access and backhaul (IAB) node may have a radio resource control (RRC) connection with a first central unit of a first network node. The IAB node may receive an indication that the IAB node is to establish an IAB node-to-central unit connection (e.g., a F1 detour connection) with a second central unit of a second network node via the RRC connection between the IAB node and the first network node. The indication may be associated with a handover between the first network node to the second network node, where the first network node may the source node and the second network node may be the target node, or vice versa. The IAB node may communicate, with the second network node, via the IAB node-to-central unit connection using the RRC connection between the IAB node and the first network node.

30 Claims, 17 Drawing Sheets

(56)     References Cited

U.S. PATENT DOCUMENTS

| | | | |
|---|---|---|---|
| 2023/0232294 A1 | 7/2023 | Teyeb et al. | |
| 2023/0328629 A1* | 10/2023 | Fujishiro | H04L 45/22 |
| | | | 370/328 |

FOREIGN PATENT DOCUMENTS

| WO | WO-2022001503 A1 | 1/2022 |
|---|---|---|
| WO | WO-2022019825 A1 | 1/2022 |
| WO | WO-2022028493 A1 | 2/2022 |
| WO | WO-2022028593 A1 | 2/2022 |
| WO | WO-2022035204 A1 | 2/2022 |

* cited by examiner

305 — PLMN

IP 310-a — Donor CU          Donor CU — 310-b

IP 315-a — Donor DU          Donor DU — 315-b

IAB-MT — 320

IAB-DUa — 325-a 115-a

305 — PLMN

IP 310-a — Donor CU          Donor CU — 310-b

IP 315-a — Donor DU          Donor DU — 315-b

320 — IAB-MT 325-a — IAB-DUa          IAB-DUb — 325-b 115-a

Interface, Partial Migration

Interface, Full Migration

300

505

AMF        AMF 510-a    Donor    Donor    510-b
         CU       CU 530-a                      530-c 515-a    Donor    Donor
         DU       DU       515-b 520              IAB-
                 MT
525-a    IAB-    IAB-
         DUa     DUb       525-b 530-b 115-c ●————● F1 interface ●----------● RRC interface ●—·—·—● NAS interface

500

610-a

Donor CU

Donor CU 610-b 605-a 615-a

Donor DU

Donor DU 615-b

620

IAB-MT 625-a

IAB-DUa

IAB-DUb 625-b 605-c 605-b 115-d

●————● F1 interface

●----------● RRC interface

600

910    920    915

905

900

130

105

115

Network
Entity

Transceiver

1210

Antenna

1215

Communications
Manager

1220

Memory

Code

1230

1225

1240

Processor

1235

1205

1200

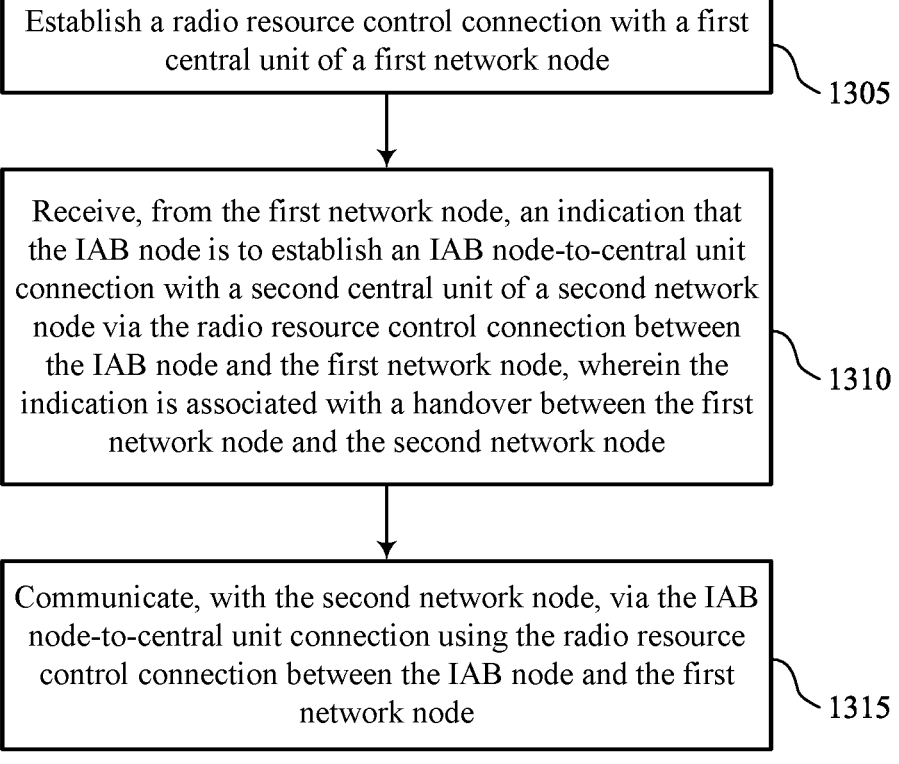

Establish a radio resource control connection with a first central unit of a first network node 1305

Receive, from the first network node, an indication that the IAB node is to establish an IAB node-to-central unit connection with a second central unit of a second network node via the radio resource control connection between the IAB node and the first network node, wherein the indication is associated with a handover between the first network node and the second network node 1310

Communicate, with the second network node, via the IAB node-to-central unit connection using the radio resource control connection between the IAB node and the first network node 1315

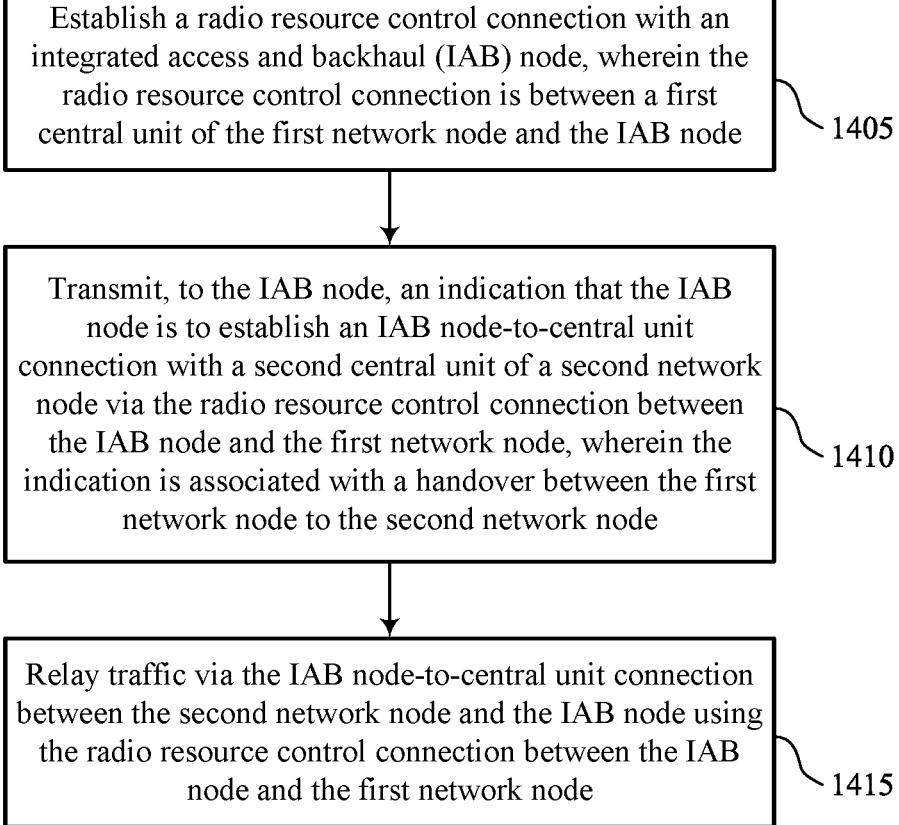

Establish a radio resource control connection with an integrated access and backhaul (IAB) node, wherein the radio resource control connection is between a first central unit of the first network node and the IAB node ⟋1405

Transmit, to the IAB node, an indication that the IAB node is to establish an IAB node-to-central unit connection with a second central unit of a second network node via the radio resource control connection between the IAB node and the first network node, wherein the indication is associated with a handover between the first network node to the second network node ⟋1410

Relay traffic via the IAB node-to-central unit connection between the second network node and the IAB node using the radio resource control connection between the IAB node and the first network node ⟋1415

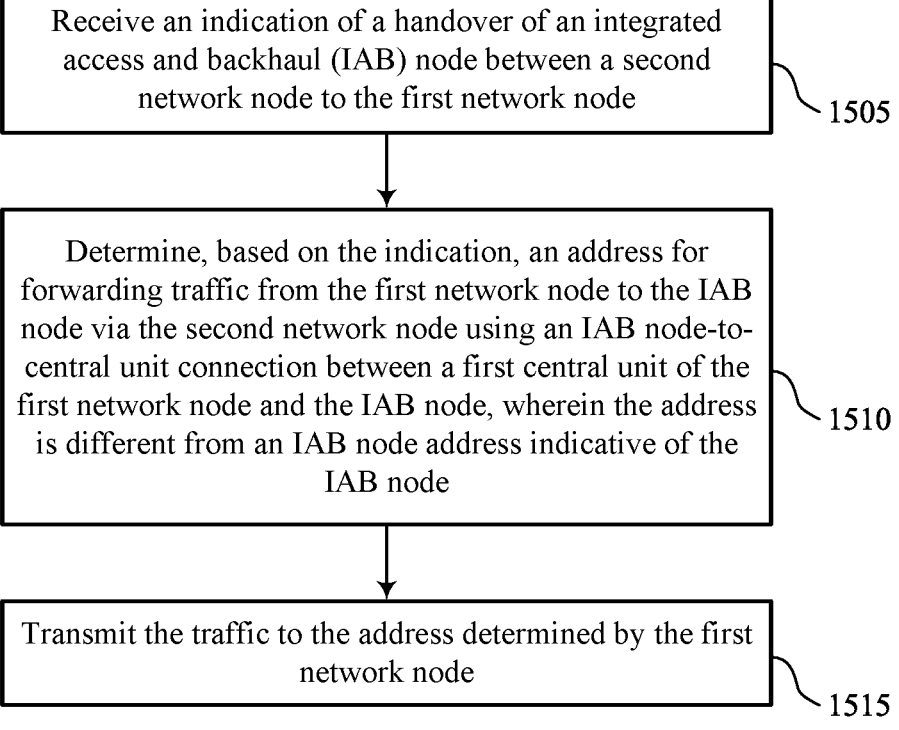

Receive an indication of a handover of an integrated access and backhaul (IAB) node between a second network node to the first network node

1505

Determine, based on the indication, an address for forwarding traffic from the first network node to the IAB node via the second network node using an IAB node-to-central unit connection between a first central unit of the first network node and the IAB node, wherein the address is different from an IAB node address indicative of the IAB node

1510

Transmit the traffic to the address determined by the first network node

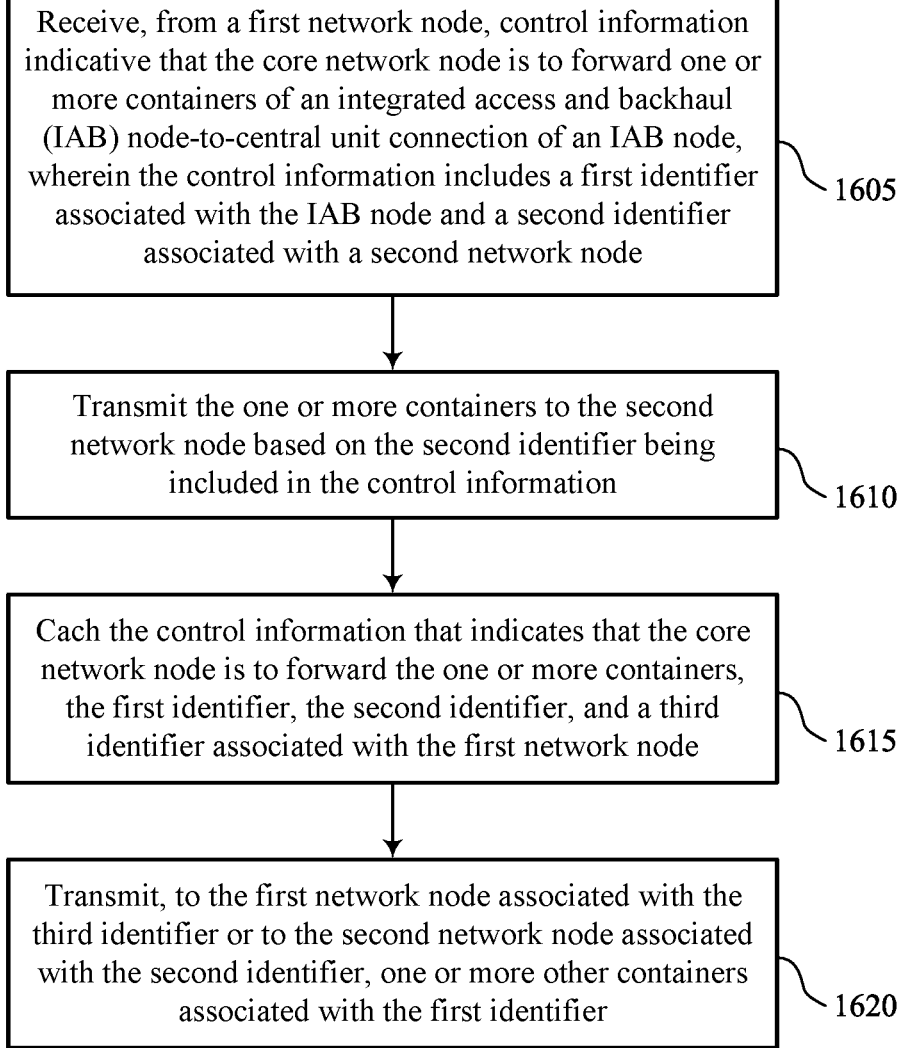

Receive, from a first network node, control information indicative that the core network node is to forward one or more containers of an integrated access and backhaul (IAB) node-to-central unit connection of an IAB node, wherein the control information includes a first identifier associated with the IAB node and a second identifier associated with a second network node ⟍ 1605

Transmit the one or more containers to the second network node based on the second identifier being included in the control information ⟍ 1610

Cach the control information that indicates that the core network node is to forward the one or more containers, the first identifier, the second identifier, and a third identifier associated with the first network node ⟍ 1615

Transmit, to the first network node associated with the third identifier or to the second network node associated with the second identifier, one or more other containers associated with the first identifier ⟍ 1620

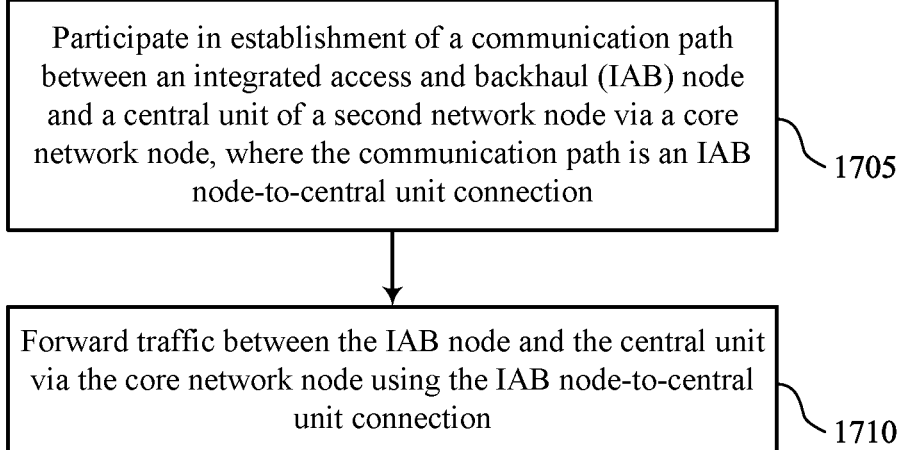

Participate in establishment of a communication path between an integrated access and backhaul (IAB) node and a central unit of a second network node via a core network node, where the communication path is an IAB node-to-central unit connection    1705

Forward traffic between the IAB node and the central unit via the core network node using the IAB node-to-central unit connection    1710

F1 CONNECTION OPTIONS IN INTEGRATED ACCESS AND BACKHAUL HANDOVER SCENARIOS

CROSS REFERENCE

The present application for patent claims the benefit of U.S. Provisional Patent Application No. 63/351,305 by AKL et al., entitled "F1 CONNECTION OPTIONS IN INTE-GRATED ACCESS AND BACKHAUL HANDOVER SCENARIOS," filed Jun. 10, 2022, and assigned to the assignee hereof. U.S. Provisional Patent Application No. 63/351,305 is expressly incorporated by reference herein in its entirety.

INTRODUCTION

The following relates to wireless communications, including integrated access and backhaul (IAB) handover scenarios.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support F1 connection options in integrated access and backhaul (IAB) handover scenarios. For example, the described techniques provide for improved methods of supporting a user equipment (UE) during IAB handover procedures. Specifically, the techniques described herein support an F1 (e.g., IAB node-to-central unit connection) connection at an IAB node during IAB handover procedure to maintain a radio link at the UE during the IAB handover procedure. To maintain an F1 connection to serve a UE during IAB handover procedures, one or more logical channels (e.g., a radio resource control (RRC) channel, a non-access stratum (NAS) channel, existing F1 connections) may be leveraged to forward F1 containers between the UE and a base station and establish a "detour" F1 path. In some cases, an F1 connection may be established with a target base station in a make-before-break fashion, or may be established with a source base station in a break-before-make fashion. For example, an IAB node may establish an RRC connection with a first central unit of a first network node (e.g., a first base station, a first donor base station). The IAB node may receive an indication or otherwise determine to establish an F1 connection with a second central unit of a second network node (e.g., a second base station, a second donor base station) via the RRC connection between the IAB node and the first network node. The IAB node may then communicate, with the second network node, via the F1 connection using the RRC connection between the IAB node and the first network node.

In some cases, a first network node (e.g., a donor base station) that forwards F1 containers (e.g., a non-F1 terminating base station) may establish a RRC connection with an IAB node, where the RRC connection may be between a first central unit of the first network node and the IAB node. The first network node may identify and in some cases, may transmit, to the IAB node, first control information indicating that the IAB node is to establish an F1 connection with a second central unit of a second network node (e.g., an F1 terminating base station) via the RRC connection between the IAB node and the first network node. The first network node may relay (e.g., forward) traffic via the F1 connection between the second network node and the IAB node using the RRC connection between the IAB node and the first network node.

In some cases, the second network node (e.g., a donor base station, the F1 terminating base station) may receive an indication of or otherwise determine a handover of an IAB node from the first network node to the second network node, or vice versa. The second network node may determine, based on the indication, an address for forwarding traffic via the first network node using an F1 connection between a central unit of the second network node and the IAB node. The second network node may transmit the traffic to the address. In some cases, the first network node may be the source base station and the second network node may be the target base station, such as in a make-before-break scenario. In some cases, the first network node may be the target base station and the second network node may be the source base station, such as in a break-before-make scenario.

A method for wireless communications at an IAB node is described. The method may include establishing a radio resource control connection with a first central unit of a first network node, receiving, from the first network node, an indication that the IAB node is to establish an IAB node-to-central unit connection with a second central unit of a second network node via the radio resource control connection between the IAB node and the first network node, where the indication is associated with a handover between the first network node to the second network node, and communicating, with the second network node, via the IAB node-to-central unit connection using the radio resource control connection between the IAB node and the first network node.

An IAB node for wireless communications (e.g., an apparatus for wireless communications at an IAB node) is described. The IAB node may include a memory, and at least one processor coupled to the memory. The at least one processor may be configured to establish a radio resource control connection with a first central unit of a first network node, receive, from the first network node, an indication that the IAB node is to establish an IAB node-to-central unit connection with a second central unit of a second network node via the radio resource control connection between the IAB node and the first network node, where the indication is associated with a handover between the first network node to the second network node, and communicate, with the second network node, via the IAB node-to-central unit connection using the radio resource control connection between the IAB node and the first network node.

Another apparatus for wireless communications at an IAB node is described. The apparatus may include means for establishing a radio resource control connection with a first central unit of a first network node, means for receiving, from the first network node, an indication that the IAB node is to establish an IAB node-to-central unit connection with a second central unit of a second network node via the radio resource control connection between the IAB node and the first network node, where the indication is associated with a handover between the first network node to the second network node, and means for communicating, with the second network node, via the IAB node-to-central unit connection using the radio resource control connection between the IAB node and the first network node.

A non-transitory computer-readable medium storing code for wireless communications at an IAB node is described. The non-transitory computer-readable medium may have code for wireless communication stored thereon that, when executed by the IAB node, causes the IAB node to establish a radio resource control connection with a first central unit of a first network node, receive, from the first network node, an indication that the IAB node is to establish an IAB node-to-central unit connection with a second central unit of a second network node via the radio resource control connection between the IAB node and the first network node, where the indication is associated with a handover between the first network node to the second network node, and communicate, with the second network node, via the IAB node-to-central unit connection using the radio resource control connection between the IAB node and the first network node.

Some examples of the method, apparatuses, and non-transitory computer-readable medium described herein may further include operations, features, means, or instructions for establishing the IAB node-to-central unit connection with the second central unit of the second network node via the radio resource control connection between the IAB node and the first network node and performing, after the IAB node-to-central unit connection may be established, a handover procedure from the first network node to the second network node.

Some examples of the method, apparatuses, and non-transitory computer-readable medium described herein may further include operations, features, means, or instructions for performing a handover procedure from the second network node to the first network node and establishing, after the handover procedure, the IAB node-to-central unit connection with the second central unit of the second network node via the radio resource control connection between the IAB node and the first network node.

In some examples of the method, apparatuses, and non-transitory computer-readable medium described herein, receiving the indication may include operations, features, means, or instructions for receiving, before the radio resource control connection with the first central unit of the first network node may be established, a handover command indicating the IAB node may be to establish the radio resource control connection with the first central unit of the first network node, where the first network node may be a target node of the handover and the second network node may be a source node of the handover, and where the handover command may be the indication.

In some examples of the method, apparatuses, and non-transitory computer-readable medium described herein, receiving the indication may include operations, features, means, or instructions for receiving a configuration message indicating the IAB node to communicate traffic via the IAB node-to-central unit connection with the second central unit of the second network node using the radio resource control connection between the IAB node and the first network node, where the configuration message may be the indication.

In some examples of the method, apparatuses, and non-transitory computer-readable medium described herein, the configuration message includes an internet protocol address configuration, and the IAB node selects an internet protocol address based on the internet protocol address configuration and utilizes the internet protocol address for communications via the IAB node-to-central unit connection with the second central unit of the second network node.

In some examples of the method, apparatuses, and non-transitory computer-readable medium described herein, communicating via the IAB node-to-central unit connection may include operations, features, means, or instructions for communicating traffic via the IAB node-to-central unit connection, where the traffic may be included in a non-access stratum container corresponding to the radio resource control connection.

In some examples of the method, apparatuses, and non-transitory computer-readable medium described herein, communicating via the IAB node-to-central unit connection may include operations, features, means, or instructions for communicating traffic via the IAB node-to-central unit connection, where the traffic includes an F1-application protocol message, a stream control transmission protocol message, or an internet protocol packet.

In some examples of the method, apparatuses, and non-transitory computer-readable medium described herein, communicating via the IAB node-to-central unit connection may include operations, features, means, or instructions for communicating the traffic to establish or re-establish the IAB node-to-central unit connection with the second central unit of the second network node.

In some examples of the method, apparatuses, and non-transitory computer-readable medium described herein, communicating via the IAB node-to-central unit connection may include operations, features, means, or instructions for transmitting, to the first network node using the radio resource control connection, an F1-C protocol data unit for the second network node, where the F1-C protocol data unit may be encapsulated in a protocol data unit corresponding to the radio resource control connection.

In some examples of the method, apparatuses, and non-transitory computer-readable medium described herein, communicating via the IAB node-to-central unit connection may include operations, features, means, or instructions for receiving, from the first network node using the radio resource control connection, an F1-C protocol data unit from the second network node and decapsulating the F1-C protocol data unit from the protocol data unit corresponding to the radio resource control connection.

In some examples of the method, apparatuses, and non-transitory computer-readable medium described herein, the communication via the IAB node-to-central unit connection using the radio resource control connection includes an identifier associated with the second network node.

In some examples of the method, apparatuses, and non-transitory computer-readable medium described herein, the first network node may be a first base station or a first IAB-donor node, or the second network node may be a second base station or a second IAB-donor node.

A method for wireless communications at a first network node is described. The method may include establishing a radio resource control connection with an IAB node, where the radio resource control connection is between a first central unit of the first network node and the IAB node, transmitting, to the IAB node, an indication that the IAB node is to establish an IAB node-to-central unit connection with a second central unit of a second network node via the radio resource control connection between the IAB node and the first network node, where the indication is associated with a handover between the first network node to the second network node, and relaying traffic via the IAB node-to-central unit connection between the second network node and the IAB node using the radio resource control connection between the IAB node and the first network node.

A first network node for wireless communications (e.g., an apparatus for wireless communications at a first network node) is described. The first network node may include a memory, and at least one processor coupled to the memory. The at least one processor may be configured to establish a radio resource control connection with an IAB node, where the radio resource control connection is between a first central unit of the first network node and the IAB node, transmit, to the IAB node, an indication that the IAB node is to establish an IAB node-to-central unit connection with a second central unit of a second network node via the radio resource control connection between the IAB node and the first network node, where the indication is associated with a handover between the first network node to the second network node, and relay traffic via the IAB node-to-central unit connection between the second network node and the IAB node using the radio resource control connection between the IAB node and the first network node.

Another apparatus for wireless communications at a first network node is described. The apparatus may include means for establishing a radio resource control connection with an IAB node, where the radio resource control connection is between a first central unit of the first network node and the IAB node, means for transmitting, to the IAB node, an indication that the IAB node is to establish an IAB node-to-central unit connection with a second central unit of a second network node via the radio resource control connection between the IAB node and the first network node, where the indication is associated with a handover between the first network node to the second network node, and means for relaying traffic via the IAB node-to-central unit connection between the second network node and the IAB node using the radio resource control connection between the IAB node and the first network node.

A non-transitory computer-readable medium storing code for wireless communications at a first network node is described. The non-transitory computer-readable medium may have code for wireless communication stored thereon that, when executed by the first network node, causes the first network node to establish a radio resource control connection with an IAB node, where the radio resource control connection is between a first central unit of the first network node and the IAB node, transmit, to the IAB node, an indication that the IAB node is to establish an IAB node-to-central unit connection with a second central unit of a second network node via the radio resource control connection between the IAB node and the first network node, where the indication is associated with a handover between the first network node to the second network node, and relay traffic via the IAB node-to-central unit connection between the second network node and the IAB node using the radio resource control connection between the IAB node and the first network node.

Some examples of the method, apparatuses, and non-transitory computer-readable medium described herein may further include operations, features, means, or instructions for performing, after the IAB node-to-central unit connection may be established, a handover procedure to hand over the IAB node from the first network node to the second network node, where the first network node may be a source node of the handover and the second network node may be a target node of the handover procedure.

Some examples of the method, apparatuses, and non-transitory computer-readable medium described herein may further include operations, features, means, or instructions for performing, before the IAB node-to-central unit connection may be established, a handover procedure to hand over the IAB node from the second network node to the first network node, where the first network node may be a target node of the handover and the second network node may be a source node of the handover procedure.

Some examples of the method, apparatuses, and non-transitory computer-readable medium described herein may further include operations, features, means, or instructions for preparing to hand over the IAB node from the second network node to the first network node, or from the first network node to the second network node.

Some examples of the method, apparatuses, and non-transitory computer-readable medium described herein may further include operations, features, means, or instructions for determining, based on preparation to hand over, a first identifier of the second network node, and a second identifier of a core network node associated with the IAB node, where the traffic may be relayed via the IAB node-to-central unit connection via the core network node based on the first identifier or the second identifier.

In some examples of the method, apparatuses, and non-transitory computer-readable medium described herein, to prepare to hand over the first node may be configured to prepare to hand over via a base station interface or a core network node interface.

In some examples of the method, apparatuses, and non-transitory computer-readable medium described herein, transmitting the indication may include operations, features, means, or instructions for transmitting a handover command indicating the IAB node to establish the radio resource control connection with the first central unit of the first network node, where the first network node may be a target node of the handover and the second network node may be a source node of the handover, and where the handover command may be the indication.

In some examples of the method, apparatuses, and non-transitory computer-readable medium described herein, transmitting the indication may include operations, features, means, or instructions for transmitting a configuration message indicating the IAB node to communicate traffic via the IAB node-to-central unit connection with the second central unit of the second network node using the radio resource control connection between the IAB node and the first network node, where the configuration message may be the indication.

In some examples of the method, apparatuses, and non-transitory computer-readable medium described herein, the configuration message includes an internet protocol address configuration for selection of an internet protocol address for communications via the IAB node-to-central unit connection with the second central unit of the second network node.

Some examples of the method, apparatuses, and non-transitory computer-readable medium described herein may further include operations, features, means, or instructions for receiving, from the second network node, the IAB node, or a core network node a request to relay the traffic via the IAB node-to-central unit connection and transmitting a positive acknowledgment in response to the request, where the first network node relays the traffic based on transmitting the positive acknowledgment.

Some examples of the method, apparatuses, and non-transitory computer-readable medium described herein may further include operations, features, means, or instructions for transmitting, to the second network node or a core network node via which the traffic may be relayed, a message indicating that the traffic may be discontinued.

In some examples of the method, apparatuses, and non-transitory computer-readable medium described herein, the message includes an indication to release an identifier associated with the IAB node.

Some examples of the method, apparatuses, and non-transitory computer-readable medium described herein may further include operations, features, means, or instructions for receiving a message indicating a capability of a core network node to relay traffic via the IAB node-to-central unit connection, where the traffic may be relayed via the core network node based on the capability of the core network node.

Some examples of the method, apparatuses, and non-transitory computer-readable medium described herein may further include operations, features, means, or instructions for communicating, with the second network node, an internet protocol address configuration for the IAB node-to-central unit connection, or a request for the internet protocol address configuration for the IAB node-to-central unit connection.

Some examples of the method, apparatuses, and non-transitory computer-readable medium described herein may further include operations, features, means, or instructions for configuring the IAB node with an internet protocol address for the IAB node-to-central unit connection with the second central unit of the second network node.

In some examples of the method, apparatuses, and non-transitory computer-readable medium described herein, the traffic includes a first identifier of the second network node, a second identifier of a core network node associated with the IAB node, or a third identifier of the IAB node.

In some examples of the method, apparatuses, and non-transitory computer-readable medium described herein, the traffic may be relayed using a user equipment (UE)-associated message or a non-UE associated message, and the UE-associated message may be associated with the IAB node.

In some examples of the method, apparatuses, and non-transitory computer-readable medium described herein, the traffic may be relayed via a base station interface with the second network node or a core network node interface.

In some examples of the method, apparatuses, and non-transitory computer-readable medium described herein, the traffic may be included in a non-access stratum container corresponding to the radio resource control connection.

In some examples of the method, apparatuses, and non-transitory computer-readable medium described herein, the traffic includes an F1-application protocol message, a stream control transmission protocol message, or an internet protocol packet.

In some examples of the method, apparatuses, and non-transitory computer-readable medium described herein, the traffic may be related to establish or re-establish the IAB node-to-central unit connection with the second central unit of the second network node.

In some examples of the method, apparatuses, and non-transitory computer-readable medium described herein, the first network node may be a first base station or a first IAB-donor node, or the second network node may be a second base station or a second IAB-donor node.

A method for wireless communications at a first network node is described. The method may include receiving an indication of a handover of an IAB node between a second network node to the first network node, determining, based on the indication, an address for forwarding traffic from the first network node to the IAB node via the second network node using an IAB node-to-central unit connection between a first central unit of the first network node and the IAB node, where the address is different from an IAB node address indicative of the IAB node, and transmitting the traffic to the address determined by the first network node.

A first network node for wireless communications (e.g., an apparatus for wireless communications at a first network node) is described. The first network node may include a memory, and at least one processor coupled to the memory. The at least one processor may be configured to receive an indication of a handover of an IAB node between a second network node to the first network node, determine, based on the indication, an address for forwarding traffic from the first network node to the IAB node via the second network node using an IAB node-to-central unit connection between a first central unit of the first network node and the IAB node, where the address is different from an IAB node address indicative of the IAB node, and transmit the traffic to the address determined by the first network node.

Another apparatus for wireless communications at a first network node is described. The apparatus may include means for receiving an indication of a handover of an IAB node between a second network node to the first network node, means for determining, based on the indication, an address for forwarding traffic from the first network node to the IAB node via the second network node using an IAB node-to-central unit connection between a first central unit of the first network node and the IAB node, where the address is different from an IAB node address indicative of the IAB node, and means for transmitting the traffic to the address determined by the first network node.

A non-transitory computer-readable medium storing code for wireless communications at a first network node is described. The non-transitory computer-readable medium may have code for wireless communication stored thereon that, when executed by the first network node, causes the first network node to receive an indication of a handover of an IAB node between a second network node to the first network node, determine, based on the indication, an address for forwarding traffic from the first network node to the IAB node via the second network node using an IAB node-to-central unit connection between a first central unit of the first network node and the IAB node, where the address is different from an IAB node address indicative of the IAB node, and transmit the traffic to the address determined by the first network node.

Some examples of the method, apparatuses, and non-transitory computer-readable medium described herein may further include operations, features, means, or instructions for performing, before the IAB node-to-central unit connection may be established, a handover procedure to hand over the IAB node from the first network node to the second network node, where the first network node may be a source node of the handover and the second network node may be a target node of the handover procedure.

Some examples of the method, apparatuses, and non-transitory computer-readable medium described herein may further include operations, features, means, or instructions for performing, after the IAB node-to-central unit connection may be established, a handover procedure to hand over the IAB node from the second network node to the first network node, where the first network node may be a target node of the handover and the second network node may be a source node of the handover procedure.

Some examples of the method, apparatuses, and non-transitory computer-readable medium described herein may further include operations, features, means, or instructions for preparing to hand over the IAB node from the second network node to the first network node, or from the first network node to the second network node.

Some examples of the method, apparatuses, and non-transitory computer-readable medium described herein may further include operations, features, means, or instructions for determining, based on preparation to hand over, a first identifier of the first network node, and a second identifier of a core network node associated with the IAB node, where the traffic may be transmitted via the core network node based on the first identifier, or the second identifier.

In some examples of the method, apparatuses, and non-transitory computer-readable medium described herein, the first network node prepares to hand over via a base station interface with the second network node, and the first network nodes determines to transmit the traffic via the second network node based on an address of the second network node.

In some examples of the method, apparatuses, and non-transitory computer-readable medium described herein, the first network node prepares to hand over via a core network node interface and the first network node determines to transmit the traffic via a core network node based on an address of the core network node.

Some examples of the method, apparatuses, and non-transitory computer-readable medium described herein may further include operations, features, means, or instructions for transmitting, to the second network node, or a core network node, a request for the second network node to relay the traffic via the IAB node-to-central unit connection and receiving a positive acknowledgment in response to the request, where the traffic may be transmitted based on the positive acknowledgment, and the first network node receives the traffic based on the positive acknowledgment.

Some examples of the method, apparatuses, and non-transitory computer-readable medium described herein may further include operations, features, means, or instructions for transmitting, to the second network node, or a core management network node via which the traffic may be transmitted, a message indicating that the traffic may be discontinued.

In some examples of the method, apparatuses, and non-transitory computer-readable medium described herein, the message includes an indication to release an identifier associated with the IAB node.

Some examples of the method, apparatuses, and non-transitory computer-readable medium described herein may further include operations, features, means, or instructions for receiving a message indicating a capability of a core network node to relay the traffic via the IAB node-to-central unit connection, where the traffic may be transmitted via the core network node based on the capability of the core network node.

Some examples of the method, apparatuses, and non-transitory computer-readable medium described herein may further include operations, features, means, or instructions for communicating, with the second network node, an internet protocol address configuration for the IAB node-to-central unit connection, or a request for the internet protocol address configuration for the IAB node-to-central unit connection.

Some examples of the method, apparatuses, and non-transitory computer-readable medium described herein may further include operations, features, means, or instructions for configuring the IAB node with an internet protocol address for the IAB node-to-central unit connection between the first central unit of the first network node and the IAB node.

Some examples of the method, apparatuses, and non-transitory computer-readable medium described herein may further include operations, features, means, or instructions for receiving a protocol data unit of the traffic from the address.

In some examples of the method, apparatuses, and non-transitory computer-readable medium described herein, the traffic includes a first identifier of the first network node, a second identifier of a core network node associated with the IAB node, or a third identifier of the IAB node.

In some examples of the method, apparatuses, and non-transitory computer-readable medium described herein, the traffic may be transmitted using a UE-associated message or a non-UE associated message, and the UE-associated message may be associated with the IAB node.

In some examples of the method, apparatuses, and non-transitory computer-readable medium described herein, the traffic includes an F1-application protocol message, a stream control transmission protocol message, or an internet protocol packet.

In some examples of the method, apparatuses, and non-transitory computer-readable medium described herein, the traffic may be transmitted to establish or re-establish the IAB node-to-central unit connection with the first central unit of the first network node.

In some examples of the method, apparatuses, and non-transitory computer-readable medium described herein, the first network node may be a first base station or a first IAB-donor node, or the second network node may be a second base station or a second IAB-donor node.

A method for wireless communications at a core network node is described. The method may include receiving, from a first network node, control information indicative that the core network node is to forward one or more containers of an IAB node-to-central unit connection of an IAB node, where the control information includes a first identifier associated with the IAB node and a second identifier associated with a second network node, transmitting the one or more containers to the second network node based on the second identifier being included in the control information, caching the control information that indicates that the core network node is to forward the one or more containers, the first identifier, the second identifier, and a third identifier associated with the first network node, and transmitting, to the first network node associated with the third identifier or to the second network node associated with the second identifier, one or more other containers associated with the first identifier.

A core network node for wireless communications (e.g., an apparatus for wireless communications at a core network node) is described. The core network node may include a memory, and at least one processor coupled to the memory. The at least one processor may be configured to receive, from a first network node, control information indicative that the core network node is to forward one or more containers of an IAB node-to-central unit connection of an IAB node, where the control information includes a first identifier associated with the IAB node and a second identifier associated with a second network node, transmit the one or more containers to the second network node based on the second identifier being included in the control information, cache the control information that indicates that the core network node is to forward the one or more containers, the first identifier, the second identifier, and a third identifier associated with the first network node, and transmit, to the first network node associated with the third identifier or to the second network node associated with the second identifier, one or more other containers associated with the first identifier.

Another apparatus for wireless communications at a core network node is described. The apparatus may include means for receiving, from a first network node, control information indicative that the core network node is to forward one or more containers of an IAB node-to-central unit connection of an IAB node, where the control information includes a first identifier associated with the IAB node and a second identifier associated with a second network node, means for transmitting the one or more containers to the second network node based on the second identifier being included in the control information, means for caching the control information that indicates that the core network node is to forward the one or more containers, the first identifier, the second identifier, and a third identifier associated with the first network node, and means for transmitting, to the first network node associated with the third identifier or to the second network node associated with the second identifier, one or more other containers associated with the first identifier.

A non-transitory computer-readable medium storing code for wireless communications at a core network node is described. The non-transitory computer-readable medium may have code for wireless communication stored thereon that, when executed by the core network node, causes the core network node to receive, from a first network node, control information indicative that the core network node is to forward one or more containers of an IAB node-to-central unit connection of an IAB node, where the control information includes a first identifier associated with the IAB node and a second identifier associated with a second network node, transmit the one or more containers to the second network node based on the second identifier being included in the control information, cache the control information that indicates that the core network node is to forward the one or more containers, the first identifier, the second identifier, and a third identifier associated with the first network node, and transmit, to the first network node associated with the third identifier or to the second network node associated with the second identifier, one or more other containers associated with the first identifier.

In some examples of the method, apparatuses, and non-transitory computer-readable medium described herein, receiving the control information may include operations, features, means, or instructions for receiving a request to forward the one or more containers to or from the second network node based on the second identifier being included in the control information.

Some examples of the method, apparatuses, and non-transitory computer-readable medium described herein may further include operations, features, means, or instructions for transmitting an acknowledgment message in response to the request.

In some examples of the method, apparatuses, and non-transitory computer-readable medium described herein, transmitting the one or more containers, or the one or more other containers may include operations, features, means, or instructions for transmitting the one or more containers, or the one or more other containers based on the acknowledgment message.

Some examples of the method, apparatuses, and non-transitory computer-readable medium described herein may further include operations, features, means, or instructions for transmitting a message indicating a capability of the core network node to relay traffic to the first network node, or the second network node via the IAB node-to-central unit connection, where communication of the control information, the one or more containers, or the one or more other containers may be based on the capability of the core network node.

Some examples of the method, apparatuses, and non-transitory computer-readable medium described herein may further include operations, features, means, or instructions for receiving a message indicating a capability of the second network node to relay traffic via the IAB node-to-central unit connection, where the control information, the one or more containers, or the one or more other containers may be relayed to the second network node based on the capability of the second network node.

Some examples of the method, apparatuses, and non-transitory computer-readable medium described herein may further include operations, features, means, or instructions for receiving, from the first network node, or the second network node a release message indicating the core network node to release the cached information, where the release message includes an identifier associated with the one or more containers or the first identifier.

Some examples of the method, apparatuses, and non-transitory computer-readable medium described herein may further include operations, features, means, or instructions for relaying the release message to the first network node or the second network node.

In some examples of the method, apparatuses, and non-transitory computer-readable medium described herein, the first network node may be a source node of a handover procedure in which the IAB node may be handed over from the first network node to the second network node.

In some examples of the method, apparatuses, and non-transitory computer-readable medium described herein, the second network node may be a source node of a handover procedure in which the IAB node may be handed over from the second network node to the first network node.

In some examples of the method, apparatuses, and non-transitory computer-readable medium described herein, the control information, the one or more containers, or the one or more other containers may be included in a non-access stratum message.

In some examples of the method, apparatuses, and non-transitory computer-readable medium described herein, the first network node corresponds to a type of network node or the second network node corresponds to the type of network node, the type of network node may be an IAB node type.

In some examples of the method, apparatuses, and non-transitory computer-readable medium described herein, the first identifier associated with the IAB node may be indicated by the first network node or the second network node.

In some examples of the method, apparatuses, and non-transitory computer-readable medium described herein, the control information includes a handover requirement indicator, a request to create a UE context, a handover request acknowledge indicator, a response to an indication to create a UE context, a notification of a handover procedure, a notification of receiving a notification of a handover procedure, an acknowledgment associated with a notification of a handover procedure, or an indication of completion of a release of a UE context.

In some examples of the method, apparatuses, and non-transitory computer-readable medium described herein, the core network node may be an access and mobility management function or a mobility management entity.

In some examples of the method, apparatuses, and non-transitory computer-readable medium described herein, the first network node may be a first base station or a first IAB-donor node, or the second network node may be a second base station or a second IAB-donor node.

In some examples of the method, apparatuses, and non-transitory computer-readable medium described herein, the first network node, or the second network node may be a second core network node.

A method for wireless communication performed by a first network node is described. The method may include participating in establishment of a communication path between an IAB node and a central unit of a second network node via a core network node, where the communication path is an IAB node-to-central unit connection and forwarding traffic between the IAB node and the central unit via the core network node using the IAB node-to-central unit connection.

A first network node for wireless communications (e.g., an apparatus for wireless communications performed by a first network node) is described. The first network node may include a memory, and at least one processor coupled to the memory. The first network node may be configured to participate in establishment of a communication path between an IAB node and a central unit of a second network node via a core network node, where the communication path is an IAB node-to-central unit connection and forward traffic between the IAB node and the central unit via the core network node using the IAB node-to-central unit connection.

Another apparatus for wireless communication performed by a first network node is described. The apparatus may include means for participating in establishment of a communication path between an IAB node and a central unit of a second network node via a core network node, where the communication path is an IAB node-to-central unit connection and means for forwarding traffic between the IAB node and the central unit via the core network node using the IAB node-to-central unit connection.

A non-transitory computer-readable medium storing code for wireless communication performed by a first network node is described. The code may include instructions executable by a processor to participate in establishment of a communication path between an IAB node and a central unit of a second network node via a core network node, where the communication path is an IAB node-to-central unit connection and forward traffic between the IAB node and the central unit via the core network node using the IAB node-to-central unit connection.

In some examples of the method, apparatuses, and non-transitory computer-readable medium described herein, participating in the establishment of the communication path may include operations, features, means, or instructions for establishing a radio resource control connection with the IAB node, where the radio resource control connection may be between a first central unit of the first network node and the IAB node and transmitting, to the IAB node, first control information indicating that the IAB node may be to establish the IAB node-to-central unit connection with the second central unit of the second network node via the radio resource control connection between the IAB node and the first network node, where the first control information may be associated with a handover of the IAB node between the first network node and the second network node.

Some examples of the method, apparatuses, and non-transitory computer-readable medium described herein may further include operations, features, means, or instructions for performing a first handover procedure to hand over the IAB node from the first network node to the second network node after the IAB node-to-central unit connection may be established, or a second handover procedure to hand over the IAB node from the second network node to the first network node before the IAB node-to-central unit connection may be established.

Some examples of the method, apparatuses, and non-transitory computer-readable medium described herein may further include operations, features, means, or instructions for preparing to hand over the IAB node from the second network node to the first network node, or from the first network node to the second network node, determining, based on preparing to hand over, a first identifier of the second network node, and a second identifier of the core network node, and forwarding the traffic via the IAB node-to-central unit connection via the core network node based on the first identifier or the second identifier.

In some examples of the method, apparatuses, and non-transitory computer-readable medium described herein, transmitting the first control information may include operations, features, means, or instructions for transmitting a configuration message indicating the IAB node to communicate traffic via the IAB node-to-central unit connection with the second central unit of the second network node using the radio resource control connection between the IAB node and the first network node, where the configuration message may be the first control information and includes an internet protocol address configuration for selection of an internet protocol address for communications via the IAB node-to-central unit connection with the second central unit of the second network node and configuring the IAB node with the internet protocol address for the IAB node-to-central unit connection with the second central unit of the second network node.

Some examples of the method, apparatuses, and non-transitory computer-readable medium described herein may further include operations, features, means, or instructions for receiving, from the second network node, the IAB node, or the core network node a request to forward the traffic via the IAB node-to-central unit connection and transmitting a positive acknowledgment in response to the request, where forwarding the traffic may be based on transmitting the positive acknowledgment.

Some examples of the method, apparatuses, and non-transitory computer-readable medium described herein may further include operations, features, means, or instructions for transmitting, to the second network node or the core network node via which the traffic may be forwarded, a message indicating that the traffic may be discontinued, the message including an indication to release an identifier associated with the IAB node.

In some examples of the method, apparatuses, and non-transitory computer-readable medium described herein, communicating, with the second network node, an internet protocol address configuration for the IAB node-to-central unit connection, or a request for the internet protocol address configuration for the IAB node-to-central unit connection.

In some examples of the method, apparatuses, and non-transitory computer-readable medium described herein, participating in the establishment of the communication path may include operations, features, means, or instructions for receiving an indication of a handover of the IAB node between the first network node and a third network node and determining, based on the indication, an address for forwarding the traffic from the first network node to the IAB node via the third network node using the IAB node-to-central unit connection, where the address may be different from an IAB node address indicative of the IAB node.

Some examples of the method, apparatuses, and non-transitory computer-readable medium described herein may further include operations, features, means, or instructions for performing a first handover procedure to hand over the IAB node from the first network node to the third network node before the IAB node-to-central unit connection may be established, or a second handover procedure to hand over the IAB node from the third network node to the first network node after the IAB node-to-central unit connection may be established.

Some examples of the method, apparatuses, and non-transitory computer-readable medium described herein may further include operations, features, means, or instructions for preparing to hand over the IAB node from the third network node to the first network node, or from the first network node to the third network node, determining, based on preparation to hand over, a first identifier of the first network node, and a second identifier of the core network node, and forwarding the traffic via the core network node based on the first identifier, or the second identifier.

In some examples of the method, apparatuses, and non-transitory computer-readable medium described herein, preparing to hand over may include operations, features, means, or instructions for preparing to hand over via a network node interface with the third network node and determining to forward the traffic via the third network node based on a second address of the third network node.

In some examples of the method, apparatuses, and non-transitory computer-readable medium described herein, preparing to hand over may include operations, features, means, or instructions for preparing to hand over via a core network node interface and determining to forward the traffic via the core network node based on a second address of the core network node.

Some examples of the method, apparatuses, and non-transitory computer-readable medium described herein may further include operations, features, means, or instructions for transmitting, to the third network node, or the core network node, a request for the third network node to forward the traffic via the IAB node-to-central unit connection, receiving a positive acknowledgment in response to the request, forward the traffic based on the positive acknowledgment, and receiving the traffic based on the positive acknowledgment.

Some examples of the method, apparatuses, and non-transitory computer-readable medium described herein may further include operations, features, means, or instructions for transmitting, to the third network node, or the core network node via which the traffic may be forwarded, a message indicating that the traffic may be discontinued, the message including a second indication to release an identifier associated with the IAB node.

In some examples of the method, apparatuses, and non-transitory computer-readable medium described herein, communicating, with the third network node, an internet protocol address configuration for the IAB node-to-central unit connection, or a request for the internet protocol address configuration for the IAB node-to-central unit connection and configuring the IAB node with an internet protocol address for the IAB node-to-central unit connection.

Some examples of the method, apparatuses, and non-transitory computer-readable medium described herein may further include operations, features, means, or instructions for receiving a protocol data unit of the traffic from the address.

Some examples of the method, apparatuses, and non-transitory computer-readable medium described herein may further include operations, features, means, or instructions for receiving a message indicating a capability of the core network node to relay traffic via the IAB node-to-central unit connection and relaying the traffic via the core network node based on the capability of the core network node.

In some examples of the method, apparatuses, and non-transitory computer-readable medium described herein, the traffic includes a first identifier of the first network node, a second identifier of the second network node, a third identifier of the core network node associated with the IAB node, or a fourth identifier of the IAB node.

In some examples of the method, apparatuses, and non-transitory computer-readable medium described herein, forwarding the traffic may include operations, features, means, or instructions for forwarding the traffic using a user equipment (UE)-associated message or a non-UE associated message, where the UE-associated message may be associated with the IAB node.

In some examples of the method, apparatuses, and non-transitory computer-readable medium described herein, the traffic includes an F1 application protocol message and the method, apparatuses, and non-transitory computer-readable medium may include further operations, features, means, or instructions for establishing or re-establishing the IAB node-to-central unit connection with the central unit of the second network node.

A method for wireless communication performed by a core network node is described. The method may include receiving, from a first network node, control information indicative that the core network node is to forward one or more containers of an IAB node-to-central unit connection of an IAB node, where the control information includes a first identifier associated with the IAB node and a second identifier associated with a second network node, transmitting the one or more containers to the second network node based on the second identifier being included in the control information, caching the control information that indicates that the core network node is to forward the one or more containers, the first identifier, the second identifier, and a third identifier associated with the first network node, and transmitting, to the first network node associated with the third identifier or to the second network node associated with the second identifier, one or more other containers associated with the first identifier.

A core network node for wireless communications (e.g., an apparatus for wireless communications performed by a core network node) is described. The core network node may include a memory, and at least one processor coupled to the memory. The core network node may be configured to receive, from a first network node, control information indicative that the core network node is to forward one or more containers of an IAB node-to-central unit connection of an IAB node, where the control information includes a first identifier associated with the IAB node and a second identifier associated with a second network node, transmit the one or more containers to the second network node based on the second identifier being included in the control information, cache the control information that indicates that the core network node is to forward the one or more containers, the first identifier, the second identifier, and a third identifier associated with the first network node, and transmit, to the first network node associated with the third identifier or to the second network node associated with the second identifier, one or more other containers associated with the first identifier.

Another apparatus for wireless communication performed by a core network node is described. The apparatus may include means for receiving, from a first network node, control information indicative that the core network node is to forward one or more containers of an IAB node-to-central unit connection of an IAB node, where the control information includes a first identifier associated with the IAB node and a second identifier associated with a second network node, means for transmitting the one or more containers to the second network node based on the second identifier being included in the control information, means for caching the control information that indicates that the core network node is to forward the one or more containers, the first identifier, the second identifier, and a third identifier associated with the first network node, and means for transmitting, to the first network node associated with the third identifier or to the second network node associated with the second identifier, one or more other containers associated with the first identifier.

A non-transitory computer-readable medium storing code for wireless communication performed by a core network node is described. The code may include instructions executable by a processor to receive, from a first network node, control information indicative that the core network node is to forward one or more containers of an IAB node-to-central unit connection of an IAB node, where the control information includes a first identifier associated with the IAB node and a second identifier associated with a second network node, transmit the one or more containers to the second network node based on the second identifier being included in the control information, cache the control information that indicates that the core network node is to forward the one or more containers, the first identifier, the second identifier, and a third identifier associated with the first network node, and transmit, to the first network node associated with the third identifier or to the second network node associated with the second identifier, one or more other containers associated with the first identifier.

In some examples of the method, apparatuses, and non-transitory computer-readable medium described herein, receiving the control information may include operations, features, means, or instructions for receiving a request to forward the one or more containers to or from the second network node based on the second identifier being included in the control information.

Some examples of the method, apparatuses, and non-transitory computer-readable medium described herein may further include operations, features, means, or instructions for transmitting a message indicating a capability of the core network node to relay traffic to the first network node, or the second network node via the IAB node-to-central unit connection, where communication of the control information, the one or more containers, or the one or more other containers may be based on the capability of the core network node.

Some examples of the method, apparatuses, and non-transitory computer-readable medium described herein may further include operations, features, means, or instructions for receiving a message indicating a capability of the second network node to relay traffic via the IAB node-to-central unit connection and relaying the control information, the one or more containers, or the one or more other containers to the second network node based on the capability of the second network node.

Some examples of the method, apparatuses, and non-transitory computer-readable medium described herein may further include operations, features, means, or instructions for receiving, from the first network node, or the second network node a release message indicating the core network node to release the cached information, where the release message includes an identifier associated with the one or more containers or the first identifier and relay the release message to the first network node or the second network node.

In some examples of the method, apparatuses, and non-transitory computer-readable medium described herein, the first network node may be a source node of a first handover procedure in which the IAB node may be handed over from the first network node to the second network node, or the second network node may be the source node of a second handover procedure in which the IAB node may be handed over from the second network node to the first network node.

In some examples of the method, apparatuses, and non-transitory computer-readable medium described herein, the control information, the one or more containers, or the one or more other containers may be included in a non-access stratum message.

A method for wireless communication performed by an IAB node is described. The method may include establishing a radio resource control connection with a first central unit of a first network node, receiving, from the first network node, an indication that the IAB node is to establish an IAB node-to-central unit connection with a second central unit of a second network node via the radio resource control connection between the IAB node and the first network node, where the indication is associated with a handover between the first network node and the second network node, and communicating, with the second network node, via the IAB node-to-central unit connection using the radio resource control connection between the IAB node and the first network node.

An IAB node for wireless communications (e.g., an apparatus for wireless communications performed by an IAB node) is described. The IAB node may include a memory, and at least one processor coupled to the memory. The IAB node may be configured to establish a radio resource control connection with a first central unit of a first network node, receive, from the first network node, an indication that the IAB node is to establish an IAB node-to-central unit connection with a second central unit of a second network node via the radio resource control connection between the IAB node and the first network node, where the indication is associated with a handover between the first network node and the second network node, and communicating, with the second network node, via the IAB node-to-central unit connection used the radio resource control connection between the IAB node and the first network node.

Another apparatus for wireless communication performed by an IAB node is described. The apparatus may include means for establishing a radio resource control connection with a first central unit of a first network node, means for receiving, from the first network node, an indication that the IAB node is to establish an IAB node-to-central unit connection with a second central unit of a second network node via the radio resource control connection between the IAB node and the first network node, where the indication is associated with a handover between the first network node and the second network node, and means for communicating, with the second network node, via the IAB node-to-central unit connection using the radio resource control connection between the IAB node and the first network node.

A non-transitory computer-readable medium storing code for wireless communication performed by an IAB node is described. The code may include instructions executable by a processor to establish a radio resource control connection with a first central unit of a first network node, receive, from the first network node, an indication that the IAB node is to establish an IAB node-to-central unit connection with a second central unit of a second network node via the radio resource control connection between the IAB node and the first network node, where the indication is associated with a handover between the first network node and the second network node, and communicating, with the second network node, via the IAB node-to-central unit connection used the radio resource control connection between the IAB node and the first network node.

BRIEF DESCRIPTION OF THE DRAWINGS

FIGS. 13 through 17 show flowcharts illustrating methods that support F1 connection options in IAB handover scenarios in accordance with one or more aspects of the present disclosure.

DETAILED DESCRIPTION

Figure 1:
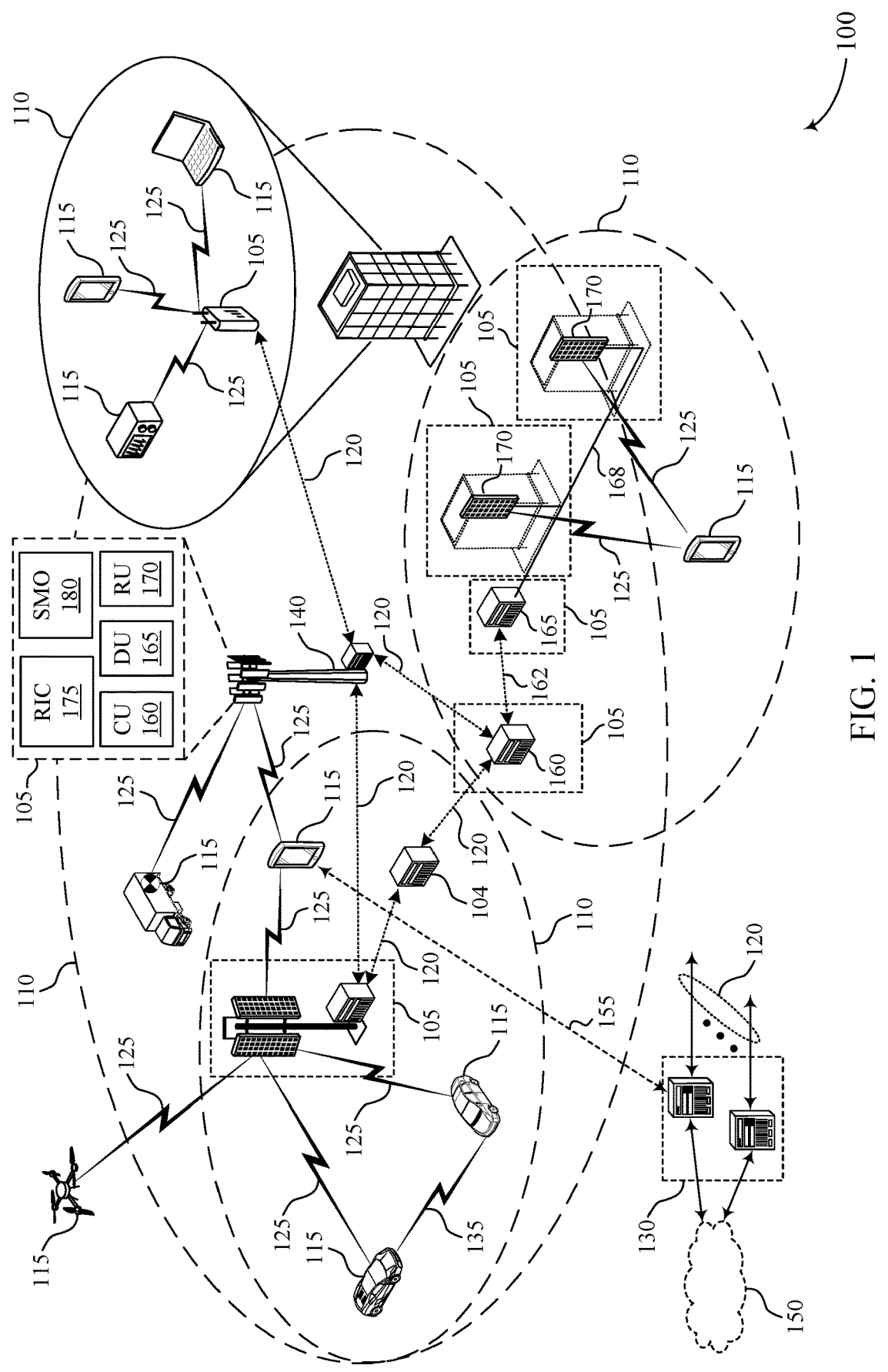
FIG. 1 illustrates an example of a wireless communications system that supports F1 connection options in integrated access and backhaul (IAB) handover scenarios in accordance with one or more aspects of the present disclosure.

An integrated access and backhaul (IAB) node may be a node that acts as a wireless extension of a backhaul network.

In other words, an IAB node may be viewed as a base station that connects wirelessly to other base stations (referred to as donor base stations), and/or other IAB-nodes. The IAB node, like other base stations, may include a core unit (CU) (or central unit) and one or more distributed units (DUs, or IAB-DUs). The CU of an IAB node may also be referred to as an IAB-MT, or mobile termination. For example, the IAB-node may include an IAB-MT, which may support user equipment (UE) functionality by which the IAB-node is scheduled by a "parent" node (e.g., a donor base station, a donor IAB node). Additionally, the IAB-node may include one or more IAB-DU by which the IAB-node schedules one or more "child" nodes, such as UEs, other IAB-nodes, etc. An IAB-donor may include a donor-CU and one or more donor-DUs. A user equipment (UE) may communicate with a donor base station via an IAB node. In some wireless communications systems, the IAB node may be mobile. As such, the IAB node may participate in a handover procedure with different donor base stations. To perform a handover procedure, the IAB node may be handed over from a first donor base station (e.g., a source base station) to a second donor base station (e.g., a target base station).

The handover procedure may include handover of the IAB-MT to the second base station. The IAB-DU, however, may be part of a logical pathway between the UE and the IAB-MT, where the IAB-DU may be responsible for a connection with the base stations via an F1 interface (e.g., an IAB node-to-CU connection). Therefore, upon completion of the IAB-MT handover procedure, the IAB node may establish a new F1 connection with the second base station. Logically, an F1 connection with the second base station is via a different IAB-DU of the IAB node. Therefore, a new logical IAB-DU (e.g., IAB-DUb versus IAB-DUa that supported the original F1 connection with the first base station) may be established to support the new F1 connection with the second base station. Upon completion of the IAB-MT handover procedure and establishment of IAB-DUb, the UE may perform a handover procedure from IAB-DUa to IAB-DUb. However, until the UE gains access to a serving network node (e.g., serving base station, serving IAB donor) via the second (new) F1 interface or a cell associated with the F1 interface via handover to IAB-DUb, there is a need to maintain the F1 connection between the first IAB-DU (IAB-DUa) and the first base station, even after the IAB-MT has dropped its connection with the first base station in favor of the connection with the second base station.

Situations may arise, however, that cause the F1 connection between IAB-DUa and the first base station to be disconnected when the IAB-MT hands over to the second base station and thus the UE would not have access to any serving network nodes via any F1 interfaces for a duration. Without maintaining the first F1 connection for a period of time as part of or at the end of the handover, the UE could experience radio link failure.

To maintain a connection between the UE and a serving network node (via an F1 interface) during IAB-MT handover procedures, one or more logical channels (e.g., a radio resource control (RRC) channel, a non-access stratum (NAS) channel) may be leveraged to forward F1 containers between the UE and a base station to establish a "detour" F1 path. The detour path may be used because the IAB-MT may have already dropped (or will shortly drop) a physical connection with the source base station in favor of a connection with a target base station. In some cases, the F1 detour path may be established prior to the IAB-MT handover procedure (e.g., make-before-break). In this case, an F1 detour path may be established between the IAB-DUb and a target base station (e.g., a first base station) via a logical channel associated with the source base station (e.g., a second base station), such that the source base station forwards an F1 container from IAB-DUb to the target base station, or vice versa. In some cases, the F1 detour path may be established after the IAB-MT handover procedure but before the UE handover procedure (e.g., break-before-make). In this case, an F1 detour path may be established between the IAB-DUa and the source base station (e.g., a first base station) via a logical channel associated with the target base station (e.g., a second base station) such that the target base station forwards an F1 container from IAB-DUa to the source base station, or vice versa.

When the F1 interface between the first base station and the IAB-DUa is established via the detour and in the make-before-break scenario, the IAB-MT will perform handover to the second base station and the UE will then perform handover to IAB-DUb. In the break-before-make scenario, as the IAB-MT already performed the handover to the second base station, the UE will perform handover to IAB-DUb. In either scenario, the UE may perform handover to IAB-DUb and an F1 connection between an IAB-DU and the second base station will be established to support the UE. As such, the F1 connection (e.g., the F1 detour) with the first base station can then be released. Therefore, the detour path may be maintained for an amount of time until the UE is successfully handed over to IAB-DUb to ensure that the UE does not experience radio link failure during such a handover procedure.

Particular aspects of the subject matter described herein may be implemented to realize one or more advantages. The described techniques may support improvements in performing IAB node handover procedures by improving reliability, and decreasing latency, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to F1 connection options in IAB handover scenarios.

FIG. 1 illustrates an example of a wireless communications system 100 that supports F1 connection options in IAB handover scenarios in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an IAB node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes

104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support F1 connection options in IAB handover scenarios as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage NAS functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communication systems 100, an IAB node 104 may act as a wireless extension of a backhaul network. Accordingly, the IAB node 104 may be viewed as a base station that connects wirelessly to other base stations (referred to as donor base stations). A UE 115 may communicate with a donor base station via an IAB node 104. In some cases, an IAB node 104 may be mobile and as such may perform handover procedure from one donor base station to another. Techniques for implementing such a handover procedure may be improved.

In some cases, an IAB node 104 may perform a handover procedure and the IAB inter-donor partial/full migration may require F1 connectivity between an IAB-DU (e.g., a mobile IAB-DU) and a source IAB-donor-CU. Inter-donor partial migration may utilize Xn handover and Xn procedures for traffic migration to the target path. An Xn interface may not always be available however (e.g., between RAN networks of different vendors). For example, when a mobile IAB-node roams from HPLMN to VPLMN, an Xn interface is usually not available. In inter-donor partial migration, F1 traffic between a mobile IAB-DU and source IAB-donor-CU may be routed via the target donor-DU. For this roaming scenario, IP connectivity may be required between the VPLMN's IAB-donor-DU and the HPLMN's IAB-donor-CU (e.g., the PLMNs' backhaul IP networks may need to have interconnectivity). In some cases, however, this is not supported.

In some wireless communications systems, such as wireless communications system 100, techniques may support an F1 connection (e.g., IAB node-to-central unit connection) at an IAB node 104 during IAB handover procedure to maintain a radio link at the UE 115 during the IAB handover procedure. For example, the techniques described herein provide F1 connectivity via the core network between a mobile IAB-DU and a source or target IAB-donor-CU. To maintain an F1 connection to serve a UE 115 during IAB handover procedures, one or more logical channels (e.g., a RRC channel, a NAS channel) may be leveraged to forward F1 containers between the UE 115 and a base station 140 to establish a "detour" F1 path. In some cases, an F1 connection may be established with a target base station 140 in a make-before-break fashion, or may be established with a source base station in a break-before-make fashion. For example, an IAB node 104 may establish an RRC connection with a first central unit 160 of a first network node (e.g., a first base station 140, a first donor base station 140). The IAB node 104 may receive an indication or otherwise determine to establish an F1 connection with a second central unit 160 of a second network node (e.g., a second base station 140, a second donor base station 140) via the RRC connection between the IAB node 104 and the first network node. The IAB node 104 may then communicate, with the second network node, via the F1 connection using the RRC connection between the IAB node 104 and the first network node.

In some cases, a first network node (e.g., a donor base station 140) that forwards F1 containers (e.g., a non-F1 terminating base station) may establish a RRC connection with an IAB node 104, where the RRC connection may be between a first central unit 160 of the first network node and the IAB node 104. The first network node may identify and in some cases, may transmit, to the IAB node 104, first control information indicating that the IAB node 104 is to establish an F1 connection with a second central unit of a second network node (e.g., an F1 terminating base station 140) via the RRC connection between the IAB node 104 and the first network node. The first network node may relay traffic via the F1 connection between the second network node and the IAB node 104 using the RRC connection between the IAB node 104 and the first network node.

In some cases, the second network node (e.g., a donor base station 140, the F1 terminating base station 140) may receive an indication of or otherwise determine a handover of an IAB node 104 from the first network node to the second network node, or vice versa. The second network node may determine, based on the indication, an address for forwarding traffic via the first network node using an F1 connection between a central unit 160 of the second network node and the IAB node 104. The second network node may transmit the traffic to the address. In some cases, the first network node may be the source base station and the second network node may be the target base station, such as in a make-before-break scenario. In some cases, the first network node may be the target base station and the second network node may be the source base station, such as in a break-before-make scenario.

Figure 2:
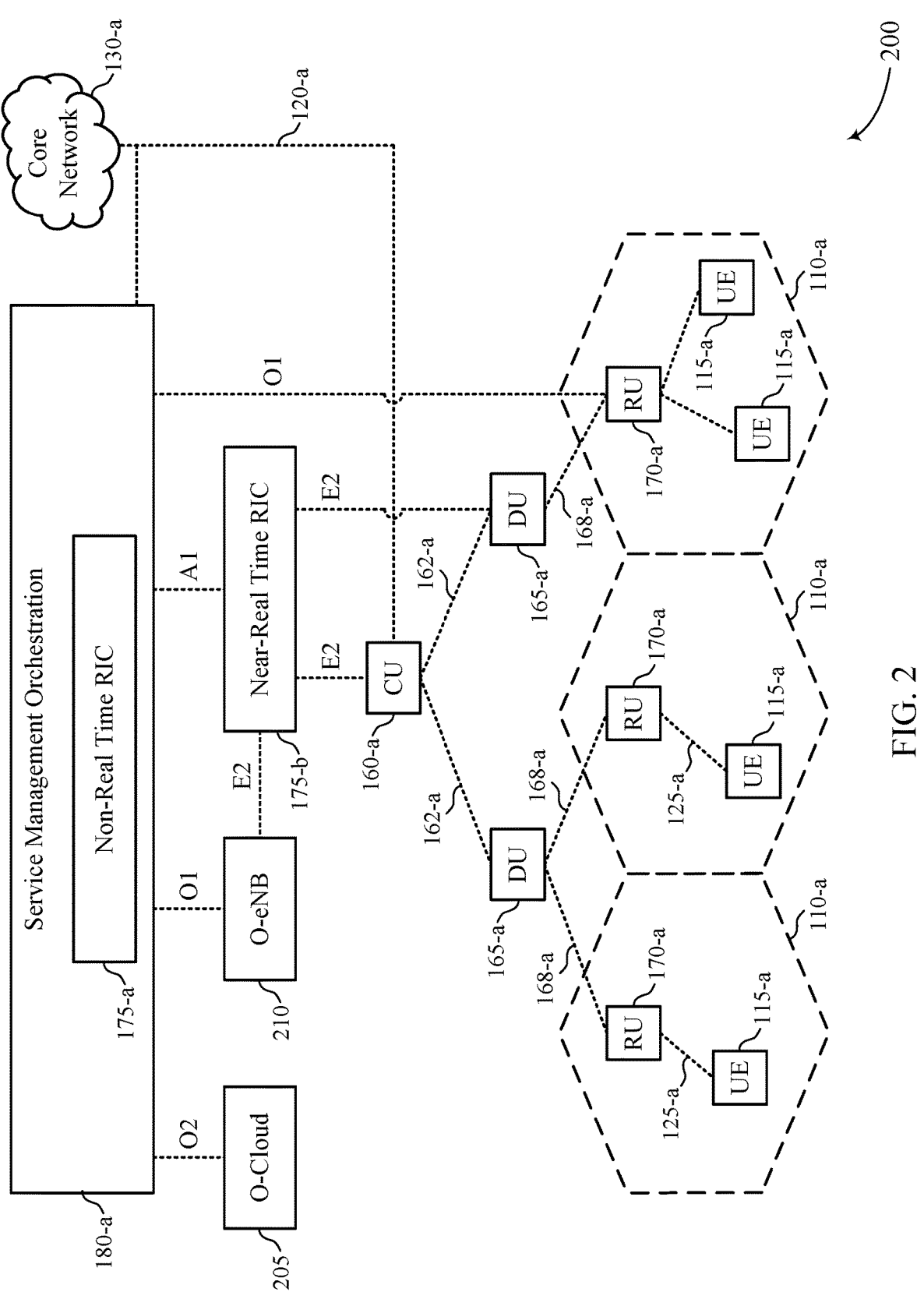
FIG. 2 illustrates an example of a network architecture that supports F1 connection options in IAB handover scenarios in accordance with one or more aspects of the present disclosure.

FIG. 2 illustrates an example of a network architecture 200 (e.g., a disaggregated base station architecture, a disaggregated RAN architecture) that supports F1 connection options in IAB handover scenarios in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some aspects, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some aspects, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some aspects, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) based on a functional split, such as those defined by the 3rd Generation Partnership Project (3GPP). In some aspects, a DU 165-a may further host one or more low PHY layers. Each layer may be implemented with an interface configured to communicate signals with other layers hosted by the DU 165-a, or with control functions hosted by a CU 160-a.

In some aspects, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-*a* may be controlled by the corresponding DU 165-*a*. In some aspects, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an 01 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an AI interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some aspects, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some aspects, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
FIGS. 3 through 6 illustrate examples of wireless communications systems that support F1 connection options in IAB handover scenarios in accordance with one or more aspects of the present disclosure.

FIG. 3 illustrates an example of a wireless communications system 300 that supports F1 connection options in IAB handover scenarios in accordance with one or more aspects of the present disclosure. The wireless communications system 300 may include PLMNs 305 (e.g., PLMN 305-*a*), donor base stations, IAB nodes, and a UE 115 (e.g., UE 115-*a*). A donor base station may include a donor CU 310 (e.g., donor CU 310-*a*, or donor CU 310-*b*) and one or more donor DUs 315 (e.g., donor DU 315-*a*, or donor DU 315-*b*). An IAB node may include an IAB-MT 320 and one or more IAB-DUs 325 (e.g., IAB-DUa 325-*a*, IAB-DUb 325-*b*). The devices included in FIG. 3 may be examples of the corresponding devices as described with reference to FIGS. 1 and 2. Wireless communications system 300 may depict an intra-PLMN handover procedure. In some cases, the devices described with reference to FIG. 3 may perform techniques to maintain radio link connectivity at UE 115-*a* throughout an IAB node handover procedure.

Some wireless communications systems, such as wireless communications system 300, may include one or more IAB devices that may be nodes that act as wireless extensions of a backhaul network, such as to support multi-hop backhauling. In some cases, an IAB device may refer to an IAB donor base station that connects wirelessly to other base stations and may have a wireline connection with the core network. An IAB donor base station, like other base stations, may include a CU (e.g., donor CU 310-*a*, 310-*b*) and one or more DUs (e.g., donor DU 315-*a*, 315-*b*). In some cases, an IAB device may refer to an IAB node that may include IAB-MT 320, or mobile termination (e.g., a CU), and one or more IAB-DUs 325 (e.g., IAB-DUa 325-*a*, IAB-DUb 325-*b*).

A CU and one or more DUs may allow functionality of a device (e.g., an IAB node, an IAB donor base station) to be split across different units of the device. A CU (e.g., donor CU 310, IAB-MT 320) may support PDCP, Radio Resource Control (RRC), or both and may control the operation one or more DUs. A DU (e.g., donor DU 315, IAB-DU 325) may be a logical node that includes the Radio Link Control (RLC), Medium Access Control (MAC), and Physical layer (PHY) protocols and may control one or more child IAB nodes, one or more UEs. etc. The interface between a CU and DU may be referred to as an F1 interface, which may define the higher layer protocols and may support control plane (e.g., F1 control plane (F1-C) interface) and user plane (e.g., F1 user plane (F1-U) interface) separation. An F1 interface may enable exchange of UE associated information and non-UE associated information to provide control plane signaling and user plane signaling for the downstream UE 115-*a*.

For example, an IAB donor may connect with the core network (e.g., PLMN 305, AMF) via non-IAB backhaul and may use the IAB donor-DU to wirelessly serve one or more UEs 115, one or more IAB nodes, or a combination thereof. In some cases, a UE 115 may communicate with a donor base station, and ultimately the core network, via one or more IAB nodes. In such cases, an IAB-MT 320 may be controlled by a donor DU 315, and UE 115-*a* may be served by IAB-DUa 325, where an F1 interface that supports communications at the UE 115-*a* may extend from an IAB-DU 325 to the donor CU 310.

In some wireless communications systems, the IAB node may be mobile. For example, the IAB node may be mounted to a vehicle (e.g., a bus, train, plane, car) to serve passengers of the vehicle and/or to serve pedestrians outside of the vehicle. In such cases, the IAB node may move across a wide geographical area, and therefore may move into areas served by different networks, served by different base stations (of the same or different vendor), etc. The IAB node may therefore perform handover procedures as the IAB nodes moves. For example, FIG. 3 may depict an intra-PLMN handover procedure in which an IAB node may perform a handover procedure from a first donor base station (e.g., donor CU 310-*a* and at least donor DU 315-*a*) to a second donor base station (e.g., donor CU 310-*b* and at least donor DU 315-*b*) that are both associated with the same core network (e.g., PLMN 305). Because the first donor base station and the second donor base station are associated with the same core network, IP connectivity may be available between the first donor base station and the second donor base station.

Therefore, the IAB-MT 320 may perform handover to donor DU 315-*b* but it may not be sufficient to handover the IAB-MT 320 to the donor DU 315-*b* and still maintain connectivity with UE 115-*a*. Rather, a connection between an IAB-DU 235 may need to be established with the target donor base station so as to establish F1 connectivity between the target donor base station and the IAB node which carries control signaling and user plane signaling for the downstream UE 115-*a*. The IAB-DU is logical, however, so a new logical IAB-DUb 325-*b* is created when an IAB-MT performs handover to a target donor in order to establish a new F1 interface with the target donor. Upon establishing IAB-DUb 325-*b*, the UE 115-*a* may perform a handover procedure to IAB-DUb 325-*b*. Until the UE 115-*a* is connected with IAB-DUb 325-*b* however, there is a need to maintain the F1 connection between IAB-DUa 325-*a* and donor CU 310-*a*. For example, the F1 interface between IAB-DUa 325-*a* and donor CU 310-*a* may be established via donor DU 315-*b* due to the Xn interface IP connectivity, or both between the target donor and the source donor. When the UE 115-*a* and/or one or more other UEs 115 are connected with IAB-DUa 325-*a*, the F1 connection between IAB-DUa 325-*a* and donor CU 310-*a* may be released. Such a procedure may be referred to as partial migration.

In some cases, however, the Xn interface, the IP connectivity, etc., between the target donor and the source donor may not be available to support the F1 connection between IAB-DUa 325-*a* and donor CU 310-*a* via donor DU 315-*b*. For example, the source and target IAB donors may be associated with different vendors and it therefore may be expensive or not possible to interface between the target and source base stations. Therefore, when the IAB-MT 320 hands over to the target base station, the XN connection may not be available because there is no IP connectivity between the target and source donors of different vendors. Therefore, the IAB node may lose connection with the backhaul and so the UE 115 may experience radio link failure.

To maintain a connection between the UE 115 and a serving network node (via an F1 interface) during IAB-MT handover procedures, one or more logical channels (e.g., a RRC channel, a NAS channel) may be leveraged to forward F1 containers between an IAB node serving a UE and a donor base station to establish a "detour" F1 path. For example, an F1 detour path may be established between IAB-DUa 325-*a* and donor CU 310-*a* via donor DU 315-*b*, donor CU 310-*b*, PLMN 305, or a combination thereof. In such cases, F1 containers (e.g., F1-C containers) may be forwarded via a connection (e.g., RRC, NAS, F1) between the IAB node and the donor DU 315-*b*, donor CU 310-*b*, and PLMN 305 to donor CU 310-*a*. In some cases, donor DU 315-*a* and donor CU 310-*a* may be associated with a target donor (e.g., the IAB node is performing handover to donor CU 310-*a* and donor DU 315-*a*) and the IAB node establishes the F1 detour with donor CU 310-*a* in a make-before-break fashion. In some cases, donor DU 315-*a* and donor CU 310-*a* may be associated with a source donor (e.g., the IAB node is performing handover to donor CU 310-*b* and donor DU 315-*b*) and the IAB node establishes the F1 detour with donor CU 310-*a* in a break-before-make fashion.

Figure 4:
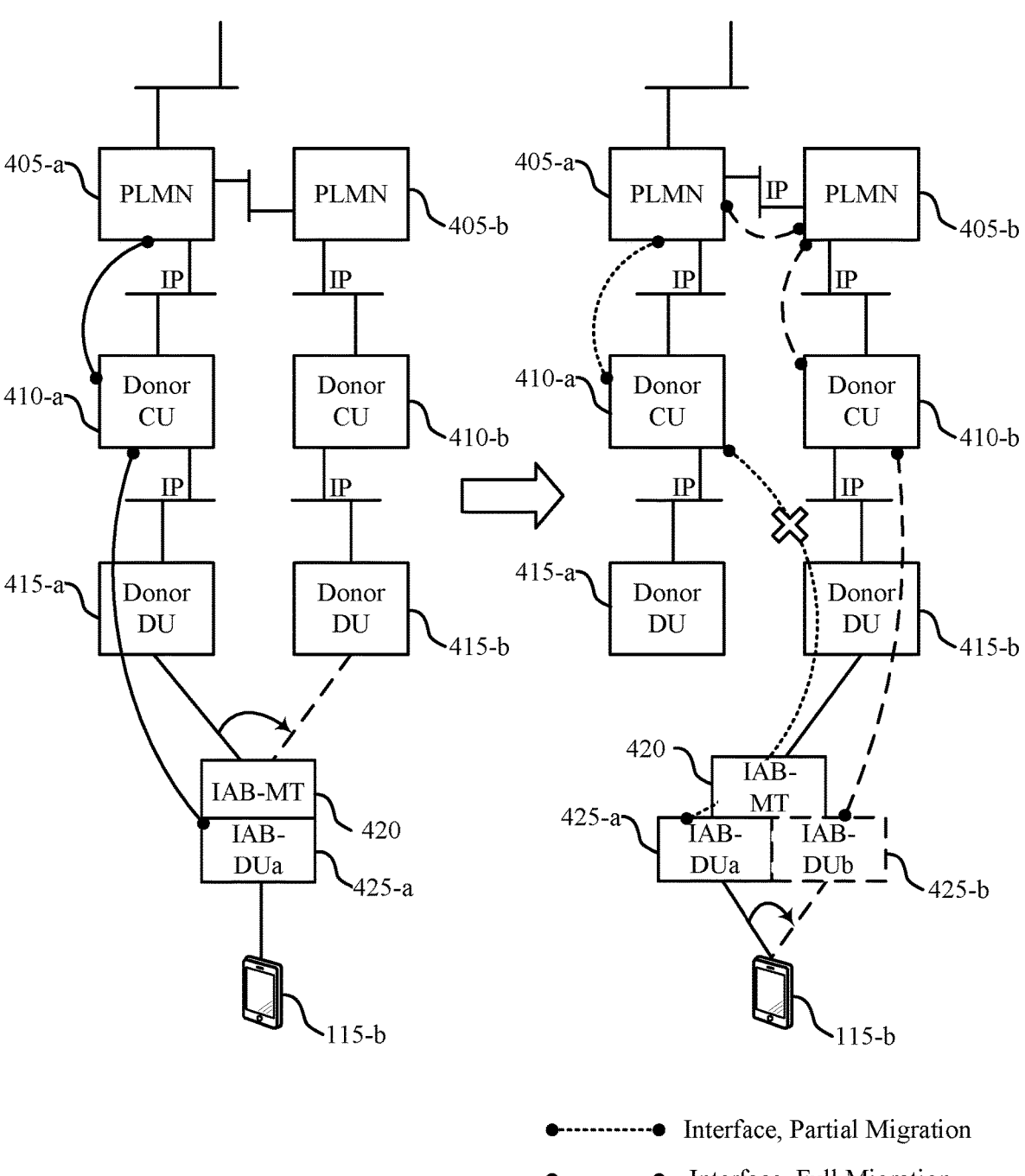

FIG. 4 illustrates an example of a wireless communications system 400 that supports F1 connection options in IAB handover scenarios in accordance with one or more aspects of the present disclosure. The wireless communications system 400 may include PLMNs 405 (e.g., PLMNs 405-*a* and 405-*b*), donor base stations, IAB nodes, and a UE 115 (e.g., UE 115-*b*). A donor base station may include a donor CU 410 (e.g., donor CU 410-*a*, or donor CU 410-*b*) and one or more donor DUs 415 (e.g., donor DU 415-*a*, or donor 415-*b*). An IAB node may include an IAB-MT 420 and one or more IAB-DUs 425 (e.g., IAB-DUa 425-*a*, IAB-DUb 425-*b*). The devices included in FIG. 4 may be examples of the corresponding devices as described with reference to FIGS. 1 through 3. Wireless communications system 400 may depict an inter-PLMN handover procedure. In some cases, the devices described with reference to FIG. 4 may perform techniques to maintain radio link connectivity at UE 115-*b* throughout an IAB node handover procedure.

As described with reference to FIG. 2, an IAB node may be mobile and may therefore perform handover procedures as the IAB nodes moves. For example, FIG. 4 may depict an inter-PLMN handover procedure in which an IAB node may perform a handover procedure from a first donor base station (e.g., donor CU 410-*a* and at least donor DU 415-*a*) associated with a first network (e.g., PLMN 405-*a*) to a second donor base station (e.g., donor CU 410-*b* and at least donor DU 415-*b*) associated with a second network (e.g., PLMN 405-*b*). Because the first donor base station and the second donor base station are associated with the different core networks, an Xn interface, IP connectivity, etc. may not be available between the first donor base station and the second donor base station.

Therefore, the IAB-MT 420 may perform handover to donor DU 415-*b* but the F1 connection (e.g., F1 connection) between IAB-DUa and donor CU 410-*a* may be disconnected as a result of the IAB-MT handover. Accordingly, the IAB node may lose backhaul connection and the UE 115-*b* may detect that the UE 115-*b* is no longer able to transmit or receive communications as the connection was lost (e.g., radio link failure). To mitigate radio link failure at the UE 115-*b*, the wireless communication system 400 may perform procedures to establish an F1 path between IAB-DUa 425-*a* and donor CU 410-*a* to support the IAB-DUa 425-*a* until after UE 115-*b* is handed over to IAB-DUb 425-*b*, such as path other than a direct path between donor CU 410-*a* and IAB-DUa 425-*a* via donor DU 415-*b* because connectivity (e.g., IP connectivity) between the two donors may not exist.

To maintain a connection between the UE and a serving network node (via an F1 interface) during IAB-MT handover procedures, one or more logical channels (e.g., a RRC channel, a NAS channel) may be leveraged to forward F1 containers associated with the UE 115 between an IAB node and a donor base station to establish a "detour" F1 path. For example, an F1 detour path may be established between IAB-DUa 425-*a* and donor CU 410-*a* via donor DU 415-*b*, donor CU 410-*b*, PLMN 405-*b*, PLMN 405-*a*, or a combination thereof. In such cases, F1 containers (e.g., F1-C containers) may be forwarded via a connection (e.g., RRC, NAS, F1) between the IAB node and the donor DU 415-*b*, donor CU 410-*b*, PLMN 405-*b*, and PLMN 405-*a*, to donor CU 410-*a*. In some cases, F1 containers may be forwarded via donor DU 415-*b* towards donor CU 410-*a*, where the detour may go directly to donor CU 410-*a* or via one or more core networks (e.g., PLMNs 405). The case where the detour path is via CU 410-*b* to CU 410-*a* (e.g., via an Xn interface), without going through the core network may enable an alternative path or means to transport F1 traffic (e.g., F1-C traffic). In some cases, donor DU 415-*a* and donor CU 410-*a* may be associated with a target donor (e.g., the IAB node is performing handover to donor CU 410-*a* and donor DU 415-*a*) and the IAB node establishes the F1 detour with donor CU 410-*a* in a make-before-break fashion. In some cases, donor DU 415-*a* and donor CU 410-*a* may be associated with a source donor (e.g., the IAB node is performing handover to donor CU 410-*b* and donor DU 415-*b*) and the IAB node establishes the F1 detour with donor CU 410-*a* in a break-before-make fashion.

Partial migration may refer to the process of the IAB-MT 420 performing handover to donor DU 415-*a*, donor DU 415-*b*, or a parent intermediate node between the IAB-node and the target donor, for example, while the F1 traffic is supported by IAB-DUa 425-*a*. In partial migration, an original F1 interface may be rerouted to source CU via target topology. Full migration may refer to the completion of the UE 115-*b* performing successful hand over to IAB-DUb 425-*b*. For example, full migration may refer to switching the donor CU endpoint of the F1 connection of the IAB node (or establishing a new F1 connection to a new donor. The original F1 connection may or may not be released.

Figure 5:
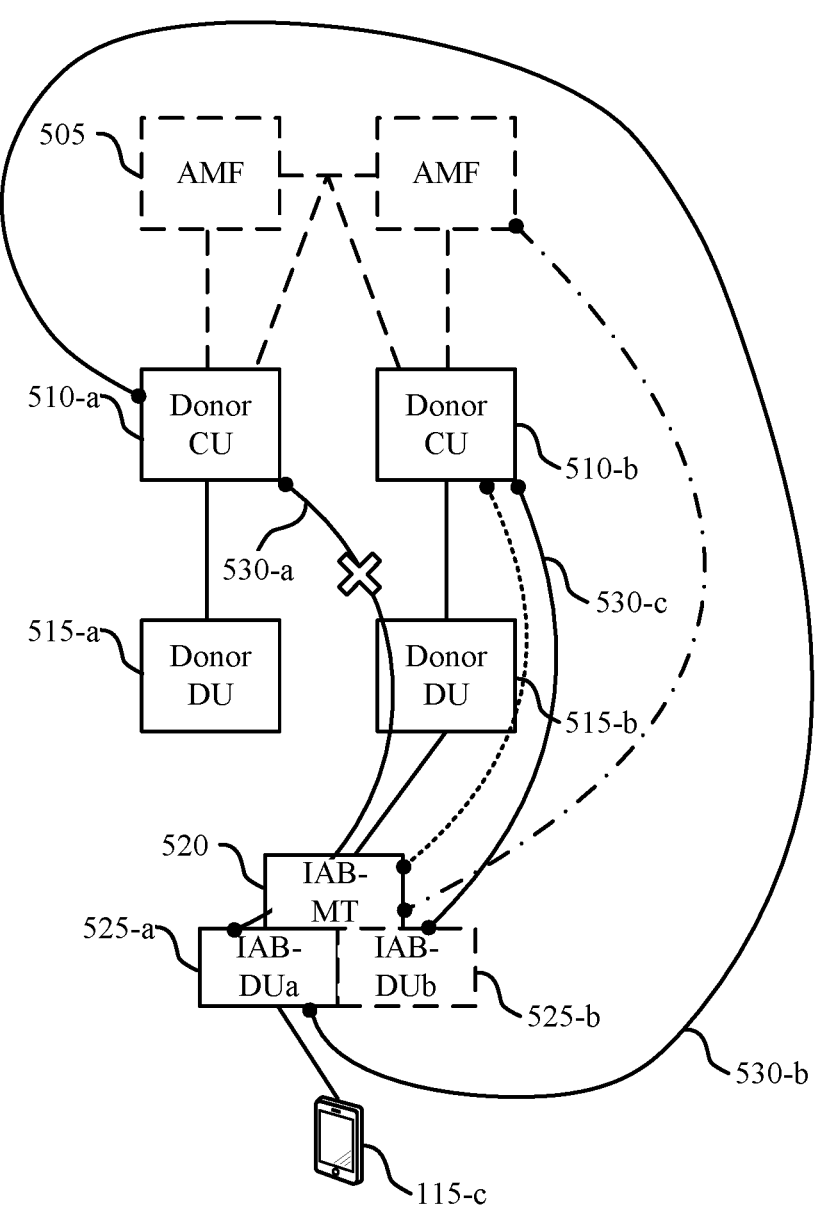

FIG. 5 illustrates an example of a wireless communications system 500 that supports F1 connection options in IAB handover scenarios in accordance with one or more aspects of the present disclosure. The wireless communications system 500 may include one or more AMFs 505, donor base stations, IAB nodes, and a UE 115 (e.g., UE 115-*c*). A donor base station may include a donor CU 510 (e.g., donor CU 510-*a*, or donor CU 510-*b*) and one or more donor DUs 515 (e.g., donor DU 515-*a*, or donor DU 515-*b*). An IAB node may include an IAB-MT 520 and one or more IAB-DUs 525 (e.g., IAB-DUa 525-*a*, IAB-DUb 525-*b*). The devices included in FIG. 5 may be examples of the corresponding devices as described with reference to FIGS. 1 through 4. Wireless communications system 500 may depict an inter-PLMN, or intra-PLMN handover procedure. In some cases, the devices described with reference to FIG. 5 may perform techniques to maintain radio link connectivity at UE 115-*c* throughout an IAB node handover procedure.

Wireless communications system 500 may include a first donor base station including donor CU 510-*a* and at least donor DU 515-*a*. Similarly, wireless communications system 500 may include a second donor base station including donor CU 510-*b* and at least donor DU 515-*b*. In some cases, the first and second donor base station may be supported by the same AMF 505 (e.g., PLMN), or supported by different AMFs 505. As described herein, an IAB-MT 520 may perform a handover procedure to a target donor base station and may establish an RRC connection with a target donor base station. To maintain service at the UE 115-*c* during such a handover procedure, an F1 detour path may be established prior to the handover (e.g., make-before-break), or after the handover procedure (e.g., break-before-make).

In an example of a break-before-make scenario, IAB-MT 520 may perform handover to donor DU 515-*b* and F1 connectivity between IAB-DUa 525-*a* and donor CU 510-*a* should be maintained/established until IAB-DUb 525-*b* is established and UE 115-*c* performs handover to IAB-DUb 525-*b* (e.g., the first donor base station is the source and the second donor base station is the target). However, due to the scenarios described with reference to FIGS. 2 and 3, it may not be possible to maintain or establish F1 interface 530-*a*. Therefore, the IAB node may be configured to encapsulate or decapsulate F1 traffic (e.g., F1-C traffic, F1 container, F1 PDU) from other traffic transmitted by the second donor base station, such as with RRC traffic (e.g., via an RRC interface), NAS traffic (e.g., via a NAS interface), via an F1 interface established with the second donor target base station (e.g., interface 530-*c*), etc. so as to establish a detour F1 interface. Using an RRC interface, the RRC and F1 traffic may terminate at donor CU 510-*b* because the RRC interface may terminate at donor CU 510-*b*. Accordingly, a path via the core network (e.g., one or more AMFs 505 associated with the first donor base station, the second donor base station, or both) or between donor CUs 610 may be used to forward the F1 traffic (in either direction, such as to or from the IAB node) to or from the donor CU 510-*a*. The IAB node may forward F1 traffic (e.g., F1-C traffic) to donor CU 510-*a* via the F1 detour 530-*b*, and/or donor CU 510-*a* may forward F1 traffic to the IAB node via the F1 detour 530-*b*. Accordingly, the IAB-MT 520 may perform handover to donor DU 515-*b* or an intermediate target parent node, and an RRC interface, a NAS interface, an F1 interface, etc. may be established between the IAB node and the second donor base station. Therefore, a detour path to forward F1 traffic may be established with donor CU 510-*a* and the UE 115-*c* will not go into radio link failure. Simultaneously or subsequently to establishing the F1 detour, the logical IAB-DUb 525-*b* may be established and UE 115-*c* may perform handover to IAB-DUb 525-*b*. Then, the F1 detour with donor CU 510-*a* may be released. Therefore, the detour path may (only) be maintained for an amount of time until the UE 115-*c* is handed over the IAB-DUb 525-*b*.

In an example of a make-before-break scenario, IAB-MT 520 may perform handover to donor DU 515-*a* or an intermediate target parent node, and F1 connectivity between IAB-DUa 525-*a* and donor CU 510-*a* should be established prior to the handover procedure (e.g., the first donor base station is the target and the second donor base station is the source). The IAB node may be configured to encapsulate or decapsulate F1 traffic from other traffic transmitted by the current source donor base station (e.g., the second donor base station), such as with RRC traffic (e.g., via an RRC interface), NAS traffic (e.g., via a NAS interface), via an F1 interface established with the second donor base station (e.g., interface 530-*c*), etc. so as to establish a detour F1 interface. The IAB node may forward F1 traffic (e.g., F1-C traffic) to donor CU 510-*a* via the F1 detour 530-*b*, and/or donor CU 510-*a* may forward F1 traffic to the IAB node via the F1 detour 530-*b* prior to and/or during the IAB-MT handover to the first donor base station (e.g., donor DU 515-*a*). The IAB-MT 520 may perform handover to donor DU 515-*a*, IAB-DUa 525-*a* may be established (e.g., when the F1 detour to donor CU 510-*a* is established), and UE 115-*c* may handover from IAB-DUb 525-*b* to IAB-DUa 525-*a*. Accordingly, IAB-DUa 525-*a* may establish an F1 interface with donor CU 510-*a* without going through the second donor base station. Therefore, the F1 detour 530-*b* and connections with the second donor base station may be released (e.g., RRC interface, NAS interface, F1 interface).

In some cases, other connections may be leveraged other than the RRC connection with the second donor base station, such as a NAS connection. A NAS connection terminates at IAB-MT 520 and an AMF 505 associated with at least the second base station. The NAS connection may carry the F1 traffic to an AMF 505 and then the F1 traffic may be routed to donor 510-*c*. Additionally, or alternatively, the F1 connection between IAB-DUb 525-*b* and donor CU 510-*b* may be used for the F1 detour.

As described, the first and second donor base station may be supported by the same AMF 505 (e.g., PLMN). In such cases, the F1 traffic may be forward through donor DU 515-*b*, donor CU 510-*b*, and the AMF 505 to complete the F1 detour between IAB-DUa 525-*a* and donor CU 510-*a*. Alternatively, the first and second donor base station may be supported by different AMFs 505. In such cases, the F1 traffic may be forwarded through donor DU 515-*b*, donor CU 510-*b*, and the AMF 505 associated with the second base station, and the AMF 505 associated with the first base station to complete the F1 detour between IAB-DUa 525-*a* and donor CU 510-*a*.

In some cases, one or more identifiers may be included with the F1 traffic to ensure the F1 traffic terminates at the intended device (e.g., donor CU 510-*a*, IAB-DUa 525-*a*, UE 115-*c*). For example, in the case that the F1 traffic is carried from a donor CU 510-*a* to the IAB-node (and assuming RRC carries the F1 traffic), the donor CU 510-*a* may send an F1 related PDU to an AMF 505 associated with donor CU 510-*a* and may include an identifier of the second donor base station (e.g., base station ID, donor CU 510 ID, donor DU 515 ID, an ID associated with the donor as a whole). An AMF 505 may not have an interface with donor-DUs and may only interface with a base station (e.g., gNB) a base station CU such as if the base station has split architecture. In some cases, donor CU 510-*a* may transmit the PDU in a container along with a second donor base station identifier and an IAB-MT 520 identifier to the AMF 505. An IAB-MT 520 identifier may include one or more interface protocol identifiers (e.g., NGAP UE ID) or a BAP address (which may be included in a prior handover preparation of the IAB-MT). In some cases, donor CU 510-*a* may encapsulate an IAB-MT 520 identifier and the container with the PDU into a parent container and may transmit the parent container along with second donor base station identifier to the AMF 505. The AMF 505 associated with the first donor base station may determine an AMF 505 associated with the second donor base station based on the identifier of the second donor base station and, in some cases, an IAB-MT identifier. The AMF 505 associated with the second donor base station may be the same or may be different from the AMF 505 associated with the first donor base station. In the case that AMF 505 of the second donor base station is different from the AMF 505 of the first donor base station, the AMF 505 of the first base station may forward the F1 container (or the parent container) to AMF 505 of the second base station along with the second donor base station identifier and, in some cases, an identifier of the IAB-MT 520. The AMF 505 of the second base station may forward the F1 container (or the parent container) to the second donor base station based on the second donor base station identifier. In some cases, the AMF 505 of the second base station may optionally indicate an identifier of the IAB-MT 520 to the second donor base station. The second donor base station may recover an identifier of the IAB-MT 520 from the AMF message or the parent container in the AMF 505 message. The second donor base station may forward the F1 container to the IAB-node based on the identifier of the IAB-MT 520.

For example, in the case that the F1 traffic is carried from the IAB-node to a donor CU 510-*a* (and assuming RRC carries the F1 traffic), donor CU 510-*b* may receive an F1 related PDU from the IAB-node and may forward the F1 container along with an identifier of the first donor base station. Similar options and procedures may apply as described with reference to the donor CU 510-*a* to the IAB-node F1 forwarding direction. For example, an identifier of the IAB-MT 520 and/or an identifier of the first donor base station may be included with the F1 traffic until the F1 traffic reaches the first donor base station. Alternatively, no identifier of the IAB-MT 520 may be exchanged along the path. In such cases, the first donor base station may identify the IAB-node associated with the F1 traffic from the received F1 PDU.

In some implementations, the identifiers (e.g., donor base station identifier, UE identifier, IAB node identifiers, AMF identifiers) included with the F1 traffic may be based on which IAB donor is the source and which IAB donor is the target of an IAB node handover procedure or handover preparation procedure. Additionally, or alternatively, the identifiers (e.g., donor base station identifier, UE identifier, IAB node identifiers, AMF identifiers) included with the F1 traffic may be based on which direction the F1 traffic is flowing, whether the source and target IAB donors are associated with the same of different AMFs 505, etc. In some cases, an F1 detour path may be implemented from any handover related procedure between the two donors. In some implementations, the establishment of the F1-detour path and/or the forwarding of the F1 traffic via the F1-detour path may occur before a handover procedure or the handover preparation procedure. In such a scenario, the handover procedure or handover preparation procedure may occurs later in the future, or may not occur at all.

In some implementations, an IAB-MT 520 may perform handover from source donor to target donor via a source-AMF associated with the source donor (e.g., S-AMF) and a target AMF associated with the target T-AMF. During which, the source IAB donor, the target IAB donor, the migrating IAB node, the S-AMF, and the T-AMF may exchange a series of handover messages (e.g., handover commands, handover requests, acknowledgments, confirm messages, notification messages, etc.). The F1 PDUs forwarded between an IAB donor (e.g., F1-terminating IAB donor) and the migrating IAB-node may be specifically exchanged between RAN/AMFs or among AMFs on behalf of the IAB-node. However, the IAB-MT and/or UE context may be released from the source AMF and/or source IAB donor following the successful handover procedure to the target AMF and target IAB donor. For example, upon successful handover, T-AMF may inform S-AMF that the handover was a success. S-AMF may then inform the source donor (e.g., source donor CU) the handover was a success and so the source CU may release any resource the source CU was reserving to serve UE 115-*c*. Therefore, UE context may be deleted at the source CU, S-AMF, etc. after the handover is competed to the target donor, target core network, etc. With such a context release procedure, however, it may not be possible to establish the F1 detour after handover because the source network already dropped context associated with the IAB node, UE 115, etc. To maintain the identity of the IAB node and/or UE for which the handover was executed the RANs/AMFs 505 may be configured to retain identifier(s) of the IAB-node, IAB-MT, UE 115, etc. for some time after the handover procedure which may be used to later identify the IAB-node associated with the F1 container forwarded via an F1 detour. In such cases, a subsequent release of the IAB-node's context and/or identifier(s) may be implemented (via a subsequent context release message) after F1 related traffic forwarding (e.g., the F1 detour) is discontinued.

F1 traffic may be carried via IP interfaces. Therefore, an IP address for the IAB node may be dedicated for the F1 communication. The IAB-node may be configured with the IP address before, during, or after the handover procedure. The IP address may be coordinated between the donor base stations via one or more AMFs. The IAB-node may use the new IP address for F1 related communications along the F1 detour path.

In some implementations, different AMFs may support different functions. Devices such as a donor CU 510 will may connect with an AMF based on the capabilities of the AMF in order to support the communications at the CU. Therefore, capability signaling may be implemented between an AMF and a base station to allow a CU to determine which AMF 505 to connect with. For example, an AMF 505 may be configured to transmit capability signaling to one or more devices, such as other AMFs 505, donor CUs 510, etc. In some cases, such capability signaling may indicate whether the AMF supports forwarding of F1 containers (e.g., supports F1 detours). In some cases, such capability signaling may indicate that the AMF supports maintaining (e.g., retaining) context of an IAB node after a completed handover procedure, and/or indicate a capability to subsequently release context of the IAB node, such as when the F1 detour is released. A donor base station (e.g., a donor CU 510) may receive one or more capability messages from one or more AMFs 505 and may select an AMF 505 to connect with based on the capability of the AMF 505 to support the F1 detour.

In some cases, the connections between the devices below the donor DUs 515 (e.g., the connections between the donor DUs 515, IAB node, and the UE 115), may be wireless connections. In some cases, the connections between devices above the donor DUs 515 may be wirelined connections (e.g., the connections between the donor DUs 515, donor CUs 510, and the AMFs 505). The RRC interface (e.g., RRC protocol layer), NAS interface (e.g., NAS protocol layer), F1 interface, etc. may be referred to as application protocols and may be independent of the transport method (e.g., wireless vs wirelined transport). Therefore, the RRC, NAS, and F1 interfaces may be referred to as logical channels rather than physical.

Figure 6:
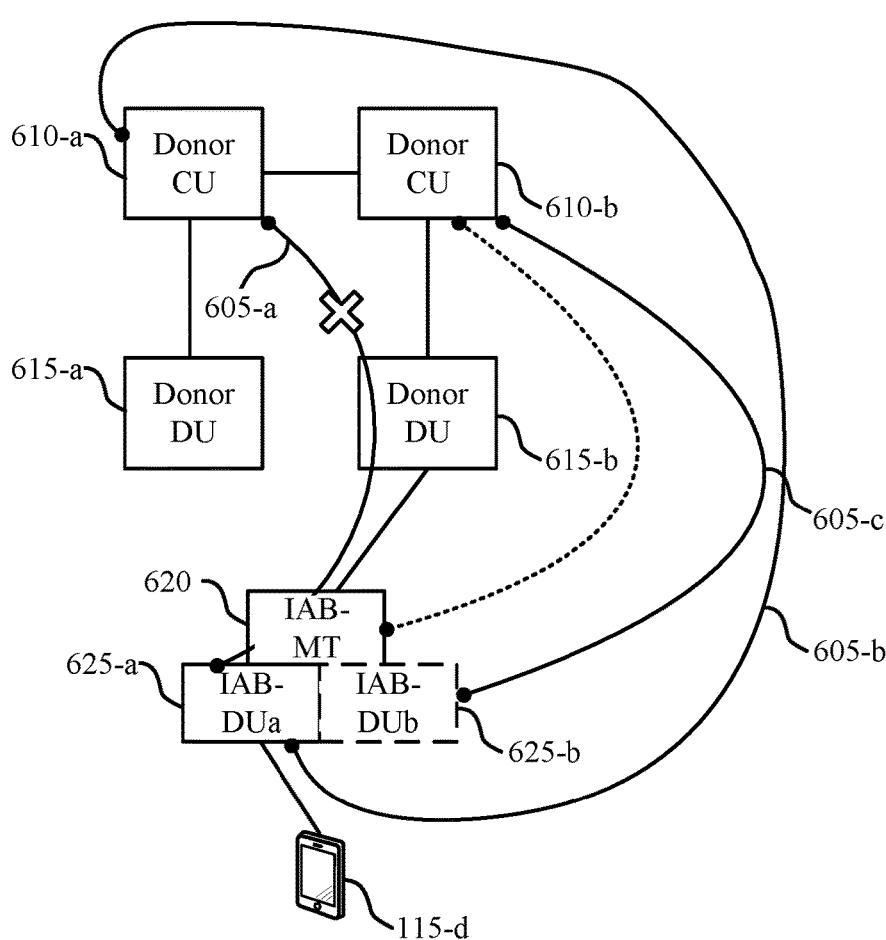

FIG. 6 illustrates an example of a wireless communications system 600 that supports F1 connection options in IAB handover scenarios in accordance with one or more aspects of the present disclosure. The wireless communications system 600 may include donor base stations, IAB nodes, and a UE 115 (e.g., UE 115-*d*). A donor base station may include a donor CU 610 (e.g., donor CU 610-*a*, or donor CU 610-*b*) and one or more donor DUs 615 (e.g., donor DU 615-*a*, or donor DU 615-*b*). An IAB node may include an IAB-MT 620 and one or more IAB-DUs 625 (e.g., IAB-DUa 625-*a*, IAB-DUb 625-*b*). The devices included in FIG. 6 may be examples of the corresponding devices as described with reference to FIGS. 1 through 5. Wireless communications system 600 may depict an inter-PLMN, or intra-PLMN handover procedure. In some cases, the devices described with reference to FIG. 6 may perform techniques to maintain radio link connectivity at UE 115-*d* throughout an IAB node handover procedure.

In some implementations, the techniques described herein may be applied when an Xn interface between a first and second donor base station is available (e.g., supported) but a connection 605-*a* between IAB-DUa and donor CU 610-*a* via donor DU 615-*b* is unavailable. In some implementations, the techniques described herein may be applied when a connection 605-*a* between IAB-DUa and donor CU 610-*a* via donor DU 615-*b* is available. In such cases, it may be beneficial to support an additional F1-C path, or alternative F1-C path (e.g., such as to increase robustness of a control plane by supporting multiple transport means). In such cases, the F1 detour 605-*b* may use a connection (e.g., RRC connection, F1 connection) between the IAB node (e.g., IAB-MT 620, and/or IAB-DUb 625-*b*) and the donor DU 615-*b* and an Xn interface between the donor base stations. For example, the F1 detour may include the RRC connection between IAB-MT 620 and donor CU 610-*b*, and the Xn interface between donor CU 610-*b* and donor CU 610-*a*. In another example, the F1 detour may include the F1 connection 605-*c* between IAB-DUb 625-and donor CU 610-*b*, and the Xn interface between donor CU 610-*b* and donor CU 610-*a*. As described herein, the first donor base station (e.g., donor CU 610-*a* and at least donor DU 615-*a*) may be the source and the second donor base station (e.g., donor CU 610-*b* and at least donor DU 615-*b*) may be the target of a handover procedure and/or handover preparation procedure. Alternatively, the first donor base station (e.g., donor CU 610-*a* and at least donor DU 615-*a*) may be the target and the second donor base station (e.g., donor CU 610-*b* and at least donor DU 615-*b*) may be the source of a handover procedure and/or handover preparation procedure. In some cases, setup of the detour F1 path and use of the detour path may occur before a handover procedure or handover preparation procedure, and either of the handover preparation or handover procedure may occur in the future, or may not occur (e.g., in which case the F1-C detour path and forwarding of F1-C traffic via detour path may be decoupled from IAB handover).

Figure 7:
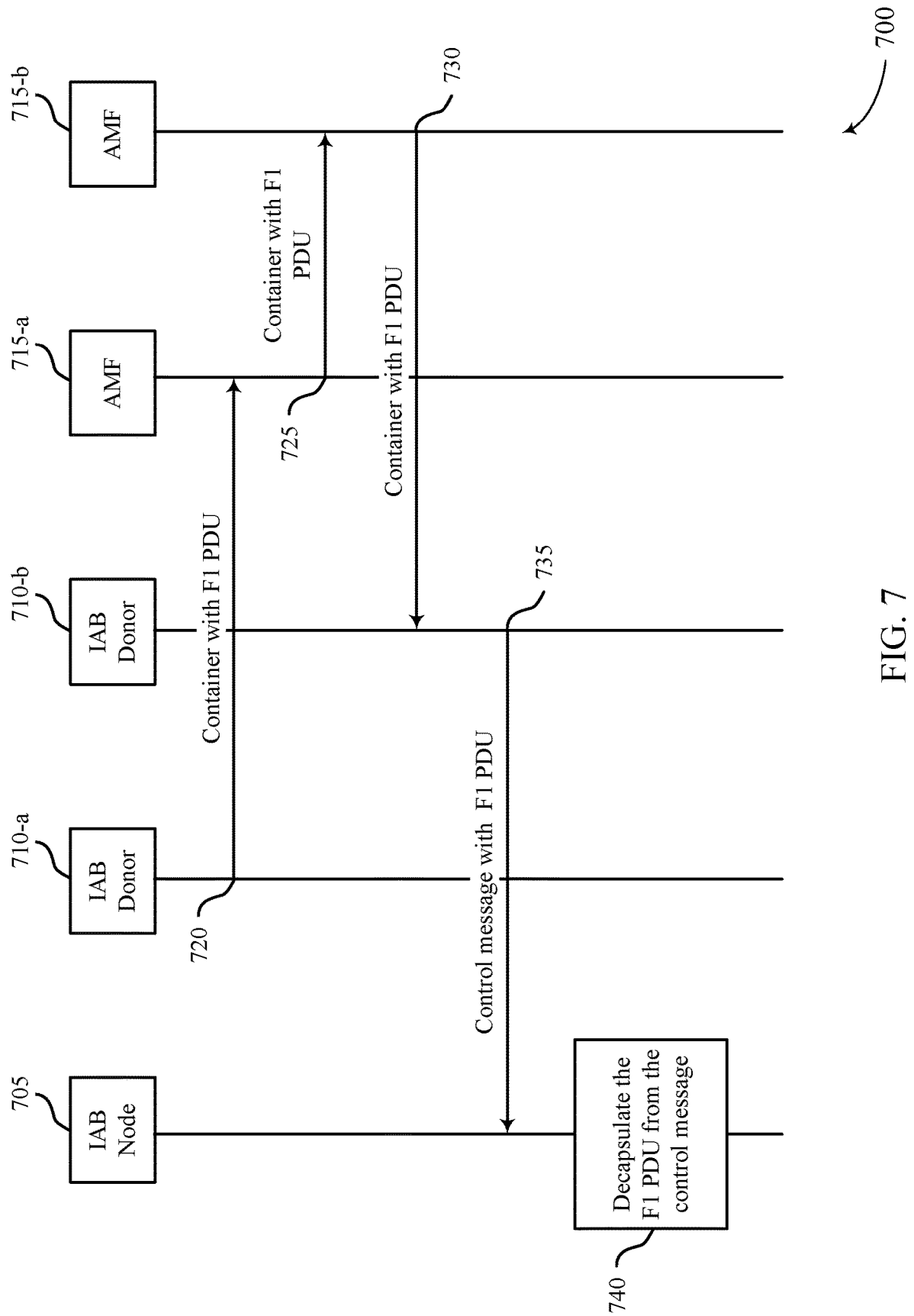
FIGS. 7 and 8 illustrate examples of process flows that support F1 connection options in IAB handover scenarios in accordance with one or more aspects of the present disclosure.

FIG. 7 illustrates an example of a process flow 700 that supports F1 connection options in IAB handover scenarios in accordance with one or more aspects of the present disclosure. The process flow 700 may include donor base stations (e.g., IAB donors 710-*a*, 710-*b*), IAB nodes 705, and AMFs 715 (e.g., AMFs 715-*a*, 715-*b*). A donor base station 710 may include a donor CU and one or more donor DUs. An IAB node 705 may include an IAB-MT and one or more IAB-DUs. The devices included in FIG. 7 may be examples of the corresponding devices as described with reference to FIGS. 1 through 6. Process flow 700 may be applicable in an inter-PLMN, or an intra-PLMN handover procedure. In some cases, the devices described with reference to FIG. 7 may perform techniques to maintain radio link connectivity at a UE throughout an IAB node handover procedure. Alternative aspects of the following may be implemented, where some steps are performed in a different order than described or are not performed at all. In some cases, steps may include additional features not mentioned below, or further steps may be added.

IAB node 705 may be a migrating (e.g., roaming, moving, mobile) node and may serve one or more UEs, one or more other IAB nodes, or a combination thereof. In some cases, IAB donor 710-*a* may be the base station at which the F1 detour, as described herein, terminates. For example, IAB donor 710-*a* may include donor CU 510-*a* and donor DU 515-*a*, and/or donor CU 610-*a* and donor DU 615-*a* as described with reference to FIGS. 5 and 6, respectively. Similarly, IAB donor 710-*b* may be the base station at which the F1 detour, as described herein, is forwarded through (e.g., non-F1 terminating base station). For example, IAB donor 710-*b* may include donor CU 510-*b* and donor DU 515-*b*, and/or donor CU 610-*b* and donor DU 615-*b* as described with reference to FIGS. 5 and 6, respectively. In some cases, AMF 715-*a* may be associated with IAB donor 710-*a* and AMF 715-*b* may be associated with IAB donor 710-*b*. In some implementations, AMF 715-*a* and AMF 715-*b* may be the same AMF 715 that serves both IAB donor 710-*a* and IAB donor 710-*b*. In some implementations, IAB node 705 may perform a handover procedure from IAB donor 710-*a* to IAB donor 710-*b*, such that IAB donor 710-*a* may be a source base station, IAB donor 710-*b* may be a target base station, AMF 715-*a* may be a source AMF 715 (e.g., S-AMF), and AMF 715-*b* may be a target AMF 715 (e.g., T-AMF). Alternatively, IAB node 705 may perform a handover procedure from IAB donor 710-*b* to IAB donor 710-*a*, such that IAB donor 710-*b* may be a source base station, IAB donor 710-*a* may be a target base station, AMF 715-*b* may be a source AMF 715 (e.g., S-AMF), and AMF 715-*a* may be a target AMF 715 (e.g., T-AMF). The process flow 700 may depict a process for forwarding F1 traffic from IAB donor 710-*a* to an IAB node 705 via an F1 detour, where the F1 detour may be established before or after the IAB node 705 performs a handover procedure to IAB donor 710-*a* or IAB donor 710-*b*. In some cases, the F1 detour may be established before or after the IAB node 705 performs a handover preparation procedure with IAB donor 710-*a* and/or IAB donor 710-*b*. In some aspects, the handover procedure and/or a handover preparation procedure may occur after the F1 detour is established or may not occur. The F1 detour path may be based on identifying the pair of donors along the detour path. In one example, the pair of donors may be the source and target donors associated with IAB handover.

At 720, IAB donor 710-*a* may transmit a container (e.g., traffic, a message, a signal, a channel) with (e.g., encapsulated with, included with) an F1 PDU (e.g., F1-C PDU) to AMF 715-*a*. At 725, AMF 715-*a* may forward the container including the F1 PDU to AMF 715-*b*. At 730, AMF 715-*b* may forward the container including the F1 PDU to IAB donor 710-*b*. At 735, IAB donor 710-*b* may forward the container including the F1 PDU to IAB node 705 (e.g., IAB-MT). To do so, IAB donor 710-*b* include the F1 PDU with a control message, such as an RRC message.

At 740, IAB node 740 may decapsulate (e.g., remove, separate) the F1 PDU from the received control message. For example, the IAB-MT of IAB node 740 may decapsulate the F1 PDU from the RRC message. The IAB-MT may then deliver the F1 PDU to an IAB-DU of IAB node 740. In some cases, the IAB-DU may be collocated with the IAB-MT.

Figure 8:
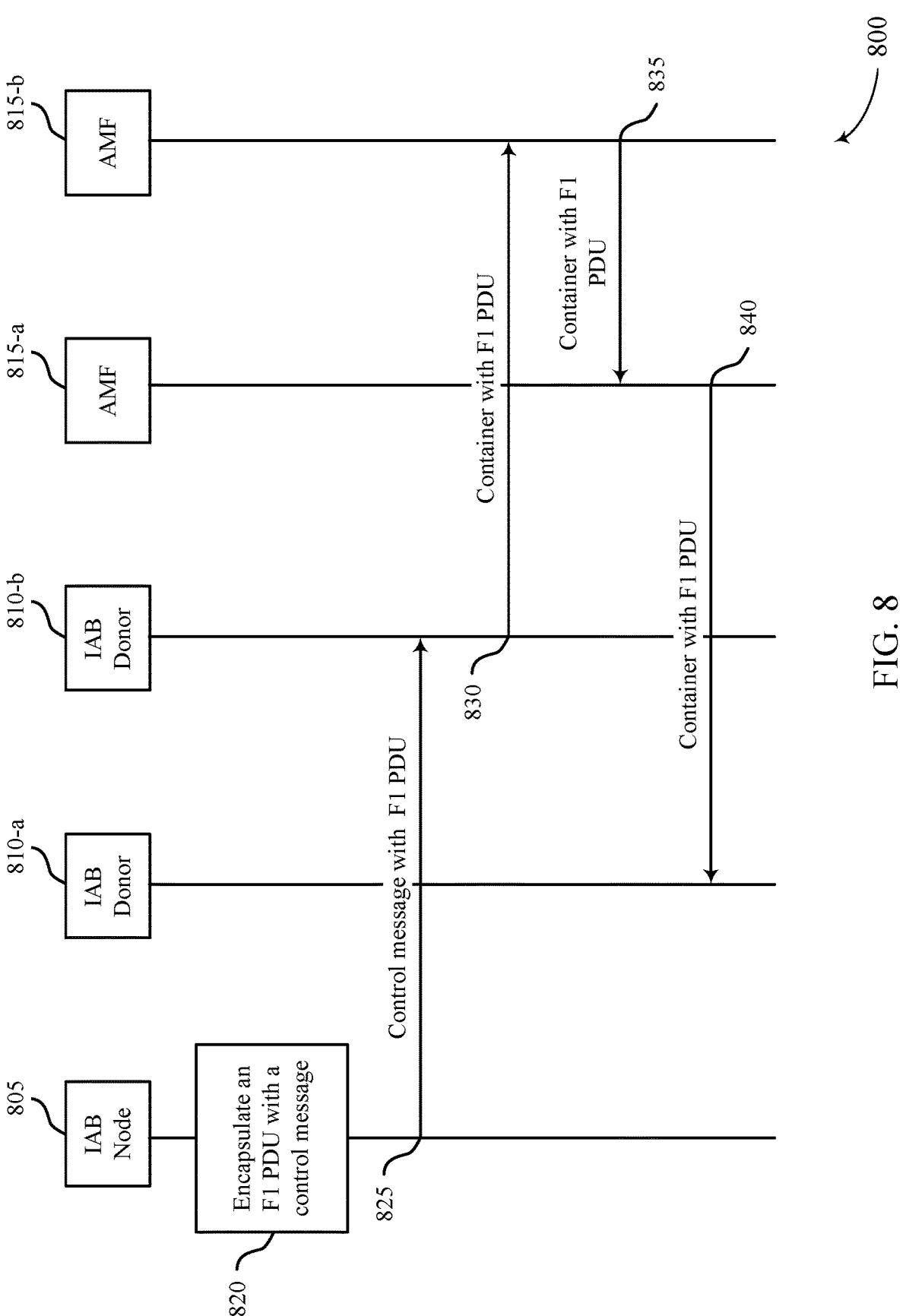

FIG. 8 illustrates an example of a process flow 800 that supports F1 connection options in IAB handover scenarios in accordance with one or more aspects of the present disclosure. The process flow 800 may include donor base stations (e.g., IAB donors 810-*a*, 810-*b*), IAB nodes 805, and AMFs 815 (e.g., AMFs 815-*a*, 815-*b*). A donor base station (e.g., IAB donor 810) may include a donor CU and one or more donor DUs. An IAB node 805 may include an IAB-MT and one or more IAB-DUs. The devices included in FIG. 8 may be examples of the corresponding devices as described with reference to FIGS. 1 through 7. Process flow 800 may be applicable in an inter-PLMN, or an intra-PLMN handover procedure, handover preparation procedure, pre-handover procedure, or pre-handover preparation procedure (e.g., handover or handover preparation may occur later or may not occur). In some cases, the devices described with reference to FIG. 8 may perform techniques to maintain radio link connectivity at a UE throughout an IAB node handover procedure. Alternative aspects of the following may be implemented, where some steps are performed in a different order than described or are not performed at all. In some cases, steps may include additional features not mentioned below, or further steps may be added.

IAB node 805 may be a migrating (e.g., roaming, moving, mobile) node and may serve one or more UEs, one or more other IAB nodes, or a combination thereof. In some cases, IAB donor 810-*a* may be the base station at which the F1 detour, as described herein, terminates. For example, IAB donor 810-*a* may include donor CU 510-*a* and donor DU 515-*a*, and/or donor CU 610-*a* and donor DU 615-*a* as described with reference to FIGS. 5 and 6, respectively. Similarly, IAB donor 810-*b* may be the base station at which the F1 detour, as described herein, is forwarded through (e.g., non-F1 terminating base station). For example, IAB donor 810-*b* may include donor CU 510-*b* and donor DU 515-*b*, and/or donor CU 610-*b* and donor DU 615-*b* as described with reference to FIGS. 5 and 6, respectively. In some cases, AMF 815-*a* may be associated with IAB donor 810-*a* and AMF 815-*b* may be associated with IAB donor 810-*b*. In some implementations, AMF 815-*a* and AMF 815-*b* may be the same AMF 815 that serves both IAB donor 810-*a* and IAB donor 810-*b*. In some implementations, IAB node 805 may perform a handover procedure from IAB donor 810-*a* to IAB donor 810-*b*, such that IAB donor 810-*a* may be a source base station, IAB donor 810-*b* may be a target base station, AMF 815-*a* may be a source AMF 815 (e.g., S-AMF), and AMF 815-*b* may be a target AMF 815 (e.g., T-AMF). Alternatively, IAB node 805 may perform a handover procedure from IAB donor 810-*b* to IAB donor 810-*a*, such that IAB donor 810-*b* may be a source base station, IAB donor 810-*a* may be a target base station, AMF 815-*b* may be a source AMF 815 (e.g., S-AMF), and AMF 815-*a* may be a target AMF 815 (e.g., T-AMF). The process flow 800 may depict a process for forwarding F1 traffic from an IAB node 805 to IAB donor 810-*a* via an F1 detour, where the F1 detour may be established before or after the IAB node 805 performs a handover procedure to IAB donor 810-*a* or IAB donor 810-*b*. In some cases, the F1 detour may be established before or after the IAB node 805 performs a handover preparation procedure with IAB donor 810-*a* and/or IAB donor 810-*b*. In some aspects, the handover procedure and/or a handover preparation procedure may occur after the F1 detour is established or may not occur. The F1 detour path may be based on identifying the pair of donors along the detour path. In one example, the pair of donors may be the source and target donors associated with IAB handover.

At 820, IAB node 805 may encapsulate (e.g., include, combine) an F1 PDU (e.g., F1-C PDU) with a control message (e.g., RRC message). For example, an IAB-DU of IAB node 805 may deliver an F1 PDU to an IAB-MT of IAB node 805. The IAB-MT may then encapsulate the F1 PDU into the control message. In some cases, the IAB-DU may be collocated with the IAB-MT.

At 825, IAB node 805 (e.g., IAB-MT) may transmit the control message including the F1 PDU to IAB donor 810-*b*. At 830, IAB donor 810-*b* may forward the container including the F1 PDU to AMF 815-*b*. At 835, AMF 815-*b* may forward the container including the F1 PDU to AMF 815-*a*. At 840, AMF 815-*a* may forward the container including the F1 PDU to IAB donor 810-*a*.

Accordingly, as described herein, an IAB node 805 (e.g., a migrating IAB node) may have an RRC connection with a first base station (e.g., IAB donor 810-*a* or IAB donor 810-*b*). For example, the IAB node 805 may establish a RRC connection with a first central unit of a first network node. The IAB node may receive from the first base station an indication to establish an F1-C connection (e.g., IAB node-to-central unit connection) to a second base station (e.g., IAB donor 810-*a* or IAB donor 810-*b*) via the RRC connection. The IAB node 805 may communicate, with the second base station, traffic associated with the F1-C connection via the RRC connection on the link between the IAB-node 805 and the first base station.

The first base station (e.g., the non-F1-detour terminating base station, the relaying base station), prepare a handover for an IAB-MT with a second base station, where the IAB-MT may hand over to the first base station or the second base station, where handover preparation may occur over an Xn interface, or an NG interface (e.g., with an AMF 815). Preparing handover of the IAB-MT may include communicating (e.g., transmitting or receiving) a request for handover and communicating (e.g., transmitting, or receiving) a response (e.g., an ACK, a NACK). The first base station may receive the request in case the first network node is the target node of the handover. Alternatively, the first base station may transmit the request in the case the first network node is the source node. Upon preparing handover, the first base station may indicate to the IAB-node to establish an F1-C connection with a second base station via an RRC connection with the first base station. The first base station may forward traffic associated with the F1-C connection between the second base station and the IAB-node, where the F1-C messages may be carried in (e.g., included with) RRC traffic on the link between the IAB-node and first base station.

The second base station (e.g., the F1-detour terminating base station) may prepare a handover for an IAB-MT with a first base station, where the IAB-MT may hand over to the first base station or the second base station. The second base station may determine based on the handover preparation an address for forwarding traffic via the first base station, where the traffic may be associated with an F1-C connection between the second base station and the IAB-node. The address may be different from an address associated with the IAB node 805. The second base station may transmit a PDU of the traffic to the address. In some cases, the second base station may receive a PDU of the traffic from the address. The address may be that of the first base station such as if handover preparation was on an Xn interface. In some cases, the address may be that of the AMF 815 such as if handover preparation was via a core network. A first base station may determine a forwarding address to a second base station or an AMF 815 in a similar manner. In non-handover scenarios, or in scenarios where setup or use of the F1-C detour path happens before handover preparation, the address may be determined by the first or second base station via exchange of identifiers or indications of identifiers using any of the examples as described with reference to FIG. 5. The identifiers may be agnostic to a handover procedure or a handover preparation procedure. For example, the IAB-node may indicate to first base station (or AMF) the identity of the second base station towards which the F1-C detour path would terminate. This may allow the first base station (or AMF) to identify the second base station with which forwarding of F1 traffic shall occur via detour path. The second base station may receive from the IAB-node, the first base station or the AMF an indicator of the ID of the first base station.

The first base station or the second base station may be a gNB, an IAB donor 810, etc. The IAB-node 805 may establish the F1-C connection to the second base station via the RRC connection to the first base station prior to a handover from the first base station to the second base station. The IAB-node 805 may establish the F1-C connection with the second base station via the RRC connection with the first base station post a handover of the IAB node 805 from the second base station to the first base station. The indication may be handover command indicating the IAB node to establish the RRC connection with the first base station, where the second base station may be the source base station of the handover procedure, and the first base station may be the target base station of the handover procedure. The indication may be a configuration message indicative for the IAB node 805 to communicate traffic associated with the F1-C connection using the RRC connection. The configuration may include an allocation of an IP address for the F1-C related communication with the second base station. In some cases, the configuration may be an IP address configuration. The IAB node may select an IP address based on the IP address configuration and may use selected address for communicating via an F1 detour. The address may indicate the address of a CU, a DU, or an IAB node. In some cases, the IP address may be allocated to the IAB node which the IAB node may use as a source IP address when the IAB node sends the packet and which will designate a destination IP address of the IAB node when the IAB-node receives a packet. The configuration message may be a Boolean that the IAB-node may use an RRC connection to exchange F1-C traffic. For example, in some cases, if a node does not receive the configuration message the network node may not send F1-C traffic on its RRC connection.

The traffic associated with the F1-C connection may be included in a NAS container associated with (e.g., in) the RRC connection. The traffic associated with the F1-C connection may refer to an F1-application protocol (F1-AP) message, a stream control transmission protocol (SCTP) packet, or IP packet of an existing F1-C connection or the traffic may be exchanged to establish or reestablish the F1-C connection between the IAB-node 805 and the second base station. Communicating the traffic may include transmitting the traffic, where the IAB-node 805 may encapsulate an F1-C PDU into a PDU of the RRC connection (or some other connection) and may transmit the encapsulated PDU to the first base station. In some cases, communicating the traffic may include receiving the traffic, where the IAB-node 805 may receive a PDU of the RRC connection (or some other connection) from the first base station and decapsulates the F1-C PDU from the encapsulated PDU. The IAB-node 805 may include an identifier of the second base station along with the communication associated with the F1-C connection.

Handover preparation (e.g., by the first base station, the second base station, the IAB node 805, the core network node) may be performed over a base station interface (e.g., an Xn interface) or an interface associated with a core network node (e.g., an NG interface). Handover preparation by the second base station may be over a base station interface (e.g., an Xn interface) with the first base station, where the second base station may determine the address for forwarding the traffic as an address of the first base station. Handover preparation by the second base station may be over an interface (e.g., an NG interface) with a core network node, where the second base station may determine the address for forwarding the traffic as an address of the core network node.

Forwarding (e.g., transmitting or receiving) the traffic may be over a base station interface (e.g., an Xn interface) with the second base station or an interface via a core network node (e.g., an NG interface). The first base station may determine, based on the handover preparation, an identifier for the second base station, a core network node for the IAB-node, etc., where the forwarding of a PDU associated with the F1-C connection via the core network node may include at least the second base station identifier. The first base station may include an identifier (e.g., UE ID) associated with the IAB node 805 (e.g., an IAB-MT identifier, an IAB-DU identifier, a UE identifier, a core network identifier) with the forwarded PDU. In some cases, the second base station may configure the IAB-node 805 with an IP address associated with the F1-C connection with the second base station.

Forwarding of the traffic (e.g., transmitting or receiving) to the second base station (e.g., directly or via a core network node) may include using a UE-associated message or a non-UE associated message, where a UE-associated message may be associated with the IAB-MT. In some cases, the first base station may transmit (or receive) a request to the second base station or a core network node requesting to forwards PDUs of the F1-C connection. The first base station may forward the PDUs based on receiving (or transmitting, respectively) an acknowledgment message. In some implementations, the first base station may provide (e.g., transmit) an indication to the second base station or the core network node via which the F1-C PDUs are forwarded that the forwarding of F1-C PDUs is discontinued. The indication may include an indication to release an identifier associated with the IAB-MT.

In some cases, the first base station may receive an indication of capability from a core network node associated with forwarding F1-C traffic. The base station may transmit the F1-C PDU via the core network node based at least in part on receiving the capability, or based on the core network node being capable of forwarding F1-C traffic. The first base station may communicate an IP address configuration or a request for an IP address configuration for the IAB-node's F1-C related communication with the second base station, or via the management entity. The first base station may configure the IAB-node with an IP address for the F1-C connection with the second base station.

A core network node (e.g., a core network management entity, an AMF, a PLMN) may receive from a first network node a first message including an indicator for forwarding of F1-C containers, a UE ID, and a target base station ID. The core network node may forward the first message to a second network node (e.g., the first base station, the second base station). The core network node may cache the first and the second network nodes of the first message together with the UE ID, and the F1-C container indicator. Caching may include collecting, sorting, and/or storing data in a cache memory. The core network node may forward, based on the cached information, one or more other messages carrying F1-C containers, and indicating the UE ID between the first network node and the second network node.

The core network node may be an AMF, an MME, etc. The first network node or the second network node may be a second core network node. The first message may include an indication of a handover procedure (e.g., a handover command, a handover requirement). The first message may include a request to create UE context. The first message may include a handover request acknowledgment. The first message may include a response to create UE context. The first message may include a notification of a handover procedure. The first message may include a notification of receiving a handover indication. The first message may include an acknowledgment associated with a notification of a handover. The first message may include an indicator of completion of a release of UE context.

The first message may include a request for forwarding F1-C related traffic to or from the base station indicated by the target base station ID, and the core network node may acknowledge the request. The core network node may forward the one or more other messages based on acknowledging the request. The target base station ID may be an ID of a source base station, and the UE will hand over from the source base station to a target base station. The target base station ID may be an ID of a target base station, and the UE handover from a source base station to the target base station. The UE ID may be associated with an IAB-MT.

In some cases, the first network node may be an IAB-node, where the first message received from the first network node or the one or more other messages exchanged with the first network node may be carried via a NAS connection. The UE ID may be indicated by IAB-node transmitting or receiving the message(s). The second network node may be an IAB-node, where the first message forwarded to the second network node or the one or more other messages exchanged with the second network node may be carried via a NAS connection. The UE ID may be indicated by IAB-node sending or receiving the message(s).

In some cases, the core network node may provide a capability of the core network node for forwarding of F1-C containers to the first network node or the second network node. The core network node may receive the first message or the one or more other messages based on providing the capability. The core network node may receive a capability for forwarding of F1-C containers from the second network node. The core network node may forward the first message or the one or more other messages to the second network node based on receiving the capability. The CN management entity may receive a release message from the first network node or the second network node including the UE ID and F1-C container indicator, and the core network node may release the cached information based on the release message. The core network node may forward the release message to the other of the first network node or the second network node.

Figure 9:
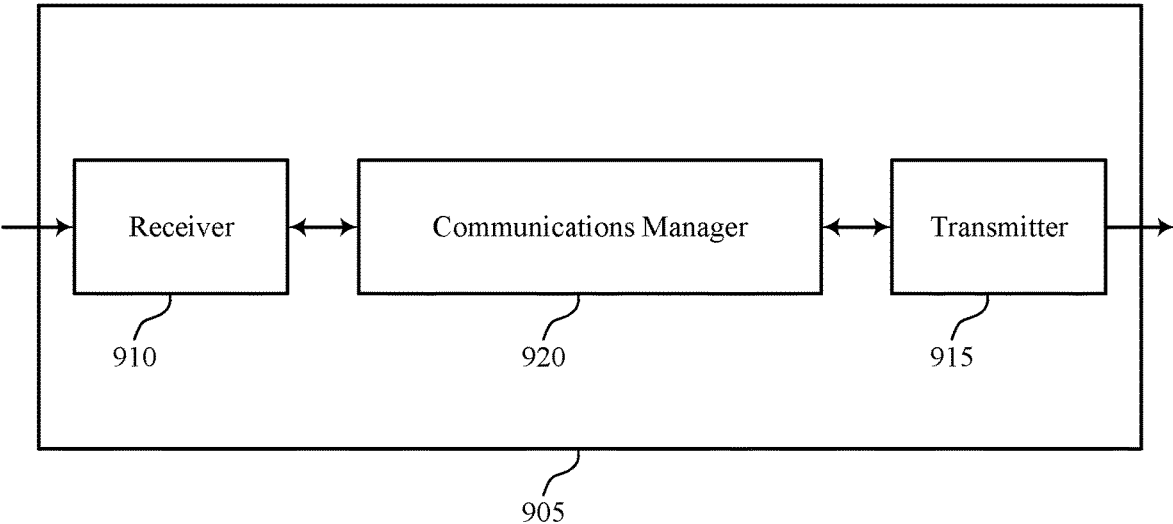
FIGS. 9 and 10 show block diagrams of devices that support F1 connection options in IAB handover scenarios in accordance with one or more aspects of the present disclosure.

FIG. 9 shows a block diagram 900 of a device 905 that supports F1 connection options in IAB handover scenarios in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of F1 connection options in IAB handover scenarios as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at an IAB node in accordance with examples as disclosed herein. For example, the communications manager 920 may be configured as or otherwise support a means for establishing a RRC connection with a first central unit of a first network node. The communications manager 920 may be configured as or otherwise support a means for receiving, from the first network node, an indication that the IAB node is to establish an IAB node-to-central unit connection with a second central unit of a second network node via the RRC connection between the IAB node and the first network node, where the indication is associated with a handover between the first network node to the second network node. The communications manager 920 may be configured as or otherwise support a means for communicating, with the second network node, via the IAB node-to-central unit connection using the RRC connection between the IAB node and the first network node.

Additionally, or alternatively, the communications manager 920 may support wireless communications at a first network node in accordance with aspects as disclosed herein. For example, the communications manager 920 may be configured as or otherwise support a means for establishing a RRC connection with an IAB node, where the RRC connection is between a first central unit of the first network node and the IAB node. The communications manager 920 may be configured as or otherwise support a means for transmitting, to the IAB node, an indication that the IAB node is to establish an IAB node-to-central unit connection with a second central unit of a second network node via the RRC connection between the IAB node and the first network node, where the indication is associated with a handover between the first network node to the second network node. The communications manager 920 may be configured as or otherwise support a means for relaying (e.g., forwarding) traffic via the IAB node-to-central unit connection between the second network node and the IAB node using the RRC connection between the IAB node and the first network node.

Additionally, or alternatively, the communications manager 920 may support wireless communications at a first network node in accordance with aspects as disclosed herein. For example, the communications manager 920 may be configured as or otherwise support a means for receiving an indication of a handover of an IAB node between a second network node to the first network node. The communications manager 920 may be configured as or otherwise support a means for determining, based on the indication, an address for forwarding traffic from the first network node to the IAB node via the second network node using an IAB node-to-central unit connection between a first central unit of the first network node and the IAB node, where the address is different from an IAB node address indicative of the IAB node. The communications manager 920 may be configured as or otherwise support a means for transmitting the traffic to the address determined by the first network node.

Additionally, or alternatively, the communications manager 920 may support wireless communications at a core network node in accordance with aspects as disclosed herein. For example, the communications manager 920 may be configured as or otherwise support a means for receiving, from a first network node, control information indicative that the core network node is to forward one or more containers of an IAB node-to-central unit connection of an IAB node, where the control information includes a first identifier associated with the IAB node and a second identifier associated with a second network node. The communications manager 920 may be configured as or otherwise support a means for transmitting the one or more containers to the second network node based on the second identifier being included in the control information. The communications manager 920 may be configured as or otherwise support a means for caching the control information that indicates that the core network node is to forward the one or more containers, the first identifier, the second identifier, and a third identifier associated with the first network node. The communications manager 920 may be configured as or otherwise support a means for transmitting, to the first network node associated with the third identifier or to the second network node associated with the second identifier, one or more other containers associated with the first identifier.

By including or configuring the communications manager 920 in accordance with aspects as described herein, the device 905 (e.g., a processor controlling or otherwise coupled with the receiver 910, the transmitter 915, the communications manager 920, or a combination thereof) may support techniques for more efficient utilization of communication resources.

Figure 10:
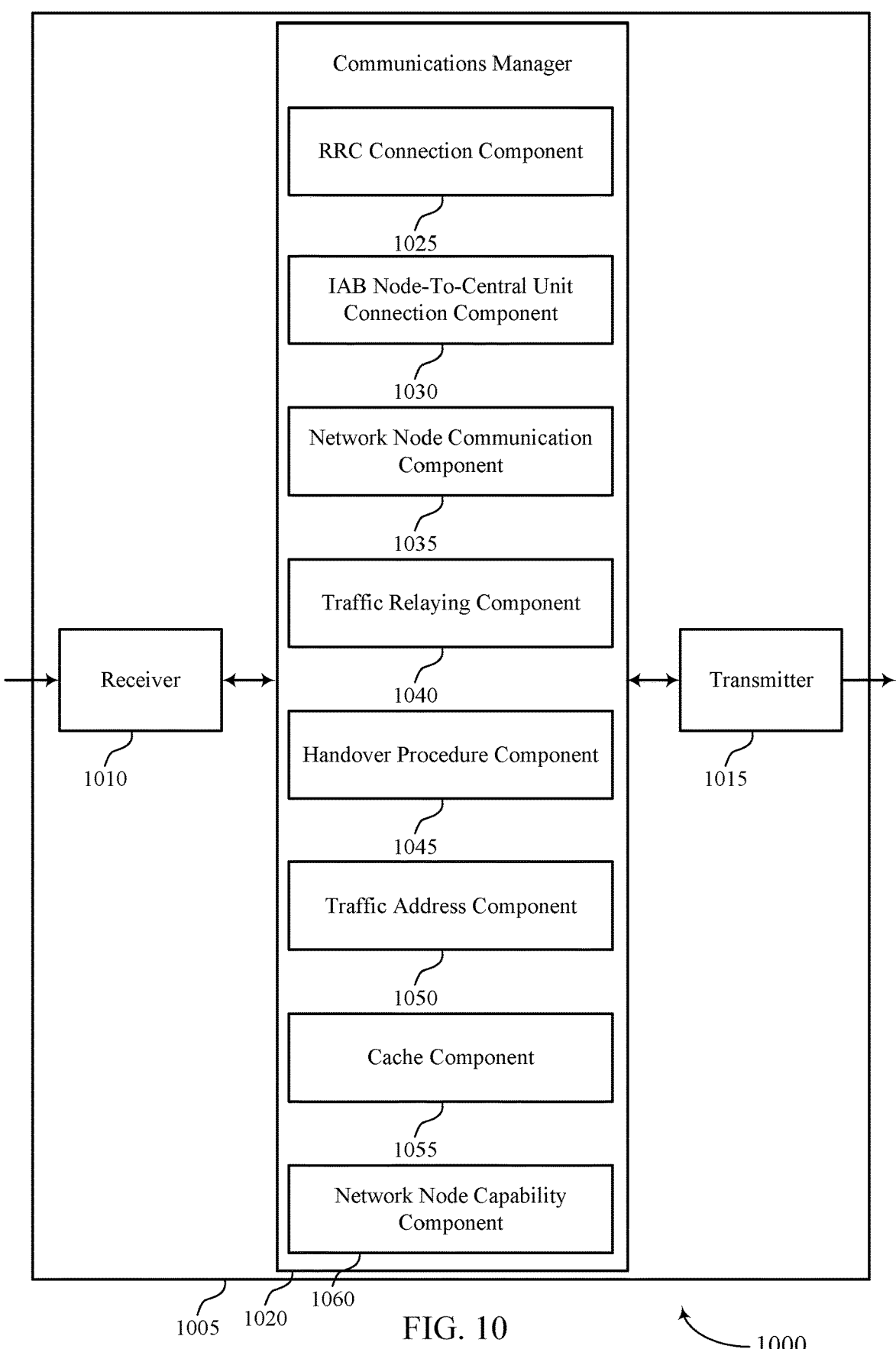

FIG. 10 shows a block diagram 1000 of a device 1005 that supports F1 connection options in IAB handover scenarios in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The device 1005, or various components thereof, may be an example of means for performing various aspects of F1 connection options in IAB handover scenarios as described herein. For example, the communications manager 1020 may include an RRC connection component 1025, an IAB node-to-central unit connection component 1030, a network node communication component 1035, a traffic relaying component 1040, a handover procedure component 1045, a traffic address component 1050, a cache component 1055, a network node capability component 1060, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at an IAB node in accordance with aspects as disclosed herein. The RRC connection component 1025 may be configured as or otherwise support a means for establishing a RRC connection with a first central unit of a first network node. The IAB node-to-central unit connection component 1030 may be configured as or otherwise support a means for receiving, from the first network node, an indication that the IAB node is to establish an IAB node-to-central unit connection with a second central unit of a second network node via the RRC connection between the IAB node and the first network node, where the indication is associated with a handover between the first network node and the second network node. The network node communication component 1035 may be configured as or otherwise support a means for communicating, with the second network node, via the IAB node-to-central unit connection using the RRC connection between the IAB node and the first network node.

Additionally, or alternatively, the communications manager 1020 may support wireless communications at a first network node in accordance with aspects as disclosed herein. The IAB node-to-central unit connection component 1030 may be configured as or otherwise support a means for participating in establishment of a communication path between an IAB node and a central unit of a second network node via a core network node, wherein the communication path is an IAB node-to-central unit connection. The traffic relaying component 1040 may be configured as or otherwise support a means for forwarding traffic between the IAB node and the central unit via the core network node using the IAB node-to-central unit connection.

Additionally, or alternatively, the communications manager 1020 may support wireless communications at a first network node in accordance with aspects as disclosed herein. The RRC connection component 1025 may be configured as or otherwise support a means for establishing a RRC connection with an IAB node, where the RRC connection is between a first central unit of the first network node and the IAB node. The IAB node-to-central unit connection component 1030 may be configured as or otherwise support a means for transmitting, to the IAB node, an indication that the IAB node is to establish an IAB node-to-central unit connection with a second central unit of a second network node via the RRC connection between the IAB node and the first network node, where the indication is associated with a handover between the first network node to the second network node. The traffic relaying component 1040 may be configured as or otherwise support a means for relaying (e.g., forwarding) traffic via the IAB node-to-central unit connection between the second network node and the IAB node using the RRC connection between the IAB node and the first network node.

Additionally, or alternatively, the communications manager 1020 may support wireless communications at a first network node in accordance with aspects as disclosed herein. The handover procedure component 1045 may be configured as or otherwise support a means for receiving an indication of a handover of an IAB node between a second network node to the first network node. The traffic address component 1050 may be configured as or otherwise support a means for determining, based on the indication, an address for forwarding traffic from the first network node to the IAB node via the second network node using an IAB node-to-central unit connection between a first central unit of the first network node and the IAB node, where the address is different from an IAB node address indicative of the IAB node. The network node communication component 1035 may be configured as or otherwise support a means for transmitting the traffic to the address determined by the first network node.

Additionally, or alternatively, the communications manager 1020 may support wireless communications at a core network node in accordance with aspects as disclosed herein. The traffic relaying component 1040 may be configured as or otherwise support a means for receiving, from a first network node, control information indicative that the core network node is to forward one or more containers of an IAB node-to-central unit connection of an IAB node, where the control information includes a first identifier associated with the IAB node and a second identifier associated with a second network node. The network node communication component 1035 may be configured as or otherwise support a means for transmitting the one or more containers to the second network node based on the second identifier being included in the control information. The cache component 1055 may be configured as or otherwise support a means for caching the control information that indicates that the core network node is to forward the one or more containers, the first identifier, the second identifier, and a third identifier associated with the first network node. The network node capability component 1060 may be configured as or otherwise support a means for transmitting, to the first network node associated with the third identifier or to the second network node associated with the second identifier, one or more other containers associated with the first identifier.

Figure 11:
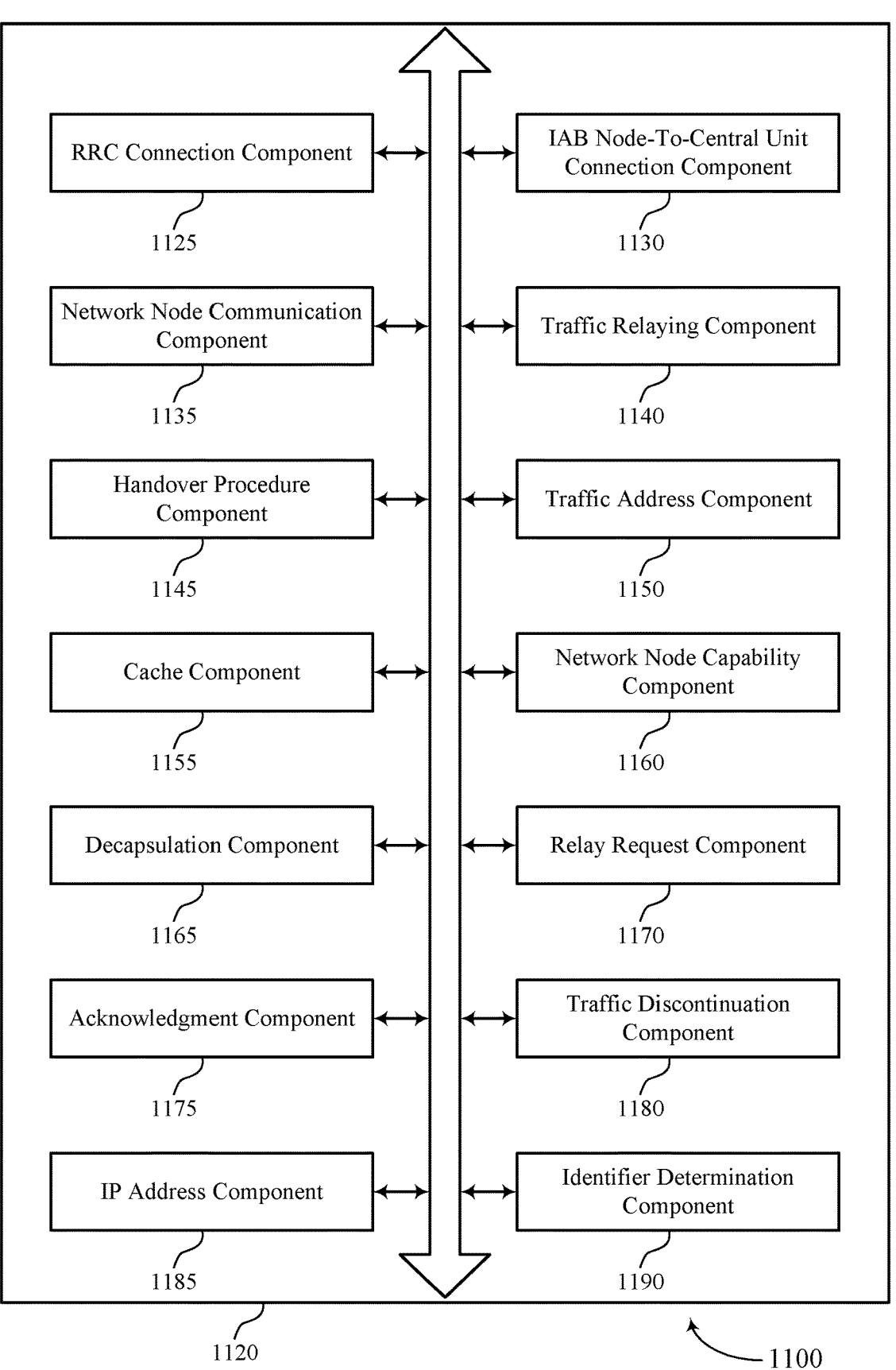
FIG. 11 shows a block diagram of a communications manager that supports F1 connection options in IAB handover scenarios in accordance with one or more aspects of the present disclosure.

FIG. 11 shows a block diagram 1100 of a communications manager 1120 that supports F1 connection options in IAB handover scenarios in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of F1 connection options in IAB handover scenarios as described herein. For example, the communications manager 1120 may include an RRC connection component 1125, an IAB node-to-central unit connection component 1130, a network node communication component 1135, a traffic relaying component 1140, a handover procedure component 1145, a traffic address component 1150, a cache component 1155, a network node capability component 1160, a decapsulation component 1165, a relay request component 1170, an acknowledgment component 1175, a traffic discontinuation component 1180, an IP address component 1185, an identifier determination component 1190, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at an IAB node in accordance with aspects as disclosed herein. The RRC connection component 1125 may be configured as or otherwise support a means for establishing a RRC connection with a first central unit of a first network node. The IAB node-to-central unit connection component 1130 may be configured as or otherwise support a means for receiving, from the first network node, an indication that the IAB node is to establish an IAB node-to-central unit connection with a second central unit of a second network node via the RRC connection between the IAB node and the first network node, where the indication is associated with a handover between the first network node to the second network node. The network node communication component 1135 may be configured as or otherwise support a means for communicating, with the second network node, via the IAB node-to-central unit connection using the RRC connection between the IAB node and the first network node.

In some aspects, the IAB node-to-central unit connection component 1130 may be configured as or otherwise support a means for establishing the IAB node-to-central unit connection with the second central unit of the second network node via the RRC connection between the IAB node and the first network node. In some aspects, the handover procedure component 1145 may be configured as or otherwise support a means for performing, after the IAB node-to-central unit connection is established, a handover procedure from the first network node to the second network node.

In some aspects, the handover procedure component 1145 may be configured as or otherwise support a means for performing a handover procedure from the second network node to the first network node. In some aspects, the IAB node-to-central unit connection component 1130 may be configured as or otherwise support a means for establishing, after the handover procedure, the IAB node-to-central unit connection with the second central unit of the second network node via the RRC connection between the IAB node and the first network node.

In some aspects, to support receiving the indication, the handover procedure component 1145 may be configured as or otherwise support a means for receiving, before the RRC connection with the first central unit of the first network node is established, a handover command indicating the IAB node is to establish the RRC connection with the first central unit of the first network node, where the first network node is a target node of the handover and the second network node is a source node of the handover, and where the handover command is the indication.

In some aspects, to support receiving the indication, the network node communication component 1135 may be configured as or otherwise support a means for receiving a configuration message indicating the IAB node to communicate traffic via the IAB node-to-central unit connection with the second central unit of the second network node using the RRC connection between the IAB node and the first network node, where the configuration message is the indication.

In some aspects, the configuration message includes an internet protocol address configuration, and the IAB node selects an internet protocol address based on the internet protocol address configuration and utilizes the internet protocol address for communications via the IAB node-to-central unit connection with the second central unit of the second network node.

In some aspects, to support communicating via the IAB node-to-central unit connection, the network node communication component 1135 may be configured as or otherwise support a means for communicating traffic via the IAB node-to-central unit connection, where the traffic is included in a non-access stratum container corresponding to the RRC connection.

In some aspects, to support communicating via the IAB node-to-central unit connection, the network node communication component 1135 may be configured as or otherwise support a means for communicating traffic via the IAB node-to-central unit connection, where the traffic includes an F1-application protocol message, a stream control transmission protocol message, or an internet protocol packet.

In some aspects, to support communicating via the IAB node-to-central unit connection, the network node communication component 1135 may be configured as or otherwise support a means for communicating the traffic to establish or re-establish the IAB node-to-central unit connection with the second central unit of the second network node.

In some aspects, to support communicating via the IAB node-to-central unit connection, the network node communication component 1135 may be configured as or otherwise support a means for transmitting, to the first network node using the RRC connection, an F1-C protocol data unit for the second network node, where the F1-C protocol data unit is encapsulated in a protocol data unit corresponding to the RRC connection.

In some aspects, to support communicating via the IAB node-to-central unit connection, the network node communication component 1135 may be configured as or otherwise support a means for receiving, from the first network node using the RRC connection, an F1-C protocol data unit from the second network node. In some aspects, to support communicating via the IAB node-to-central unit connection, the decapsulation component 1165 may be configured as or otherwise support a means for decapsulating the F1-C protocol data unit from the protocol data unit corresponding to the RRC connection.

In some aspects, the communication via the IAB node-to-central unit connection using the RRC connection includes an identifier associated with the second network node.

In some aspects, the first network node is a first base station or a first IAB-donor node, or the second network node is a second base station or a second IAB-donor node.

Additionally, or alternatively, the communications manager 1120 may support wireless communications at a first network node in accordance with aspects as disclosed herein. In some aspects, the IAB node-to-central unit connection component 1130 may be configured as or otherwise support a means for participating in establishment of a communication path between an IAB node and a central unit of a second network node via a core network node, wherein the communication path is an IAB node-to-central unit connection. In some aspects, the traffic relaying component 1140 may be configured as or otherwise support a means for forwarding traffic between the IAB node and the central unit via the core network node using the IAB node-to-central unit connection.

Additionally, or alternatively, the communications manager 1120 may support wireless communications at a first network node in accordance with aspects as disclosed herein. In some aspects, the RRC connection component 1125 may be configured as or otherwise support a means for establishing a RRC connection with an IAB node, where the RRC connection is between a first central unit of the first network node and the IAB node. In some aspects, the IAB node-to-central unit connection component 1130 may be configured as or otherwise support a means for transmitting, to the IAB node, an indication that the IAB node is to establish an IAB node-to-central unit connection with a second central unit of a second network node via the RRC connection between the IAB node and the first network node, where the indication is associated with a handover between the first network node to the second network node. The traffic relaying component 1140 may be configured as or otherwise support a means for relaying (e.g., forwarding) traffic via the IAB node-to-central unit connection between the second network node and the IAB node using the RRC connection between the IAB node and the first network node.

In some aspects, the handover procedure component 1145 may be configured as or otherwise support a means for performing, after the IAB node-to-central unit connection is established, a handover procedure to hand over the IAB node from the first network node to the second network node, where the first network node is a source node of the handover and the second network node is a target node of the handover procedure.

In some aspects, the handover procedure component 1145 may be configured as or otherwise support a means for performing, before the IAB node-to-central unit connection is established, a handover procedure to hand over the IAB node from the second network node to the first network node, where the first network node is a target node of the handover and the second network node is a source node of the handover procedure.

In some aspects, the handover procedure component 1145 may be configured as or otherwise support a means for preparing to hand over the IAB node from the second network node to the first network node, or from the first network node to the second network node.

In some aspects, the identifier determination component 1190 may be configured as or otherwise support a means for determining, based on preparation to hand over, a first identifier of the second network node, and a second identifier of a core network node associated with the IAB node, where the traffic is relayed via the IAB node-to-central unit connection via the core network node based on the first identifier or the second identifier.

In some aspects, to prepare to hand over the first node is configured to prepare to hand over via a base station interface or a core network node interface.

In some aspects, to support transmitting the indication, the handover procedure component 1145 may be configured as or otherwise support a means for transmitting a handover command indicating the IAB node to establish the RRC connection with the first central unit of the first network node, where the first network node is a target node of the handover and the second network node is a source node of the handover, and where the handover command is the indication.

In some aspects, to support transmitting the indication, the network node communication component 1135 may be configured as or otherwise support a means for transmitting a configuration message indicating the IAB node to communicate traffic via the IAB node-to-central unit connection with the second central unit of the second network node using the RRC connection between the IAB node and the first network node, where the configuration message is the indication.

In some aspects, the configuration message includes an internet protocol address configuration for selection of an internet protocol address for communications via the IAB node-to-central unit connection with the second central unit of the second network node.

In some aspects, the relay request component 1170 may be configured as or otherwise support a means for receiving, from the second network node, the IAB node, or a core network node a request to relay the traffic via the IAB node-to-central unit connection. In some aspects, the acknowledgment component 1175 may be configured as or otherwise support a means for transmitting a positive acknowledgment in response to the request, where the first network node relays the traffic based on transmitting the positive acknowledgment.

In some aspects, the traffic discontinuation component 1180 may be configured as or otherwise support a means for transmitting, to the second network node or a core network node via which the traffic is relayed, a message indicating that the traffic is discontinued.

In some aspects, the message includes an indication to release an identifier associated with the IAB node.

In some aspects, the network node capability component 1160 may be configured as or otherwise support a means for receiving a message indicating a capability of a core network node to relay traffic via the IAB node-to-central unit connection, where the traffic is relayed via the core network node based on the capability of the core network node.

In some aspects, the network node communication component 1135 may be configured as or otherwise support a means for communicating, with the second network node, an internet protocol address configuration for the IAB node-to-central unit connection, or a request for the internet protocol address configuration for the IAB node-to-central unit connection.

In some aspects, the IP address component 1185 may be configured as or otherwise support a means for configuring the IAB node with an internet protocol address for the IAB node-to-central unit connection with the second central unit of the second network node.

In some aspects, the traffic includes a first identifier of the second network node, a second identifier of a core network node associated with the IAB node, or a third identifier of the IAB node.

In some aspects, the traffic is relayed using a UE-associated message or a non-UE associated message, and the UE-associated message is associated with the IAB node.

In some aspects, the traffic is relayed via a base station interface with the second network node or a core network node interface.

In some aspects, the traffic is included in a non-access stratum container corresponding to the RRC connection.

In some aspects, the traffic includes an F1-application protocol message, a stream control transmission protocol message, or an internet protocol packet.

In some aspects, the traffic is related to establish or re-establish the IAB node-to-central unit connection with the second central unit of the second network node.

In some aspects, the first network node is a first base station or a first IAB-donor node, or the second network node is a second base station or a second IAB-donor node.

Additionally, or alternatively, the communications manager 1120 may support wireless communications at a first network node in accordance with aspects as disclosed herein. The handover procedure component 1145 may be configured as or otherwise support a means for receiving an indication of a handover of an IAB node between a second network node to the first network node. The traffic address component 1150 may be configured as or otherwise support a means for determining, based on the indication, an address for forwarding traffic from the first network node to the IAB node via the second network node using an IAB node-to-central unit connection between a first central unit of the first network node and the IAB node, where the address is different from an IAB node address indicative of the IAB node. In some aspects, the network node communication component 1135 may be configured as or otherwise support a means for transmitting the traffic to the address determined by the first network node.

In some aspects, the handover procedure component 1145 may be configured as or otherwise support a means for performing, before the IAB node-to-central unit connection is established, a handover procedure to hand over the IAB node from the first network node to the second network node, where the first network node is a source node of the handover and the second network node is a target node of the handover procedure.

In some aspects, the handover procedure component 1145 may be configured as or otherwise support a means for performing, after the IAB node-to-central unit connection is established, a handover procedure to hand over the IAB node from the second network node to the first network node, where the first network node is a target node of the handover and the second network node is a source node of the handover procedure.

In some aspects, the handover procedure component 1145 may be configured as or otherwise support a means for preparing to hand over the IAB node from the second network node to the first network node, or from the first network node to the second network node.

In some aspects, the identifier determination component 1190 may be configured as or otherwise support a means for determining, based on preparation to hand over, a first identifier of the first network node, and a second identifier of a core network node associated with the IAB node, where the traffic is transmitted via the core network node based on the first identifier, or the second identifier.

In some aspects, the first network node prepares to hand over via a base station interface with the second network node, and the first network nodes determines to transmit the traffic via the second network node based on an address of the second network node.

In some aspects, the first network node prepares to hand over via a core network node interface. In some aspects, the first network node determines to transmit the traffic via a core network node based on an address of the core network node.

In some aspects, the traffic relaying component 1140 may be configured as or otherwise support a means for transmitting, to the second network node, or a core network node, a request for the second network node to relay the traffic via the IAB node-to-central unit connection. In some aspects, the acknowledgment component 1175 may be configured as or otherwise support a means for receiving a positive acknowledgment in response to the request, where the traffic is transmitted based on the positive acknowledgment, and the first network node receives the traffic based on the positive acknowledgment.

In some aspects, the traffic discontinuation component 1180 may be configured as or otherwise support a means for transmitting, to the second network node, or a core management network node via which the traffic is transmitted, a message indicating that the traffic is discontinued.

In some aspects, the message includes an indication to release an identifier associated with the IAB node.

In some aspects, the network node capability component 1160 may be configured as or otherwise support a means for receiving a message indicating a capability of a core network node to relay the traffic via the IAB node-to-central unit connection, where the traffic is transmitted via the core network node based on the capability of the core network node.

In some aspects, the IP address component 1185 may be configured as or otherwise support a means for communicating, with the second network node, an internet protocol address configuration for the IAB node-to-central unit connection, or a request for the internet protocol address configuration for the IAB node-to-central unit connection.

In some aspects, the IP address component 1185 may be configured as or otherwise support a means for configuring the IAB node with an internet protocol address for the IAB node-to-central unit connection between the first central unit of the first network node and the IAB node.

In some aspects, the network node communication component 1135 may be configured as or otherwise support a means for receiving a protocol data unit of the traffic from the address.

In some aspects, the traffic includes a first identifier of the first network node, a second identifier of a core network node associated with the IAB node, or a third identifier of the IAB node.

In some aspects, the traffic is transmitted using a UE-associated message or a non-UE associated message, and the UE-associated message is associated with the IAB node.

In some aspects, the traffic includes an F1-application protocol message, a stream control transmission protocol message, or an internet protocol packet.

In some aspects, the traffic is transmitted to establish or re-establish the IAB node-to-central unit connection with the first central unit of the first network node.

In some aspects, the first network node is a first base station or a first IAB-donor node, or the second network node is a second base station or a second IAB-donor node.

Additionally, or alternatively, the communications manager 1120 may support wireless communications at a core network node in accordance with aspects as disclosed herein. In some aspects, the traffic relaying component 1140 may be configured as or otherwise support a means for receiving, from a first network node, control information indicative that the core network node is to forward one or more containers of an IAB node-to-central unit connection of an IAB node, where the control information includes a first identifier associated with the IAB node and a second identifier associated with a second network node. In some aspects, the network node communication component 1135 may be configured as or otherwise support a means for transmitting the one or more containers to the second network node based on the second identifier being included in the control information. The cache component 1155 may be configured as or otherwise support a means for caching the control information that indicates that the core network node is to forward the one or more containers, the first identifier, the second identifier, and a third identifier associated with the first network node. The network node capability component 1160 may be configured as or otherwise support a means for transmitting, to the first network node associated with the third identifier or to the second network node associated with the second identifier, one or more other containers associated with the first identifier.

In some aspects, to support receiving the control information, the relay request component 1170 may be configured as or otherwise support a means for receiving a request to forward the one or more containers to or from the second network node based on the second identifier being included in the control information.

In some aspects, the acknowledgment component 1175 may be configured as or otherwise support a means for transmitting an acknowledgment message in response to the request.

In some aspects, to support transmitting the one or more containers, or the one or more other containers, the network node communication component 1135 may be configured as or otherwise support a means for transmitting the one or more containers, or the one or more other containers based on the acknowledgment message.

In some aspects, the network node capability component 1160 may be configured as or otherwise support a means for transmitting a message indicating a capability of the core network node to relay traffic to the first network node, or the second network node via the IAB node-to-central unit connection, where communication of the control information, the one or more containers, or the one or more other containers is based on the capability of the core network node.

In some aspects, the network node capability component 1160 may be configured as or otherwise support a means for receiving a message indicating a capability of the second network node to relay traffic via the IAB node-to-central unit connection, where the control information, the one or more containers, or the one or more other containers are relayed to the second network node based on the capability of the second network node.

In some aspects, the traffic discontinuation component 1180 may be configured as or otherwise support a means for receiving, from the first network node, or the second network node a release message indicating the core network node to release the cached information, where the release message includes an identifier associated with the one or more containers or the first identifier.

In some aspects, the traffic relaying component 1140 may be configured as or otherwise support a means for relaying the release message to the first network node or the second network node.

In some aspects, the first network node is a source node of a handover procedure in which the IAB node is handed over from the first network node to the second network node.

In some aspects, the second network node is a source node of a handover procedure in which the IAB node is handed over from the second network node to the first network node.

In some aspects, the control information, the one or more containers, or the one or more other containers are included in a non-access stratum message.

In some aspects, the first network node corresponds to a type of network node or the second network node corresponds to the type of network node, the type of network node is an IAB node type.

In some aspects, the first identifier associated with the IAB node is indicated by the first network node or the second network node.

In some aspects, the control information includes a handover requirement indicator, a request to create a UE context, a handover request acknowledge indicator, a response to an indication to create a UE context, a notification of a handover procedure, a notification of receiving a notification of a handover procedure, an acknowledgment associated with a notification of a handover procedure, or an indication of completion of a release of a UE context.

In some aspects, the core network node is an access and mobility management function or a mobility management entity.

In some aspects, the first network node is a first base station or a first IAB-donor node, or the second network node is a second base station or a second IAB-donor node.

In some aspects, the first network node, or the second network node is a second core network node.

Figure 12:
FIG. 12 shows a diagram of a system including a device that supports F1 connection options in IAB handover scenarios in accordance with one or more aspects of the present disclosure.

FIG. 12 shows a diagram of a system 1200 including a device 1205 that supports F1 connection options in IAB handover scenarios in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some aspects, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting F1 connection options in IAB handover scenarios). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communications at an IAB node in accordance with aspects as disclosed herein. For example, the communications manager 1220 may be configured as or otherwise support a means for establishing a RRC connection with a first central unit of a first network node. The communications manager 1220 may be configured as or otherwise support a means for receiving, from the first network node, an indication that the IAB node is to establish an IAB node-to-central unit connection with a second central unit of a second network node via the RRC connection between the IAB node and the first network node, where the indication is associated with a handover between the first network node to the second network node. The communications manager 1220 may be configured as or otherwise support a means for communicating, with the second network node, via the IAB node-to-central unit connection using the RRC connection between the IAB node and the first network node.

Additionally, or alternatively, the communications manager 1220 may support wireless communications at a first network node in accordance with aspects as disclosed herein. For example, the communications manager 1220 may be configured as or otherwise support a means for establishing a RRC connection with an IAB node, where the RRC connection is between a first central unit of the first network node and the IAB node. The communications manager 1220 may be configured as or otherwise support a means for transmitting, to the IAB node, an indication that the IAB node is to establish an IAB node-to-central unit connection with a second central unit of a second network node via the RRC connection between the IAB node and the first network node, where the indication is associated with a handover between the first network node to the second network node. The communications manager 1220 may be configured as or otherwise support a means for relaying (e.g., forwarding) traffic via the IAB node-to-central unit connection between the second network node and the IAB node using the RRC connection between the IAB node and the first network node.

Additionally, or alternatively, the communications manager 1220 may support wireless communications at a first network node in accordance with aspects as disclosed herein. For example, the communications manager 1220 may be configured as or otherwise support a means for receiving an indication of a handover of an IAB node between a second network node to the first network node. The communications manager 1220 may be configured as or otherwise support a means for determining, based on the indication, an address for forwarding traffic from the first network node to the IAB node via the second network node using an IAB node-to-central unit connection between a first central unit of the first network node and the IAB node, where the address is different from an IAB node address indicative of the IAB node. The communications manager 1220 may be configured as or otherwise support a means for transmitting the traffic to the address determined by the first network node.

Additionally, or alternatively, the communications manager 1220 may support wireless communications at a core network node in accordance with aspects as disclosed herein. For example, the communications manager 1220 may be configured as or otherwise support a means for receiving, from a first network node, control information indicative that the core network node is to forward one or more containers of an IAB node-to-central unit connection of an IAB node, where the control information includes a first identifier associated with the IAB node and a second identifier associated with a second network node. The communications manager 1220 may be configured as or otherwise support a means for transmitting the one or more containers to the second network node based on the second identifier being included in the control information. The communications manager 1220 may be configured as or otherwise support a means for caching the control information that indicates that the core network node is to forward the one or more containers, the first identifier, the second identifier, and a third identifier associated with the first network node. The communications manager 1220 may be configured as or otherwise support a means for transmitting, to the first network node associated with the third identifier or to the second network node associated with the second identifier, one or more other containers associated with the first identifier.

By including or configuring the communications manager 1220 in accordance with aspects as described herein, the device 1205 may support techniques for improved communication reliability, reduced latency, and improved coordination between devices, longer battery life, improved utilization of processing capability.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the processor 1235, the memory 1225, the code 1230, the transceiver 1210, or any combination thereof.

For example, the code 1230 may include instructions executable by the processor 1235 to cause the device 1205 to perform various aspects of F1 connection options in IAB handover scenarios as described herein, or the processor 1235 and the memory 1225 may be otherwise configured to perform or support such operations.

FIG. 13 shows a flowchart illustrating a method 1300 that supports F1 connection options in IAB handover scenarios in accordance with one or more aspects of the present disclosure. The operations of the method 1300 may be implemented by a network entity or its components as described herein. For example, the operations of the method 1300 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1305, the method may include establishing a RRC connection with a first central unit of a first network node. The operations of 1305 may be performed in accordance with aspects as disclosed herein. In some aspects, aspects of the operations of 1305 may be performed by an RRC connection component 1125 as described with reference to FIG. 11.

At 1310, the method may include receiving, from the first network node, an indication that the IAB node is to establish an IAB node-to-central unit connection with a second central unit of a second network node via the RRC connection between the IAB node and the first network node, where the indication is associated with a handover between the first network node to the second network node. The operations of 1310 may be performed in accordance with aspects as disclosed herein. In some aspects, aspects of the operations of 1310 may be performed by an IAB node-to-central unit connection component 1130 as described with reference to FIG. 11.

At 1315, the method may include communicating, with the second network node, via the IAB node-to-central unit connection using the RRC connection between the IAB node and the first network node. The operations of 1315 may be performed in accordance with aspects as disclosed herein. In some aspects, aspects of the operations of 1315 may be performed by a network node communication component 1135 as described with reference to FIG. 11.

FIG. 14 shows a flowchart illustrating a method 1400 that supports F1 connection options in IAB handover scenarios in accordance with one or more aspects of the present disclosure. The operations of the method 1400 may be implemented by a network entity or its components as described herein. For example, the operations of the method 1400 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1405, the method may include establishing a RRC connection with an IAB node, where the RRC connection is between a first central unit of the first network node and the IAB node. The operations of 1405 may be performed in accordance with aspects as disclosed herein. In some aspects, aspects of the operations of 1405 may be performed by an RRC connection component 1125 as described with reference to FIG. 11.

At 1410, the method may include transmitting, to the IAB node, an indication that the IAB node is to establish an IAB node-to-central unit connection with a second central unit of a second network node via the RRC connection between the IAB node and the first network node, where the indication is associated with a handover between the first network node to the second network node. The operations of 1410 may be performed in accordance with aspects as disclosed herein. In some aspects, aspects of the operations of 1410 may be performed by an IAB node-to-central unit connection component 1130 as described with reference to FIG. 11.

At 1415, the method may include relaying traffic via the IAB node-to-central unit connection between the second network node and the IAB node using the RRC connection between the IAB node and the first network node. The operations of 1415 may be performed in accordance with aspects as disclosed herein. In some aspects, aspects of the operations of 1415 may be performed by a traffic relaying component 1140 as described with reference to FIG. 11.

FIG. 15 shows a flowchart illustrating a method 1500 that supports F1 connection options in IAB handover scenarios in accordance with one or more aspects of the present disclosure. The operations of the method 1500 may be implemented by a network entity or its components as described herein. For example, the operations of the method 1500 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1505, the method may include receiving an indication of a handover of an IAB node between a second network node to the first network node. The operations of 1505 may be performed in accordance with aspects as disclosed herein. In some aspects, aspects of the operations of 1505 may be performed by a handover procedure component 1145 as described with reference to FIG. 11.

At 1510, the method may include determining, based on the indication, an address for forwarding traffic from the first network node to the IAB node via the second network node using an IAB node-to-central unit connection between a first central unit of the first network node and the IAB node, where the address is different from an IAB node address indicative of the IAB node. The operations of 1510 may be performed in accordance with aspects as disclosed herein. In some aspects, aspects of the operations of 1510 may be performed by a traffic address component 1150 as described with reference to FIG. 11.

At 1515, the method may include transmitting the traffic to the address determined by the first network node. The operations of 1515 may be performed in accordance with aspects as disclosed herein. In some aspects, aspects of the operations of 1515 may be performed by a network node communication component 1135 as described with reference to FIG. 11.

FIG. 16 shows a flowchart illustrating a method 1600 that supports F1 connection options in IAB handover scenarios in accordance with one or more aspects of the present disclosure. The operations of the method 1600 may be implemented by a network entity or its components as described herein. For example, the operations of the method 1600 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1605, the method may include receiving, from a first network node, control information indicative that the core network node is to forward one or more containers of an IAB node-to-central unit connection of an IAB node, where the control information includes a first identifier associated with the IAB node and a second identifier associated with a second network node. The operations of 1605 may be performed in accordance with aspects as disclosed herein. In some aspects, aspects of the operations of 1605 may be performed by a traffic relaying component 1140 as described with reference to FIG. 11.

At 1610, the method may include transmitting the one or more containers to the second network node based on the second identifier being included in the control information. The operations of 1610 may be performed in accordance with aspects as disclosed herein. In some aspects, aspects of the operations of 1610 may be performed by a network node communication component 1135 as described with reference to FIG. 11.

At 1615, the method may include caching the control information that indicates that the core network node is to forward the one or more containers, the first identifier, the second identifier, and a third identifier associated with the first network node. The operations of 1615 may be performed in accordance with aspects as disclosed herein. In some aspects, aspects of the operations of 1615 may be performed by a cache component 1155 as described with reference to FIG. 11.

At 1620, the method may include transmitting, to the first network node associated with the third identifier or to the second network node associated with the second identifier, one or more other containers associated with the first identifier. The operations of 1620 may be performed in accordance with aspects as disclosed herein. In some aspects, aspects of the operations of 1620 may be performed by a network node capability component 1160 as described with reference to FIG. 11.

FIG. 17 shows a flowchart illustrating a method 1700 that supports f1 connection options in IAB handover scenarios in accordance with aspects of the present disclosure. The operations of the method 1700 may be implemented by a network entity or its components as described herein. For example, the operations of the method 1700 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1705, the method may include participating in establishment of a communication path between an IAB node and a central unit of a second network node via a core network node, where the communication path is an IAB node-to-central unit connection. The operations of block 1705 may be performed in accordance with examples as disclosed herein. In some examples, aspects of the operations of 1705 may be performed by an IAB node-to-central unit connection component 1130 as described with reference to FIG. 11.

At 1710, the method may include forwarding traffic between the IAB node and the central unit via the core network node using the IAB node-to-central unit connection. The operations of block 1710 may be performed in accordance with examples as disclosed herein. In some examples, aspects of the operations of 1710 may be performed by a traffic relaying component 1140 as described with reference to FIG. 11.

The following provides an overview of aspects of the present disclosure:

Aspect 1: A method for wireless communications at an integrated access and backhaul (IAB) node, comprising: establishing a radio resource control connection with a first central unit of a first network node; receiving, from the first network node, an indication that the IAB node is to establish an IAB node-to-central unit connection with a second central unit of a second network node via the radio resource control connection between the IAB node and the first network node, wherein the indication is associated with a handover between the first network node to the second network node; and communicating, with the second network node, via the IAB node-to-central unit connection using the radio resource control connection between the IAB node and the first network node.

Aspect 2: The method of aspect 1, further comprising: establishing the IAB node-to-central unit connection with the second central unit of the second network node via the radio resource control connection between the IAB node and the first network node; and performing, after the IAB node-to-central unit connection is established, a handover procedure from the first network node to the second network node.

Aspect 3: The method of any of aspects 1 through 2, further comprising: performing a handover procedure from the second network node to the first network node; and establishing, after the handover procedure, the IAB node-to-central unit connection with the second central unit of the second network node via the radio resource control connection between the IAB node and the first network node.

Aspect 4: The method of any of aspects 1 through 3, wherein receiving the indication further comprises: receiving, before the radio resource control connection with the first central unit of the first network node is established, a handover command indicating the IAB node is to establish the radio resource control connection with the first central unit of the first network node, wherein the first network node is a target node of the handover and the second network node is a source node of the handover, and wherein the handover command is the indication.

Aspect 5: The method of any of aspects 1 through 4, wherein receiving the indication further comprises: receiving a configuration message indicating the IAB node to communicate traffic via the IAB node-to-central unit connection with the second central unit of the second network node using the radio resource control connection between the IAB node and the first network node, wherein the configuration message is the indication.

Aspect 6: The method of aspect 5, wherein the configuration message comprises an internet protocol address configuration, and the IAB node selects an internet protocol address based on the internet protocol address configuration and utilizes the internet protocol address for communications via the IAB node-to-central unit connection with the second central unit of the second network node.

Aspect 7: The method of any of aspects 1 through 6, wherein communicating via the IAB node-to-central unit connection further comprises: communicating traffic via the IAB node-to-central unit connection, wherein the traffic is included in a non-access stratum container corresponding to the radio resource control connection.

Aspect 8: The method of any of aspects 1 through 7, wherein communicating via the IAB node-to-central unit connection further comprises: communicating traffic via the IAB node-to-central unit connection, wherein the traffic comprises an F1-application protocol message, a stream control transmission protocol message, or an internet protocol packet.

Aspect 9: The method of aspect 8, wherein communicating via the IAB node-to-central unit connection further comprises: communicating the traffic to establish or re-establish the IAB node-to-central unit connection with the second central unit of the second network node.

Aspect 10: The method of any of aspects 1 through 9, wherein communicating via the IAB node-to-central unit connection further comprises: transmitting, to the first network node using the radio resource control connection, an F1-C protocol data unit for the second network node, wherein the F1-C protocol data unit is encapsulated in a protocol data unit corresponding to the radio resource control connection.

Aspect 11: The method of any of aspects 1 through 10, wherein communicating via the IAB node-to-central unit connection further comprises: receiving, from the first network node using the radio resource control connection, an F1-C protocol data unit from the second network node; and decapsulating the F1-C protocol data unit from the protocol data unit corresponding to the radio resource control connection.

Aspect 12: The method of any of aspects 1 through 11, wherein the communication via the IAB node-to-central unit connection using the radio resource control connection comprises an identifier associated with the second network node.

Aspect 13: The method of any of aspects 1 through 12, wherein the first network node is a first base station or a first IAB-donor node, or the second network node is a second base station or a second IAB-donor node.

Aspect 14: A method for wireless communications at a first network node, comprising: establishing a radio resource control connection with an integrated access and backhaul (IAB) node, wherein the radio resource control connection is between a first central unit of the first network node and the IAB node; transmitting, to the IAB node, an indication that the IAB node is to establish an IAB node-to-central unit connection with a second central unit of a second network node via the radio resource control connection between the IAB node and the first network node, wherein the indication is associated with a handover between the first network node to the second network node; and relaying traffic via the IAB node-to-central unit connection between the second network node and the IAB node using the radio resource control connection between the IAB node and the first network node.

Aspect 15: The method of aspect 14, further comprising: performing, after the IAB node-to-central unit connection is established, a handover procedure to hand over the IAB node from the first network node to the second network node, wherein the first network node is a source node of the handover and the second network node is a target node of the handover procedure.

Aspect 16: The method of any of aspects 14 through 15, further comprising: performing, before the IAB node-to-central unit connection is established, a handover procedure to hand over the IAB node from the second network node to the first network node, wherein the first network node is a target node of the handover and the second network node is a source node of the handover procedure.

Aspect 17: The method of any of aspects 14 through 16, further comprising: preparing to hand over the IAB node from the second network node to the first network node, or from the first network node to the second network node.

Aspect 18: The method of aspect 17, further comprising: determining, based on preparation to hand over, a first identifier of the second network node, and a second identifier of a core network node associated with the IAB node, wherein the traffic is relayed via the IAB node-to-central unit connection via the core network node based on the first identifier or the second identifier.

Aspect 19: The method of any of aspects 17 through 18, wherein to prepare to hand over the first node is configured to prepare to hand over via a base station interface or a core network node interface.

Aspect 20: The method of any of aspects 14 through 19, wherein transmitting the indication further comprises: transmitting a handover command indicating the IAB node to establish the radio resource control connection with the first central unit of the first network node, wherein the first network node is a target node of the handover and the second network node is a source node of the handover, and wherein the handover command is the indication.

Aspect 21: The method of any of aspects 14 through 20, wherein transmitting the indication further comprises: transmitting a configuration message indicating the IAB node to communicate traffic via the IAB node-to-central unit connection with the second central unit of the second network node using the radio resource control connection between the IAB node and the first network node, wherein the configuration message is the indication.

Aspect 22: The method of aspect 21, wherein the configuration message comprises an internet protocol address configuration for selection of an internet protocol address for communications via the IAB node-to-central unit connection with the second central unit of the second network node.

Aspect 23: The method of any of aspects 14 through 22, further comprising: receiving, from the second network node, the IAB node, or a core network node a request to relay the traffic via the IAB node-to-central unit connection; and transmitting a positive acknowledgment in response to the request, wherein the first network node relays the traffic based on transmitting the positive acknowledgment.

Aspect 24: The method of any of aspects 14 through 23, further comprising: transmitting, to the second network node or a core network node via which the traffic is relayed, a message indicating that the traffic is discontinued.

Aspect 25: The method of aspect 24, wherein the message comprises an indication to release an identifier associated with the IAB node.

Aspect 26: The method of any of aspects 14 through 25, further comprising: receiving a message indicating a capability of a core network node to relay traffic via the IAB node-to-central unit connection, wherein the traffic is relayed via the core network node based on the capability of the core network node.

Aspect 27: The method of any of aspects 14 through 26, further comprising: communicating, with the second network node, an internet protocol address configuration for the IAB node-to-central unit connection, or a request for the internet protocol address configuration for the IAB node-to-central unit connection.

Aspect 28: The method of any of aspects 14 through 27, further comprising: configuring the IAB node with an internet protocol address for the IAB node-to-central unit connection with the second central unit of the second network node.

Aspect 29: The method of any of aspects 14 through 28, wherein the traffic comprises a first identifier of the second network node, a second identifier of a core network node associated with the IAB node, or a third identifier of the IAB node.

Aspect 30: The method of any of aspects 14 through 29, wherein the traffic is relayed using a UE-associated message or a non-UE associated message, and the UE-associated message is associated with the IAB node.

Aspect 31: The method of any of aspects 14 through 30, wherein the traffic is relayed via a base station interface with the second network node or a core network node interface.

Aspect 32: The method of any of aspects 14 through 31, wherein the traffic is included in a non-access stratum container corresponding to the radio resource control connection.

Aspect 33: The method of any of aspects 14 through 32, wherein the traffic comprises an F1-application protocol message, a stream control transmission protocol message, or an internet protocol packet.

Aspect 34: The method of any of aspects 14 through 33, wherein the traffic is related to establish or re-establish the IAB node-to-central unit connection with the second central unit of the second network node.

Aspect 35: The method of any of aspects 14 through 34, wherein the first network node is a first base station or a first IAB-donor node, or the second network node is a second base station or a second IAB-donor node.

Aspect 36: A method for wireless communications at a first network node, comprising: receiving an indication of a handover of an integrated access and backhaul (IAB) node between a second network node to the first network node; determining, based on the indication, an address for forwarding traffic from the first network node to the IAB node via the second network node using an IAB node-to-central unit connection between a first central unit of the first network node and the IAB node, wherein the address is different from an IAB node address indicative of the IAB node; and transmitting the traffic to the address determined by the first network node.

Aspect 37: The method of aspect 36, further comprising: performing, before the IAB node-to-central unit connection is established, a handover procedure to hand over the IAB node from the first network node to the second network node, wherein the first network node is a source node of the handover and the second network node is a target node of the handover procedure.

Aspect 38: The method of any of aspects 36 through 37, further comprising: performing, after the IAB node-to-central unit connection is established, a handover procedure to hand over the IAB node from the second network node to the first network node, wherein the first network node is a target node of the handover and the second network node is a source node of the handover procedure.

Aspect 39: The method of any of aspects 36 through 38, further comprising: preparing to hand over the IAB node from the second network node to the first network node, or from the first network node to the second network node.

Aspect 40: The method of aspect 39, further comprising: determining, based on preparation to hand over, a first identifier of the first network node, and a second identifier of a core network node associated with the IAB node, wherein the traffic is transmitted via the core network node based on the first identifier, or the second identifier.

Aspect 41: The method of any of aspects 39 through 40, wherein the first network node prepares to hand over via a base station interface with the second network node, and the first network nodes determines to transmit the traffic via the second network node based on an address of the second network node.

Aspect 42: The method of any of aspects 39 through 41, wherein the first network node prepares to hand over via a core network node interface, and the first network node determines to transmit the traffic via a core network node based on an address of the core network node.

Aspect 43: The method of any of aspects 36 through 42, further comprising: transmitting, to the second network node, or a core network node, a request for the second network node to relay the traffic via the IAB node-to-central unit connection; and receiving a positive acknowledgment in response to the request, wherein the traffic is transmitted based on the positive acknowledgment, and the first network node receives the traffic based on the positive acknowledgment.

Aspect 44: The method of any of aspects 36 through 43, further comprising: transmitting, to the second network node, or a core management network node via which the traffic is transmitted, a message indicating that the traffic is discontinued.

Aspect 45: The method of aspect 44, wherein the message comprises an indication to release an identifier associated with the IAB node.

Aspect 46: The method of any of aspects 36 through 45, further comprising: receiving a message indicating a capability of a core network node to relay the traffic via the IAB node-to-central unit connection, wherein the traffic is transmitted via the core network node based on the capability of the core network node.

Aspect 47: The method of any of aspects 36 through 46, further comprising: communicating, with the second network node, an internet protocol address configuration for the IAB node-to-central unit connection, or a request for the internet protocol address configuration for the IAB node-to-central unit connection.

Aspect 48: The method of any of aspects 36 through 47, further comprising: configuring the IAB node with an internet protocol address for the IAB node-to-central unit connection between the first central unit of the first network node and the IAB node.

Aspect 49: The method of any of aspects 36 through 48, further comprising: receiving a protocol data unit of the traffic from the address.

Aspect 50: The method of any of aspects 36 through 49, wherein the traffic comprises a first identifier of the first network node, a second identifier of a core network node associated with the IAB node, or a third identifier of the IAB node.

Aspect 51: The method of any of aspects 36 through 50, wherein the traffic is transmitted using a UE-associated message or a non-UE associated message, and the UE-associated message is associated with the IAB node.

Aspect 52: The method of any of aspects 36 through 51, wherein the traffic comprises an F1-application protocol message, a stream control transmission protocol message, or an internet protocol packet.

Aspect 53: The method of any of aspects 36 through 52, wherein the traffic is transmitted to establish or re-establish the IAB node-to-central unit connection with the first central unit of the first network node.

Aspect 54: The method of any of aspects 36 through 53, wherein the first network node is a first base station or a first IAB-donor node, or the second network node is a second base station or a second IAB-donor node.

Aspect 55: A method for wireless communications at a core network node, comprising: receiving, from a first network node, control information indicative that the core network node is to forward one or more containers of an integrated access and backhaul (IAB) node-to-central unit connection of an IAB node, wherein the control information includes a first identifier associated with the IAB node and a second identifier associated with a second network node; transmitting the one or more containers to the second network node based on the second identifier being included in the control information; caching the control information that indicates that the core network node is to forward the one or more containers, the first identifier, the second identifier, and a third identifier associated with the first network node; and transmitting, to the first network node associated with the third identifier or to the second network node associated with the second identifier, one or more other containers associated with the first identifier.

Aspect 56: The method of aspect 55, wherein receiving the control information further comprises: receiving a request to forward the one or more containers to or from the second network node based on the second identifier being included in the control information.

Aspect 57: The method of aspect 56, further comprising: transmitting an acknowledgment message in response to the request.

Aspect 58: The method of aspect 57, wherein transmitting the one or more containers, or the one or more other containers, further comprises: transmitting the one or more containers, or the one or more other containers based on the acknowledgment message.

Aspect 59: The method of any of aspects 55 through 58, further comprising: transmitting a message indicating a capability of the core network node to relay traffic to the first network node, or the second network node via the IAB node-to-central unit connection, wherein communication of the control information, the one or more containers, or the one or more other containers is based on the capability of the core network node.

Aspect 60: The method of any of aspects 55 through 59, further comprising: receiving a message indicating a capability of the second network node to relay traffic via the IAB node-to-central unit connection, wherein the control information, the one or more containers, or the one or more other containers are relayed to the second network node based on the capability of the second network node.

Aspect 61: The method of any of aspects 55 through 60, further comprising: receiving, from the first network node, or the second network node a release message indicating the core network node to release the cached information, wherein the release message comprises an identifier associated with the one or more containers or the first identifier.

Aspect 62: The method of aspect 61, further comprising: relaying the release message to the first network node or the second network node.

Aspect 63: The method of any of aspects 55 through 62, wherein the first network node is a source node of a handover procedure in which the IAB node is handed over from the first network node to the second network node.

Aspect 64: The method of any of aspects 55 through 63, wherein the second network node is a source node of a handover procedure in which the IAB node is handed over from the second network node to the first network node.

Aspect 65: The method of any of aspects 55 through 64, wherein the control information, the one or more containers, or the one or more other containers are included in a non-access stratum message.

Aspect 66: The method of any of aspects 55 through 65, wherein the first network node corresponds to a type of network node or the second network node corresponds to the type of network node, the type of network node is an IAB node type.

Aspect 67: The method of any of aspects 55 through 66, wherein the first identifier associated with the IAB node is indicated by the first network node or the second network node.

Aspect 68: The method of any of aspects 55 through 67, wherein the control information comprises a handover requirement indicator, a request to create a UE context, a handover request acknowledge indicator, a response to an indication to create a UE context, a notification of a handover procedure, a notification of receiving a notification of a handover procedure, an acknowledgment associated with a notification of a handover procedure, or an indication of completion of a release of a UE context.

Aspect 69: The method of any of aspects 55 through 68, wherein the core network node is an access and mobility management function or a mobility management entity.

Aspect 70: The method of any of aspects 55 through 69, wherein the first network node is a first base station or a first IAB-donor node, or the second network node is a second base station or a second IAB-donor node.

Aspect 71: The method of any of aspects 55 through 70, wherein the first network node, or the second network node is a second core network node.

Aspect 72: An integrated access and backhaul (IAB) node (e.g., an apparatus for wireless communications at an IAB node), comprising a memory, and at least one processor coupled to the memory, wherein the at least one processor is configured to perform a method of any of aspects 1 through 13.

Aspect 73: An apparatus for wireless communications at an integrated access and backhaul (IAB) node, comprising at least one means for performing a method of any of aspects 1 through 13.

Aspect 74: A non-transitory computer-readable medium having code for wireless communication stored thereon that, when executed by an integrated access and backhaul (IAB) node, causes the network node to perform a method of any of aspects 1 through 13.

Aspect 75: A first network node for wireless communications (e.g., an apparatus for wireless communications at a first network node), comprising a memory, and at least one processor coupled to the memory, wherein the at least one processor is configured to perform a method of any of aspects 14 through 35.

Aspect 76: An apparatus for wireless communications at a first network node, comprising at least one means for performing a method of any of aspects 14 through 35.

Aspect 77: A non-transitory computer-readable medium having code for wireless communication stored thereon that, when executed by a first network node, causes the network node to perform a method of any of aspects 14 through 35.

Aspect 78: A first network node for wireless communications (e.g., an apparatus for wireless communications at a first network node), comprising a memory, and at least one processor coupled to the memory, wherein the at least one processor is configured to perform a method of any of aspects 36 through 54.

Aspect 79: An apparatus for wireless communications at a first network node, comprising at least one means for performing a method of any of aspects 36 through 54.

Aspect 80: A non-transitory computer-readable medium having code for wireless communication stored thereon that, when executed by a first network node, causes the network node to perform a method of any of aspects 36 through 54.

Aspect 81: A core network node for wireless communications (e.g., an apparatus for wireless communications at a core network node), comprising a memory, and at least one processor coupled to the memory, wherein the at least one processor is configured to perform a method of any of aspects 55 through 71.

Aspect 82: An apparatus for wireless communications at a core network node, comprising at least one means for performing a method of any of aspects 55 through 71.

Aspect 83: A non-transitory computer-readable medium having code for wireless communication stored thereon that, when executed by a core network node, causes the network node to perform a method of any of aspects 55 through 71.

Aspect 84: A method for wireless communication performed by a first network node, comprising: participating in establishment of a communication path between an integrated access and backhaul (IAB) node and a central unit of a second network node via a core network node, wherein the communication path is an IAB node-to-central unit connection; and forwarding traffic between the IAB node and the central unit via the core network node using the IAB node-to-central unit connection.

Aspect 85: The method of aspect 84, wherein the second network node is different from the first network node and the central unit of the second network node is a second central unit, and wherein participating in the establishment of the communication path further comprises: establishing a radio resource control connection with the IAB node, wherein the radio resource control connection is between a first central unit of the first network node and the IAB node; and transmitting, to the IAB node, first control information indicating that the IAB node is to establish the IAB node-to-central unit connection with the second central unit of the second network node via the radio resource control connection between the IAB node and the first network node, wherein the first control information is associated with a handover of the IAB node between the first network node and the second network node.

Aspect 86: The method of aspect 85, further comprising: performing a first handover procedure to hand over the IAB node from the first network node to the second network node after the IAB node-to-central unit connection is established, or a second handover procedure to hand over the IAB node from the second network node to the first network node before the IAB node-to-central unit connection is established.

Aspect 87: The method of any of aspects 85 through 86, further comprising: preparing to hand over the IAB node from the second network node to the first network node, or from the first network node to the second network node; determining, based on preparing to hand over, a first identifier of the second network node, and a second identifier of the core network node; and forwarding the traffic via the IAB node-to-central unit connection via the core network node based on the first identifier or the second identifier.

Aspect 88: The method of any of aspects 85 through 87, wherein, transmitting the first control information, further comprises: transmitting a configuration message indicating the IAB node to communicate traffic via the IAB node-to-central unit connection with the second central unit of the second network node using the radio resource control connection between the IAB node and the first network node, wherein the configuration message is the first control information and comprises an internet protocol address configuration for selection of an internet protocol address for communications via the IAB node-to-central unit connection with the second central unit of the second network node; and configuring the IAB node with the internet protocol address for the IAB node-to-central unit connection with the second central unit of the second network node.

Aspect 89: The method of any of aspects 85 through 88, further comprising: receiving, from the second network node, the IAB node, or the core network node a request to forward the traffic via the IAB node-to-central unit connection; and transmitting a positive acknowledgment in response to the request, wherein forwarding the traffic is based on transmitting the positive acknowledgment.

Aspect 90: The method of any of aspects 85 through 89, further comprising: transmitting, to the second network node or the core network node via which the traffic is forwarded, a message indicating that the traffic is discontinued, the message comprising an indication to release an identifier associated with the IAB node.

Aspect 91: The method of any of aspects 85 through 90, further comprising: communicating, with the second network node, an internet protocol address configuration for the IAB node-to-central unit connection, or a request for the internet protocol address configuration for the IAB node-to-central unit connection.

Aspect 92: The method aspect 84, wherein the second network node is the first network node, and wherein participating in the establishment of the communication path further comprises: receiving an indication of a handover of the IAB node between the first network node and a third network node; and determining, based on the indication, an address for forwarding the traffic from the first network node to the IAB node via the third network node using the IAB node-to-central unit connection, wherein the address is different from an IAB node address indicative of the IAB node.

Aspect 93: The method of aspect 92, further comprising: performing a first handover procedure to hand over the IAB node from the first network node to the third network node before the IAB node-to-central unit connection is established, or a second handover procedure to hand over the IAB node from the third network node to the first network node after the IAB node-to-central unit connection is established.

Aspect 94: The method of any of aspects 92 through 93, further comprising: preparing to hand over the IAB node from the third network node to the first network node, or from the first network node to the third network node; determining, based on preparation to hand over, a first identifier of the first network node, and a second identifier of the core network node; and forwarding the traffic via the core network node based on the first identifier, or the second identifier.

Aspect 95: The method of aspect 94, wherein preparing to hand over further comprises: preparing to hand over via a network node interface with the third network node; and determining to forward the traffic via the third network node based on a second address of the third network node.

Aspect 96: The method of any of aspects 94 through 95, wherein, preparing to hand over further comprises: preparing to hand over via a core network node interface; and determining to forward the traffic via the core network node based on a second address of the core network node.

Aspect 97: The method of any of aspects 92 through 96, further comprising: transmitting, to the third network node, or the core network node, a request for the third network node to forward the traffic via the IAB node-to-central unit connection; receiving a positive acknowledgment in response to the request; forward the traffic based on the positive acknowledgment; and receiving the traffic based on the positive acknowledgment.

Aspect 98: The method of any of aspects 92 through 97, further comprising: transmitting, to the third network node, or the core network node via which the traffic is forwarded, a message indicating that the traffic is discontinued, the message comprising a second indication to release an identifier associated with the IAB node.

Aspect 99: The method of any of aspects 92 through 98, further comprising: communicating, with the third network node, an internet protocol address configuration for the IAB node-to-central unit connection, or a request for the internet protocol address configuration for the IAB node-to-central unit connection; and configuring the IAB node with an internet protocol address for the IAB node-to-central unit connection.

Aspect 100: The method of any of aspects 92 through 99, further comprising: receiving a protocol data unit of the traffic from the address.

Aspect 101: The method of any of aspects 84 through 100, further comprising: receiving a message indicating a capability of the core network node to relay traffic via the IAB node-to-central unit connection; and relaying the traffic via the core network node based on the capability of the core network node.

Aspect 102: The method of any of aspects 84 through 101, wherein the traffic comprises a first identifier of the first network node, a second identifier of the second network node, a third identifier of the core network node associated with the IAB node, or a fourth identifier of the IAB node.

Aspect 103: The method of any of aspects 84 through 102, wherein forwarding the traffic further comprises: forwarding the traffic using a UE-associated message or a non-UE associated message, wherein the UE-associated message is associated with the IAB node.

Aspect 104: The method of any of aspects 84 through 103, wherein the traffic comprises an F1 application protocol message, a stream control transmission protocol message, or an internet protocol packet, the method further comprising: establishing or re-establishing the IAB node-to-central unit connection with the central unit of the second network node.

Aspect 105: A method for wireless communication performed by a core network node, comprising: receiving, from a first network node, control information indicative that the core network node is to forward one or more containers of an integrated access and backhaul (IAB) node-to-central unit connection of an IAB node, wherein the control information includes a first identifier associated with the IAB node and a second identifier associated with a second network node; transmitting the one or more containers to the second network node based on the second identifier being included in the control information; caching the control information that indicates that the core network node is to forward the one or more containers, the first identifier, the second identifier, and a third identifier associated with the first network node; and transmitting, to the first network node associated with the third identifier or to the second network node associated with the second identifier, one or more other containers associated with the first identifier.

Aspect 106: The method of aspect 105, wherein receiving the control information further comprises: receiving a request to forward the one or more containers to or from the second network node based on the second identifier being included in the control information.

Aspect 107: The method of any of aspects 105 through 106, further comprising: transmitting a message indicating a capability of the core network node to relay traffic to the first network node, or the second network node via the IAB node-to-central unit connection, wherein communication of the control information, the one or more containers, or the one or more other containers is based on the capability of the core network node.

Aspect 108: The method of any of aspects 105 through 107, further comprising: receiving a message indicating a capability of the second network node to relay traffic via the IAB node-to-central unit connection; and relaying the control information, the one or more containers, or the one or more other containers to the second network node based on the capability of the second network node.

Aspect 109: The method of any of aspects 105 through 108, further comprising: receiving, from the first network node, or the second network node a release message indicating the core network node to release the cached information, wherein the release message comprises an identifier associated with the one or more containers or the first identifier; and relay the release message to the first network node or the second network node.

Aspect 110: The method of any of aspects 105 through 109, wherein the first network node is a source node of a first handover procedure in which the IAB node is handed over from the first network node to the second network node, or the second network node is the source node of a second handover procedure in which the IAB node is handed over from the second network node to the first network node.

Aspect 111: The method of any of aspects 105 through 110, wherein the control information, the one or more containers, or the one or more other containers are included in a non-access stratum message.

Aspect 112: A method for wireless communication performed by an integrated access and backhaul (IAB) node, comprising: establishing a radio resource control connection with a first central unit of a first network node; receiving, from the first network node, an indication that the IAB node is to establish an IAB node-to-central unit connection with a second central unit of a second network node via the radio resource control connection between the IAB node and the first network node, wherein the indication is associated with a handover between the first network node and the second network node; and communicating, with the second network node, via the IAB node-to-central unit connection using the radio resource control connection between the IAB node and the first network node.

Aspect 113: A first network node for wireless communications (e.g., an apparatus for wireless communications performed by a first network node), comprising a memory, and at least one processor coupled to the memory, wherein the first network node is configured to perform a method of any of aspects 84 through 104.

Aspect 114: An apparatus for wireless communication performed by a first network node, comprising at least one means for performing a method of any of aspects 84 through 104.

Aspect 115: A non-transitory computer-readable medium storing code for wireless communication performed by a first network node, the code comprising instructions executable by a processor to perform a method of any of aspects 84 through 104.

Aspect 116: A core network node for wireless communications (e.g., an apparatus for wireless communications performed by a core network node), comprising a memory, and at least one processor coupled to the memory, wherein the core network node is configured to perform a method of any of aspects 105 through 111.

Aspect 117: An apparatus for wireless communication performed by a core network node, comprising at least one means for performing a method of any of aspects 105 through 111.

Aspect 118: A non-transitory computer-readable medium storing code for wireless communication performed by a core network node, the code comprising instructions executable by a processor to perform a method of any of aspects 105 through 111.

Aspect 119: An integrated access and backhaul (IAB) node for wireless communications (e.g., an apparatus for wireless communications performed by an integrated access and backhaul (IAB) node), comprising a memory, and at least one processor coupled to the memory, wherein the integrated access and backhaul (IAB) node is configured to perform a method of any of aspects 112 through 112.

Aspect 120: An apparatus for wireless communication performed by an integrated access and backhaul (IAB) node, comprising at least one means for performing a method of any of aspects 112 through 112.

Aspect 121: A non-transitory computer-readable medium storing code for wireless communication performed by an integrated access and backhaul (IAB) node, the code comprising instructions executable by a processor to perform a method of any of aspects 112 through 112.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the aspects that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled to the memory, wherein the first network node is configured to:
   participate in establishment of a communication path between an integrated access and backhaul (IAB) node and a central unit of a second network node via a core network node, wherein the communication path is an IAB node-to-central unit connection; and forward traffic between the IAB node and the central unit via the core network node using the IAB node-to-central unit connection.

2. The first network node of claim 1, wherein the second network node is different from the first network node and the central unit of the second network node is a second central unit, and wherein to participate in the establishment of the communication path, the first network node is configured to:

establish a radio resource control connection with the IAB node, wherein the radio resource control connection is between a first central unit of the first network node and the IAB node; and transmit, to the IAB node, first control information indicating that the IAB node is to establish the IAB node-to-central unit connection with the second central unit of the second network node via the radio resource control connection between the IAB node and the first network node, wherein the first control information is associated with a handover of the IAB node between the first network node and the second network node.

3. The first network node of claim 2, wherein the first network node is further configured to:

perform a first handover procedure to hand over the IAB node from the first network node to the second network node, or a second handover procedure to hand over the IAB node from the second network node to the first network node before the IAB node-to-central unit connection is established.

4. The first network node of claim 2, wherein the first network node is further configured to:

prepare to hand over the IAB node from the second network node to the first network node, or from the first network node to the second network node; and determine, based on preparation to hand over, a first identifier of the second network node, and a second identifier of the core network node, wherein, to forward the traffic, the first network node is configured to forward the traffic via the IAB node-to-central unit connection via the core network node based on the first identifier or the second identifier.

5. The first network node of claim 2, wherein, to transmit the first control information, the first network node is configured to:

transmit a configuration message indicating the IAB node to communicate traffic via the IAB node-to-central unit connection with the second central unit of the second network node using the radio resource control connection between the IAB node and the first network node, wherein the configuration message is the first control information and comprises an internet protocol address configuration for selection of an internet protocol address for communications via the IAB node-to-central unit connection with the second central unit of the second network node; and configure the IAB node with the internet protocol address for the IAB node-to-central unit connection with the second central unit of the second network node.

6. The first network node of claim 2, wherein the first network node is further configured to:

receive, from the second network node, the IAB node, or the core network node a request to forward the traffic via the IAB node-to-central unit connection; and transmit a positive acknowledgment in response to the request, wherein the first network node forwards the traffic based on transmitting the positive acknowledgment.

7. The first network node of claim 2, wherein the first network node is further configured to:

transmit, to the second network node or the core network node via which the traffic is forwarded, a message indicating that the traffic is discontinued, the message comprising an indication to release an identifier associated with the IAB node.

8. The first network node of claim 2, wherein the first network node is further configured to:

communicate, with the second network node, an internet protocol address configuration for the IAB node-to-central unit connection, or a request for the internet protocol address configuration for the IAB node-to-central unit connection.

9. The first network node of claim 1, wherein the second network node is the first network node, and wherein to participate in the establishment of the communication path, the first network node is configured to:

receive an indication of a handover of the IAB node between the first network node and a third network node; and determine, based on the indication, an address for forwarding the traffic from the first network node to the IAB node via the third network node using the IAB node-to-central unit connection, wherein the address is different from an IAB node address indicative of the IAB node.

10. The first network node of claim 9, wherein the first network node is further configured to:

perform a first handover procedure to hand over the IAB node from the first network node to the third network node before the IAB node-to-central unit connection is established, or a second handover procedure to hand over the IAB node from the third network node to the first network node after the IAB node-to-central unit connection is established.

11. The first network node of claim 9, wherein the first network node is further configured to:

prepare to hand over the IAB node from the third network node to the first network node, or from the first network node to the third network node; and determine, based on preparation to hand over, a first identifier of the first network node, and a second identifier of the core network node, wherein, to forward the traffic, the first network node is configured to forward the traffic via the core network node based on the first identifier, or the second identifier.

12. The first network node of claim 11, wherein to prepare to hand over, the first network node is configured to:

prepare to hand over via a network node interface with the third network node, and wherein the first network node is configured to determine to forward the traffic via the third network node based on a second address of the third network node.

13. The first network node of claim 11, wherein, to prepare to hand over, the first network node is configured to prepare to hand over:

via a core network node interface, and wherein the first network node is configured to determine to forward the traffic via the core network node based on a second address of the core network node.

14. The first network node of claim 9, wherein the first network node is further configured to:

transmit, to the third network node, or the core network node, a request for the third network node to forward the traffic via the IAB node-to-central unit connection; and receive a positive acknowledgment in response to the request, wherein:

to forward the traffic, the first network node is configured to forward the traffic based on the positive acknowledgment; and the first network node is further configured to receive the traffic based on the positive acknowledgment.

15. The first network node of claim 9, wherein the first network node is further configured to:

transmit, to the third network node, or the core network node via which the traffic is forwarded, a message indicating that the traffic is discontinued, the message comprising a second indication to release an identifier associated with the IAB node.

16. The first network node of claim 9, wherein the first network node is further configured to:

communicate, with the third network node, an internet protocol address configuration for the IAB node-to-central unit connection, or a request for the internet protocol address configuration for the IAB node-to-central unit connection; and configure the IAB node with an internet protocol address for the IAB node-to-central unit connection.

17. The first network node of claim 9, wherein the first network node is further configured to:

receive a protocol data unit of the traffic from the address.

18. The first network node of claim 1, wherein the first network node is further configured to:

receive a message indicating a capability of the core network node to relay traffic via the IAB node-to-central unit connection, wherein, to relay the traffic, the first network node is configured to relay the traffic via the core network node based on the capability of the core network node.

19. The first network node of claim 1, wherein the traffic comprises a first identifier of the first network node, a second identifier of the second network node, a third identifier of the core network node associated with the IAB node, or a fourth identifier of the IAB node.

20. The first network node of claim 1, wherein to forward the traffic, the first network node is configured to:

forward the traffic using a UE-associated message or a non-UE associated message, wherein the UE-associated message is associated with the IAB node.

21. The first network node of claim 1, wherein the traffic comprises an F1-application protocol message, a stream control transmission protocol message, or an internet protocol packet, and wherein, to forward the traffic, the first network node is configured to:

establish or re-establish the IAB node-to-central unit connection with the central unit of the second network node.

22. A core network node for wireless communication, comprising:

a memory; and at least one processor coupled to the memory, wherein the core network node is configured to:

receive, from a first network node, control information indicative that the core network node is to forward one or more containers of an integrated access and backhaul (IAB) node-to-central unit connection of an IAB node, wherein the control information includes a first identifier associated with the IAB node and a second identifier associated with a second network node;

transmit the one or more containers to the second network node based on the second identifier being included in the control information;

cache the control information that indicates that the core network node is to forward the one or more containers, the first identifier, the second identifier, and a third identifier associated with the first network node; and transmit, to the first network node associated with the third identifier or to the second network node associated with the second identifier, one or more other containers associated with the first identifier.

23. The core network node of claim 22, wherein, to receive the control information, the core network node is configured to:

receive a request to forward the one or more containers to or from the second network node based on the second identifier being included in the control information.

24. The core network node of claim 22, wherein the core network node is further configured to:

transmit a message indicating a capability of the core network node to relay traffic to the first network node, or the second network node via the IAB node-to-central unit connection, wherein communication of the control information, the one or more containers, or the one or more other containers is based on the capability of the core network node.

25. The core network node of claim 22, wherein the core network node is further configured to:

receive a message indicating a capability of the second network node to relay traffic via the IAB node-to-central unit connection, wherein the core network node is further configured to relay the control information, the one or more containers, or the one or more other containers to the second network node based on the capability of the second network node.

26. The core network node of claim 22, wherein the core network node is further configured to:

receive, from the first network node, or the second network node a release message indicating the core network node to release the cached information, wherein the release message comprises an identifier associated with the one or more containers or the first identifier; and relay the release message to the first network node or the second network node.

27. The core network node of claim 22, wherein the first network node is a source node of a first handover procedure in which the IAB node is handed over from the first network node to the second network node, or the second network node is the source node of a second handover procedure in which the IAB node is handed over from the second network node to the first network node.

28. The core network node of claim 22, wherein the control information, the one or more containers, or the one or more other containers are included in a non-access stratum message.

29. An integrated access and backhaul (IAB) node for wireless communication, comprising:

a memory; and at least one processor coupled to the memory, wherein the IAB node is configured to:

establish a radio resource control connection with a first central unit of a first network node;

receive, from the first network node, an indication that the IAB node is to establish an IAB node-to-central unit connection with a second central unit of a second network node via the radio resource control connection between the IAB node and the first network node, wherein the indication is associated with a handover between the first network node and the second network node; and communicate, with the second network node, via the IAB node-to-central unit connection using the radio resource control connection between the IAB node and the first network node.

30. A method of wireless communications performed by a first network node, comprising:

participating in establishment of a communication path between an integrated access and backhaul (IAB) node and a central unit of a second network node via a core network entity, wherein the communication path is an IAB node-to-central unit connection; and forwarding traffic between the IAB node and the central unit via the core network entity using the IAB node-to-central unit connection.

* * * * *